(12) United States Patent
Simon et al.

(10) Patent No.: US 12,344,488 B2
(45) Date of Patent: Jul. 1, 2025

(54) VISION-ASSISTED ROBOTIZED DEPALLETIZER

(71) Applicant: Symbotic Canada, ULC, Montreal (CA)

(72) Inventors: Christian Simon, Laval (CA); Sylvain-Paul Morency, Laval (CA); William Légaré, Montréal (CA); Benoît Larouche, Montréal (CA); Robert Jodoin, Mont Tremblant (CA); Juergen Conrad, North Andover, MA (US)

(73) Assignee: Symbotic Canada, ULC (CA)

( * ) Notice: Subject to any disclaimer, the term of this patent is extended or adjusted under 35 U.S.C. 154(b) by 905 days.

(21) Appl. No.: 17/070,753

(22) Filed: Oct. 14, 2020

(65) Prior Publication Data
US 2021/0114826 A1 Apr. 22, 2021

Related U.S. Application Data

(60) Provisional application No. 62/916,080, filed on Oct. 16, 2019.

(51) Int. Cl.
*B65G 61/00* (2006.01)
*B25J 9/16* (2006.01)

(52) U.S. Cl.
CPC ............ *B65G 61/00* (2013.01); *B25J 9/1697* (2013.01); *B65G 2201/0267* (2013.01)

(58) Field of Classification Search
CPC . B65G 61/00; B65G 2201/0267; B25J 9/1697
See application file for complete search history.

(56) References Cited

U.S. PATENT DOCUMENTS

| 8,096,404 | B2 | 1/2012 | Eschlback et al. |
| 10,343,857 | B2 | 7/2019 | Morency et al. |
| 2007/0248448 | A1 | 10/2007 | Starz |
| 2010/0026491 | A1 | 2/2010 | Wicks |
| 2014/0079524 | A1 | 3/2014 | Shimono et al. |

(Continued)

FOREIGN PATENT DOCUMENTS

| JP | 03226604 | 10/1991 |
| JP | 2010005769 | 1/2010 |

(Continued)

*Primary Examiner* — Kyle O Logan
(74) *Attorney, Agent, or Firm* — Perman & Green, LLP

(57) ABSTRACT

A depalletizer having a pallet station for receiving a pallet load of cases disposed in pallet load layers, a robot with an end effector having a grip to grip and pick at least one of the layers and having a grip engagement interface defining a predetermined layer engagement position and orientation for the layer(s), relative to the depalletizing end effector, a vision system to image the pallet load of cases and generate at least one image of a top portion of the layer(s) independent of robot motion, and a controller that receives the image(s) and effects determination of a layer position and orientation of the layer(s) relative to the predetermined layer engagement position and orientation of the grip engagement interface, and the controller is operably coupled to the robot so as to position the grip and capture and hold the layer(s) with the grip at the grip engagement interface.

23 Claims, 32 Drawing Sheets

(56) References Cited

U.S. PATENT DOCUMENTS

| | | | |
|---|---|---|---|
| 2015/0203304 A1* | 7/2015 | Morency | B65G 59/02 |
| | | | 414/797 |
| 2015/0336754 A1* | 11/2015 | Morency | B65G 59/02 |
| | | | 414/796.2 |
| 2017/0185959 A1* | 6/2017 | Meurer | B65G 1/1373 |
| 2017/0246744 A1 | 8/2017 | Chitta et al. | |
| 2018/0327196 A1* | 11/2018 | Sullivan | B65G 57/03 |
| 2019/0016543 A1* | 1/2019 | Turpin | B25J 9/1697 |

FOREIGN PATENT DOCUMENTS

| | | |
|---|---|---|
| JP | 2010120774 | 6/2010 |
| JP | 2013526423 | 6/2013 |
| JP | 20140161560 | 4/2014 |
| WO | 2011143576 | 11/2011 |

\* cited by examiner

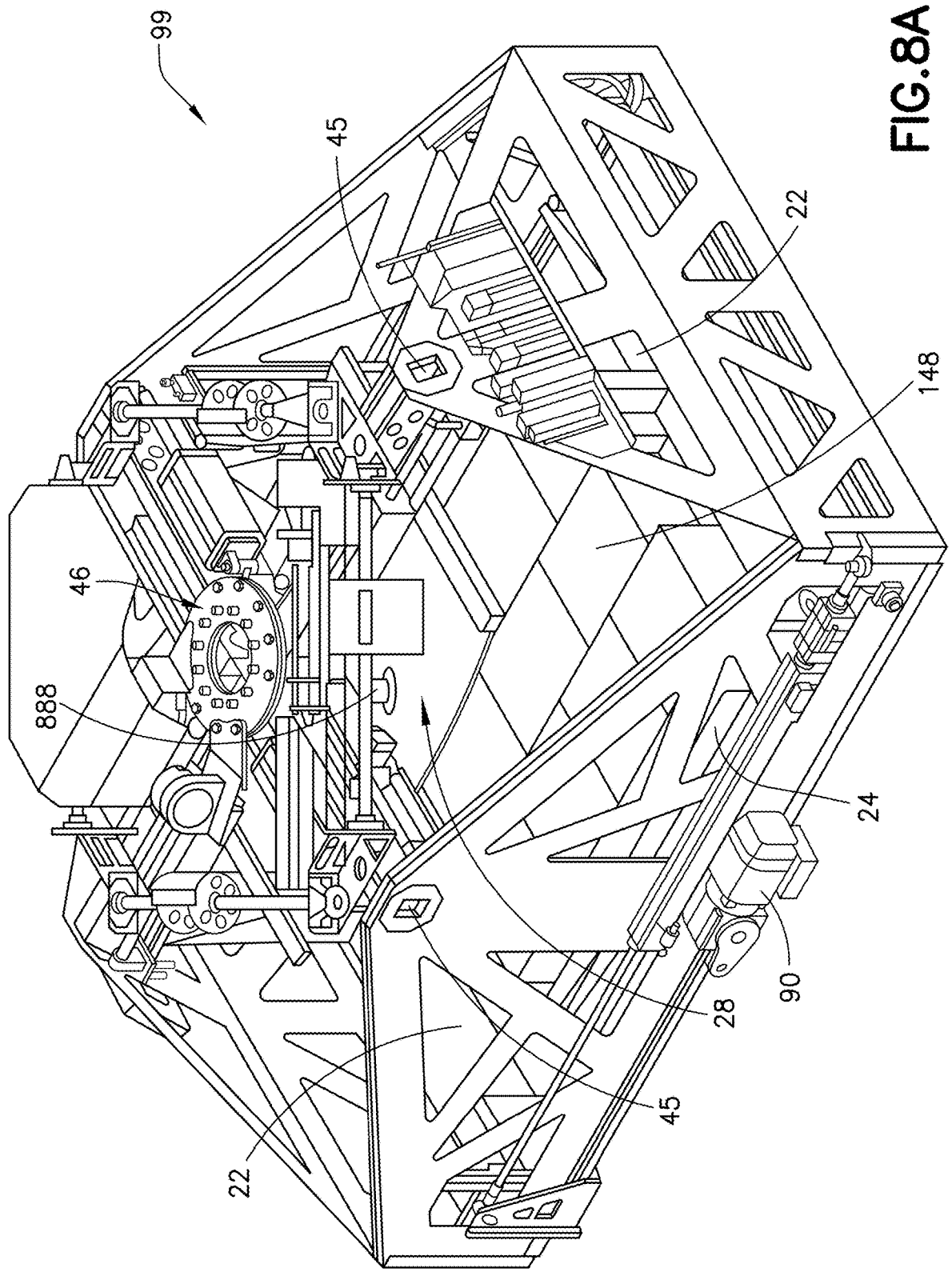

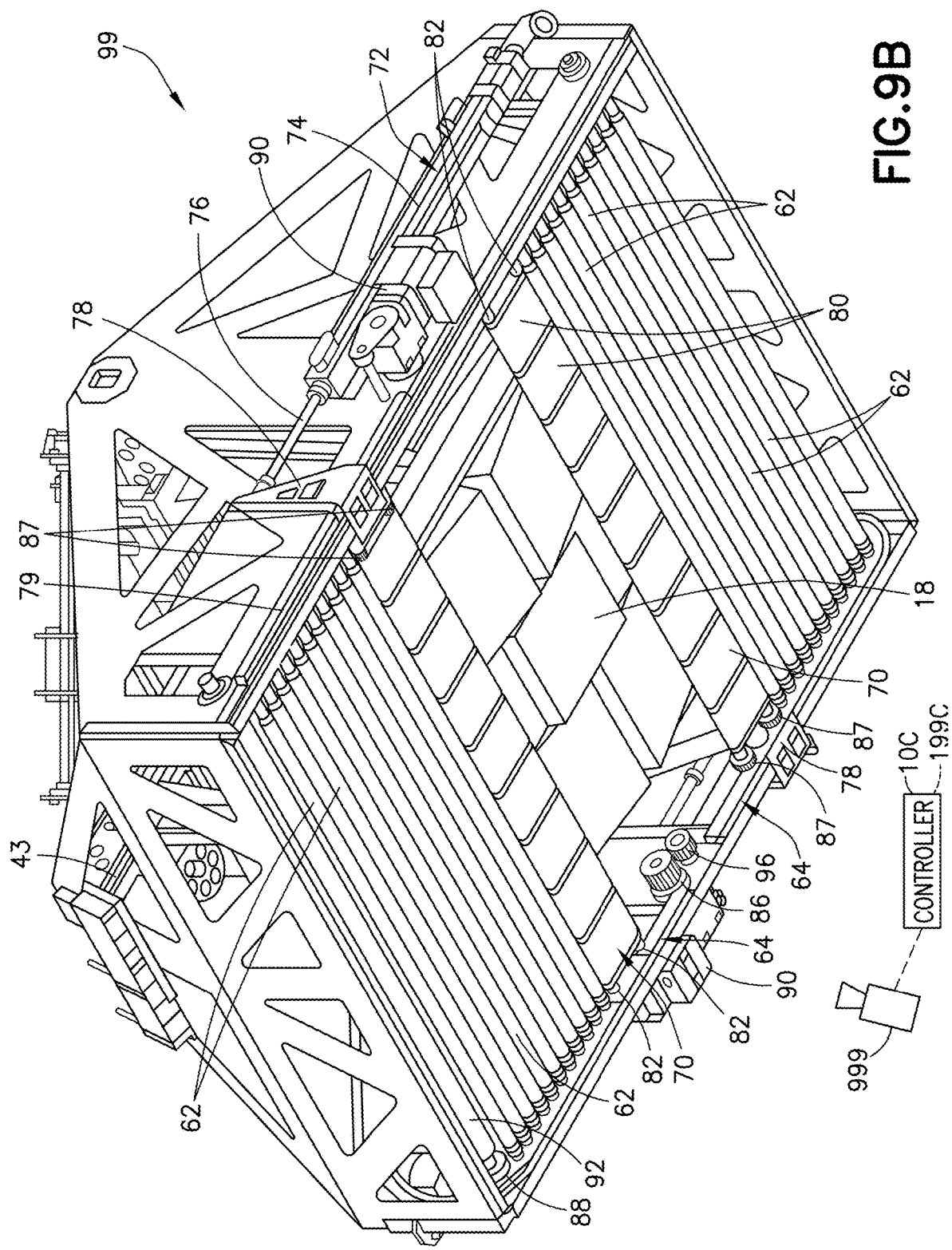

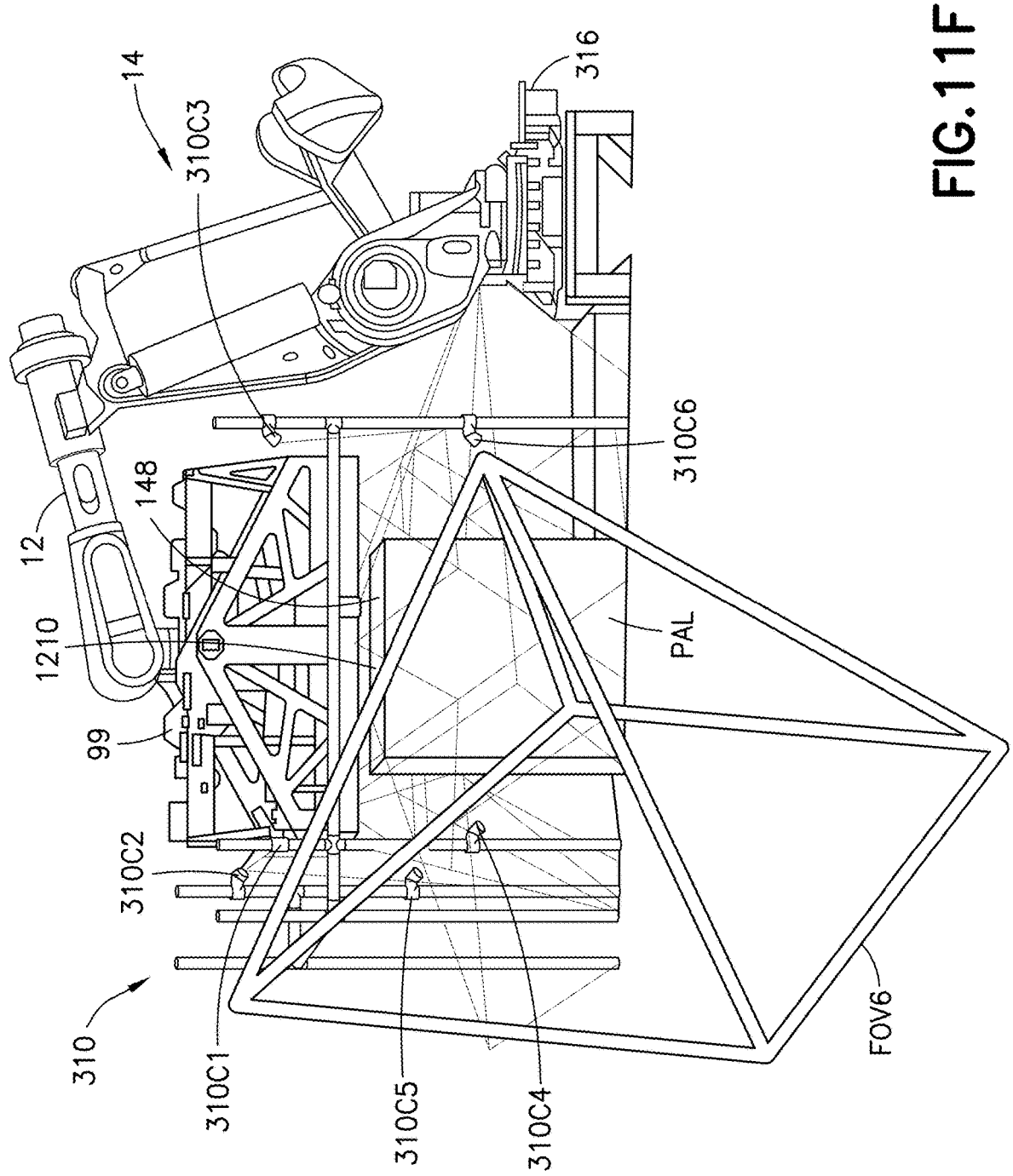

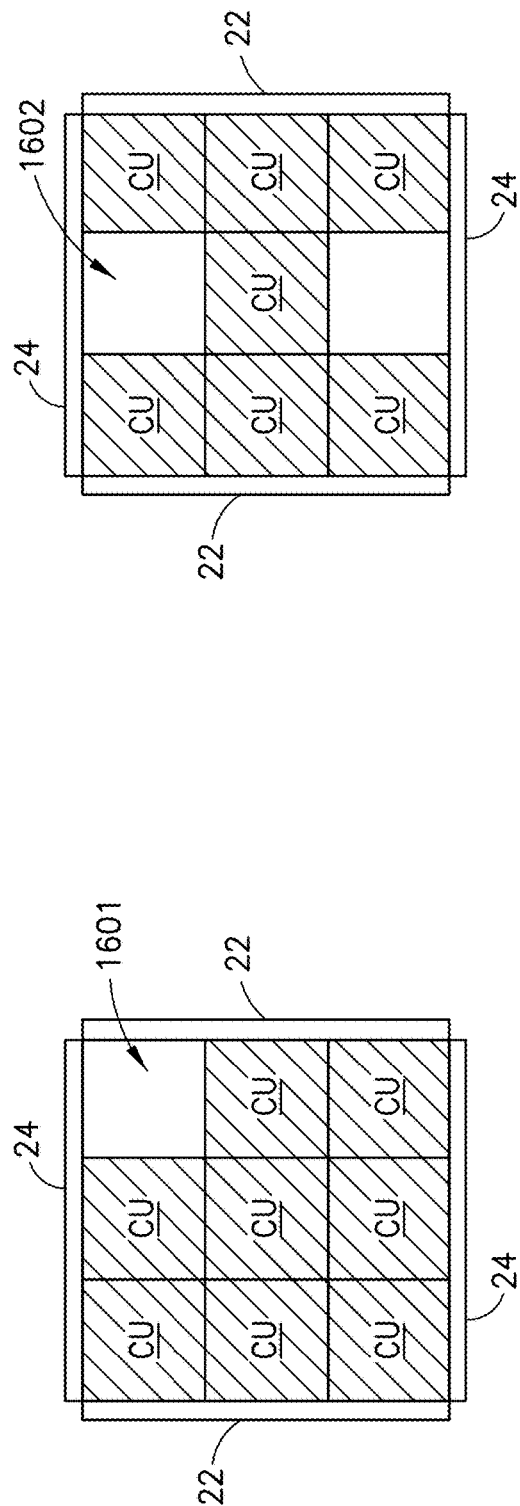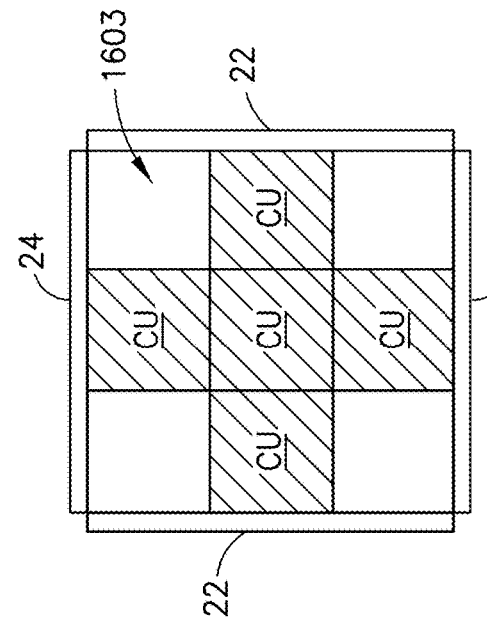
FIG. 16A  FIG. 16B  FIG. 16C

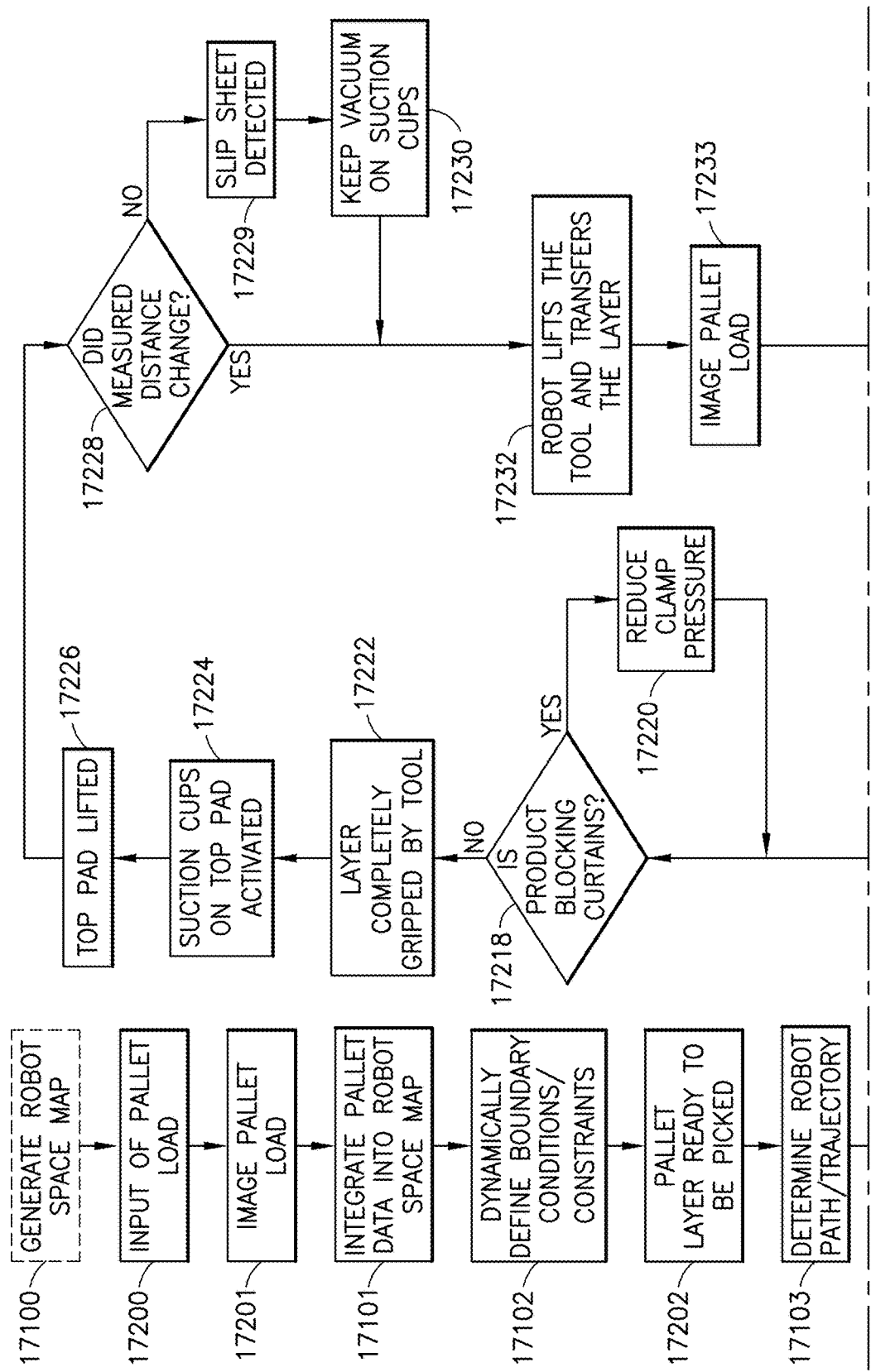

VISION-ASSISTED ROBOTIZED DEPALLETIZER

CROSS-REFERENCE TO RELATED APPLICATIONS

This application is a non-provisional of and claims the benefit of U.S. provisional patent application number 62/916,080, filed on Oct. 16, 2019, the disclosure of which is incorporated herein by reference in its entirety.

BACKGROUND

1. Field

The present disclosure generally relates to depalletizing, and more particularly, to vision-assisted robotized depalletizing of products.

2. Brief Description of Related Developments

The retail distribution of products (whether for conventional "brick and mortar" stores, online stores, or mixed retail channels) demands improvements in storage, sortation, and transport efficiencies, particularly for distribution of what is known as mixed cases or heterogeneous cases (within a given transport) whether for store replenishment or individual orders. The application of intelligent/adaptive automation thereto has increasingly facilitated improvement in efficiency at many levels of distribution including storage, sortation and transport.

Distribution centers and warehouses typically receive their products such as cases, boxes, open trays, stretch wrapped trays, etc. on a structured pallet, e.g. orderly positioned without gaps between them. Depalletizing systems are known in the art to remove the products from the pallet. Conventional pallet unloaders (e.g., depalletizers) that have electromagnetic radiation and optical mapping sensors (e.g., laser scanners, 3-D cameras, etc.) so as to map the 3-D pallet load for improved automation positioning relative to the pallet load are known. For example, one conventional method and system for detecting and reconstructing environments to facilitate robotic interaction with such environments includes determining a three-dimensional (3-D) virtual environment where the 3-D virtual environment represents a physical environment of a robotic manipulator including a plurality of 3-D virtual objects corresponding to respective physical objects in the physical environment. The method then involves determining two dimensional (2-D) images of the virtual environment including 2-D depth maps. The method may then involve determining portions of the 2-D images that correspond to a given one or more physical objects. The method may then involve determining, based on the portion and the 2-D depth maps, 3-D models corresponding to the portions of the 2-D images that correspond to a given one or more physical objects. The method may then involve, based on the 3-D models, selecting a physical object from the given one or more physical objects. The method may then involve providing an instruction to the robotic manipulator to move that object.

BRIEF DESCRIPTION OF THE DRAWINGS

The foregoing aspects and other features of the present disclosure are explained in the following description, taken in connection with the accompanying drawings, wherein:

FIGS. 8A and 8B are respectively top and bottom perspective views of the layer depalletizing tool of FIG. 3, shown in position to grip a full pallet layer;

FIGS. 9A and 9B are perspective views similar to FIGS. 8A and 8B respectively, showing clamps of the layer depalletizing tool of FIG. 3 applying pressure on the pallet layer and the curtains being partially closed;

FIGS. 11A-11F as schematic perspective illustrations of camera fields of view for the vision system of the palletizer cell of FIG. 3 in accordance with aspects of the present disclosure;

FIGS. 16A-16C are exemplary pallet layer configurations that may be picked by the layer depalletizing tool of FIG. 3 in accordance with aspects of the present disclosure;

FIG. 17A and 17B are an exemplary flow diagram of a method in accordance with aspects of the present disclosure;

DETAILED DESCRIPTION

Figure 1:
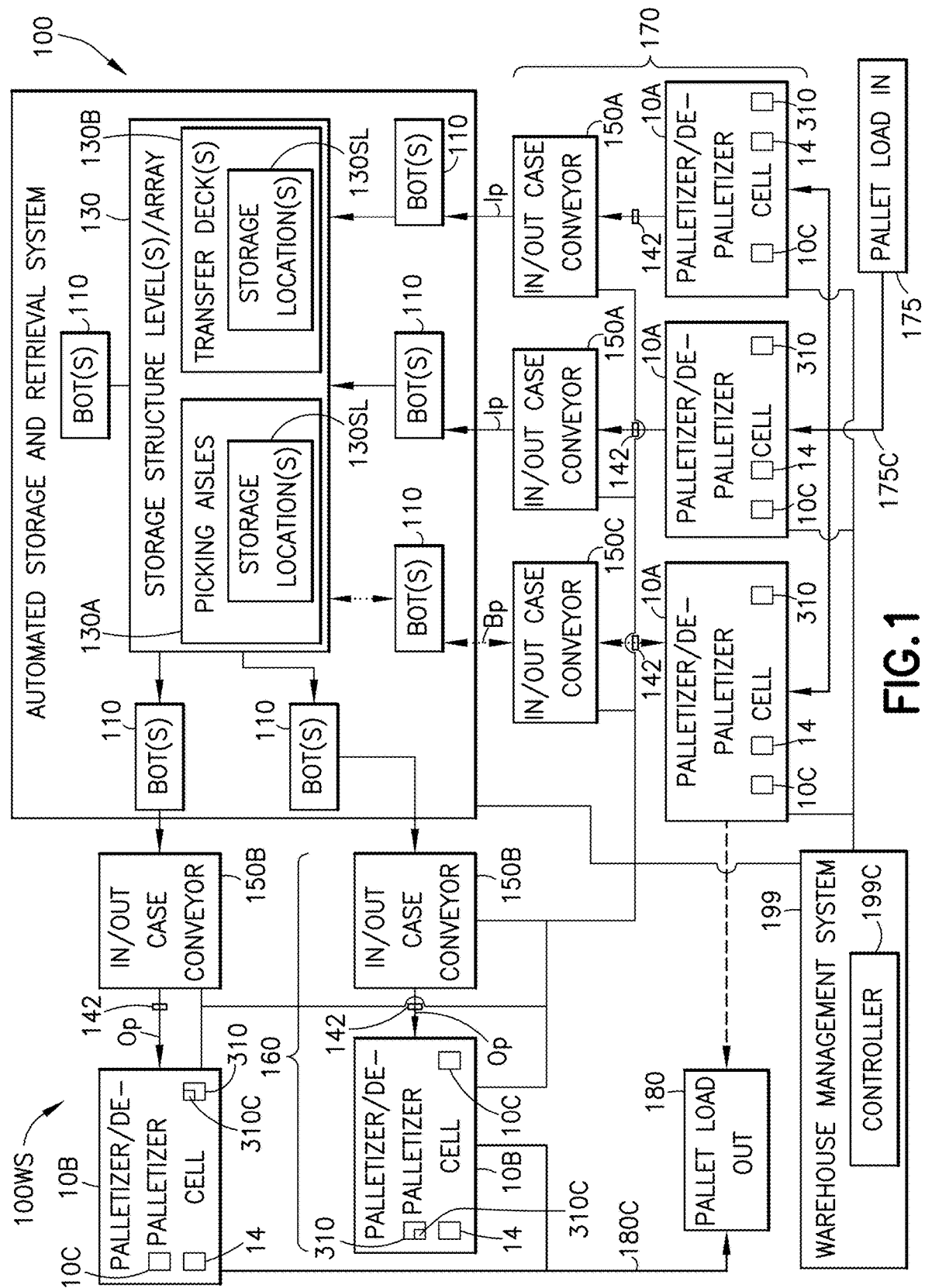
FIG. 1 is a schematic illustration of a distribution facility in accordance with aspects of the present disclosure.

FIG. 1 is a schematic illustration of a warehouse system or distribution facility 100WS (referred to herein as warehouse system 100WS) in accordance with aspects of the present disclosure. Although the aspects of the present disclosure will be described with reference to the drawings, it should be understood that the aspects of the present disclosure can be embodied in many forms. In addition, any suitable size, shape or type of elements or materials could be used. It should be understood that while the distribution facility 100WS is described herein as an automated distribution facility the aspects of the present disclosure are also applicable to distribution facilities having any suitable transport systems, such as both automated and manual transport systems or to wholly manual transport systems.

Figure 2:
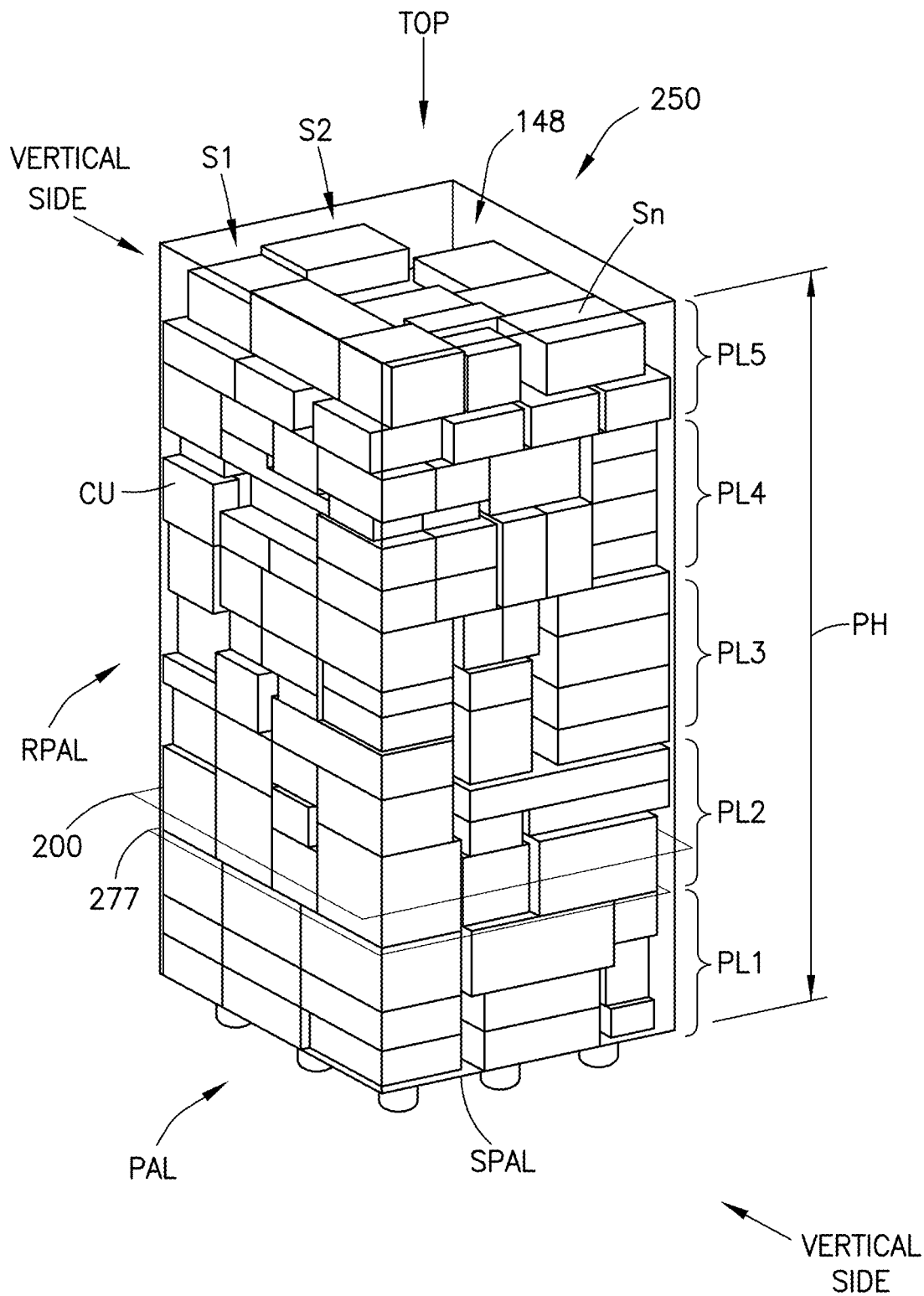
FIG. 2 is a schematic illustration of a pallet load in accordance with aspects of the present disclosure.

Referring to FIGS. 1 and 2, in accordance with the aspects of the present disclosure, the warehouse system 100WS includes at least one palletizer/depalletizer cell 10A, 10B (generally referred to herein as palletizer cell 10). The palletizer cell 10 has one or more robotic case manipulator(s) (also referred to herein as articulated robots, adaptive real time robots, robots, or product picking apparatus) that place (individually or manufactured pickfaces) mixed pallet load article units CU (also referred to herein as case units or cases or products 18) in stacks SL1-Sn and/or layers PL1-PL4 building a mixed case pallet load PAL with vision system assistance. A suitable example of a palletizer/depalletizer is described in U.S. patent No. Ser. 10,343,857 issued on Jul. 9, 2019 and titled "Vision-Assisted Robotized Depalletizer", the disclosure of which is incorporated herein by reference in its entirety.

The palletizer cell 10 is provided with a three-dimensional (3D) time of flight (TOF) camera(s) vision system 310 (referred to herein as the vision system 310), that generates three-dimensional (3D) imaging of each pallet layer (also referred to herein as a pallet load layer), and the case units CU thereof, that are to be removed by the robot 14. The vision system 310 is disposed at the palletizer cell 10 so as to image the pallet load PAL of cases CU at a pallet unloading/loading station 301, and configured so as to generate at least one image (see FIG. 12) of at least a top portion/surface 148 (FIGS. 2, 8A, and 11A-11F) of the at least one pallet load layer 816 (FIG. 8B—which is representative of pallet layers PL1, PL2, PL3, PL4, PL5) independent of robot 14 motion. The three-dimensional image information is generated and provided by the vision system 310, in real time coincident with robot 14 cyclic motion picking pallet layers so as to depalletize goods from the pallet load PAL and informs in real time (within the robot 14 pick/place motion cycle frame), at least a layer pose for each pallet layer in the pallet build from first case layer PL1 seated on the pallet support SPAL to the last case layer PL5.

The layer pose three-dimensional image information of each layer identifies variances from plan (e.g., skewing of the layer relative to pallet support SPAL and/or other layers, open case units CU, etc.), that inform compensation for the variances to, for example, the robot 14 so that the robot 14 compensates with robot 14 positioning relative to the layer to be picked in real time, so as to facilitate substantially continuous, with adaptive real time robot 14 placement, and adaptive depalletizing (in full automation or in collaboration/cooperation with user assist) and coincidently resolve pallet quality/controls and depalletizing with the robot 14.

A controller (such as a robot controller 16 and/or cell controller 10C) is operably coupled to the vision system 310 so as to receive the at least one image from the vision system 310. The controller is configured to effect determination, based on the at least one image, of a layer position and pose/orientation (such as in the robot coordinate system or reference frame X, Y, Z, RX, RY, RZ—FIG. 3) of the at least one pallet layer 816 (FIG. 8B) relative to a predetermined layer engagement position and orientation of a grip engagement interface 810 (FIG. 8B—as described herein) of a grip 800 (FIG. 8) of the robot 14, wherein the controller is operably coupled to the robot 14 so as to position the grip 800 relative to each topmost pallet layer (e.g., based on the determined relationship between the grip interface 810 and each topmost pallet layer of the at least one of the pallet load layers) and capture and hold the at least one pallet layer 816 with the grip 800 at the grip engagement interface 810. The controller determines, based on the at least one image, a respective layer position and orientation of each topmost layer, and effects determination of the determined relationship by comparing the respective layer position and orientation with a predetermined reference frame (as described herein) of the robot 14.

The vision system 310, incorporated into the automated palletizer cell 10, informs and enables the cell controller 10C so as to provide, in one aspect real time (or near real time) command inputs (to the automation such as the robot(s) 14) that are responsive, in real time (corresponding to commanded transaction time, as will be further described) to pallet load variances so that the robot(s) 14 is adaptive in real time resolving pallet load build variances, affecting depalletizing, (automatically and/or in cooperation/collaboration with user assistance) in time optimal manner so as to effect depalletizing in a time optimal manner.

Referring again to FIG. 1, in accordance with aspects of the present disclosure the distribution facility 100WS includes a storage and retrieval system 100 that may operate in a retail distribution center or warehouse to, for example, fulfill orders received from retail stores for case units. In one example, the case units may be cases or units of goods not stored in trays, on totes or on pallets (e.g., uncontained). In other examples, the case units may be cases or units of goods that are contained in any suitable manner such as in trays, on totes or on pallets. It is noted that the case units may include cased units of goods (e.g., case of soup cans, boxes of cereal, etc.) or individual goods that are adapted to be taken off of or placed on a pallet. In accordance with the embodiments, shipping cases for case units (e.g. cartons, barrels, boxes, crates, jugs, or any other suitable device for holding case units) may have variable sizes and may be used to hold case units in shipping and may be configured so they are capable of being palletized for shipping. It is noted that when, for example, bundles or pallets of case units arrive at the storage and retrieval system the content of each pallet may be uniform (e.g., each pallet holds a predetermined number of the same item—one pallet holds soup and another pallet holds cereal) and as pallets leave the storage and retrieval system the pallets may contain any suitable number and combination of different case units (e.g., each pallet may hold different types of case units—a pallet holds a combination of soup and cereal). In the embodiments the storage and retrieval system described herein may be applied to any environment in which case units are stored and retrieved.

The storage and retrieval system 100 may be configured for installation in, for example, existing warehouse structures or adapted to new warehouse structures. In the aspects of the present disclosure, the storage and retrieval system may include one or more in-feed transfer station 170 and one or more out-feed transfer station 160, in/out case conveyors 150A, 150B, 150C (generally referred to as in/out case conveyors 150), a storage structure array 130, and a number of autonomous vehicular transport robots 110 (referred to herein as "bots"). In the aspects of the present disclosure the storage and retrieval system may also include robot or bot transfer stations, as described in U.S. Pat. No. 9,096,375 issued on Aug. 4, 2015 the disclosure of which is incorporated by reference herein in its entirety. In the aspects of the present disclosure the bot transfer stations may provide an interface between the bots 110 and the in/out case conveyors 150 such that case units can be indirectly transferred between the bots 110 and the in/out case conveyors 150 through the bot transfer stations. In the aspects of the present disclosure case units may be transferred directly between the bots 110 and the in/out case conveyors 150.

The storage structure array 130 may include multiple levels of storage rack modules that form a storage array of storage locations 130SL for case units, each storage location 130SL of which is arranged for storage of at least one case unit at each storage location 130SL. In one aspect, each level of the storage structure array 130 includes respective storage/picking aisles 130A, and transfer decks 130B for transferring case units between any of the storage areas of the storage structure array 130 and any shelf of any in/out case conveyors 150. The storage aisles 130A, and transfer decks 130B are also configured to allow the bots 110 to traverse the storage aisles 130A and transfer decks 130B for placing case units into picking stock and to retrieve ordered case units, where the case units are stored or otherwise held in the storage aisles 130A and/or on the transfer deck 130B in storage locations 130SL. The bots 110 may be any suitable bots capable of carrying and transferring case units throughout the storage and retrieval system 100. Suitable examples of bots can be found in, for exemplary purposes only, U.S. Pat. No. 8,425,173 issued on Apr. 23, 2013, U.S. Pat. No. 9,561,905 issued on Feb. 7, 2017, U.S. Pat. No. 8,965,619 issued on Feb. 24, 2015, U.S. Pat. No. 8,696,010 issued on Apr. 15, 2014, U.S. Pat. No. 9,187,244 issued on Nov. 17, 2015, United States pre-grant publication number 2012/0189416 (U.S. Ser. No. 13/326,952) titled "Automated Bot with Transfer Arm" filed on Dec. 15, 2011, and U.S. Pat. No. 9,499,338 issued on Nov. 22, 2016, the disclosures of which are incorporated by reference herein in their entireties. The bots 110 may be configured to place case units, such as the above described retail merchandise, into picking stock in the one or more levels of the storage structure array 130 and then selectively retrieve ordered case units for shipping the ordered case units to, for example, a store or other suitable location.

The in-feed transfer stations 170 and out-feed transfer stations 160 may operate together with their respective in/out case conveyors 150A, 150B for bi-directionally transferring case units to and from one or more levels of the storage structure array 130 effecting infeed of the case units into the storage structure array 130 and output of the case units from the storage structure array 130. It is noted that while the in-feed transfer stations 170 and the outfeed transfer stations 160 (and their respective in/out case conveyors 150A, 150B and palletizer/depalletizer cells 10A, 10B) are described as being dedicated inbound (e.g., in-feed) transfer stations 170 and dedicated outbound (e.g., out-feed) transfer stations 160, in the aspects of the present disclosure each of the transfer stations 170, 160 may be used for both inbound and outbound transfer of case units from the storage and retrieval system. It is noted that while in/out case conveyors are described herein, the conveyors may be any suitable conveyors (including any suitable transport path orientation, such as vertical and/or horizontal conveyor paths) or transfer/picking devices having any suitable transport path orientation.

Figure 3:
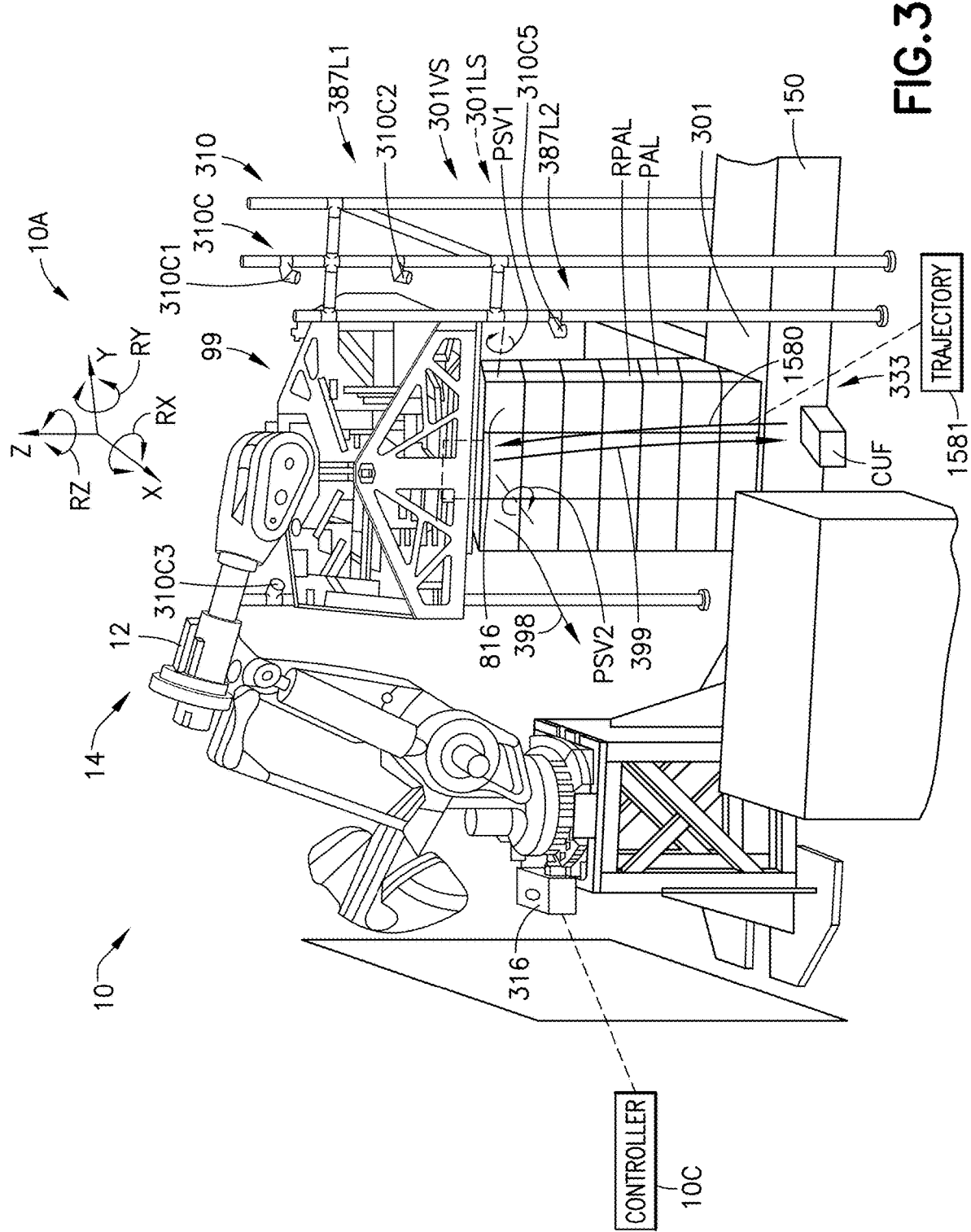
FIG. 3 is a schematic perspective illustration of a palletizer/depalletizer cell of the distribution facility of FIG. 1 in accordance with aspects of the present disclosure, the palletizer/depalletizer cell having a vision system and a robot with a layer depalletizing tool.

In one aspect, as described above, each of the in-feed transfer stations 170 and the out-feed transfer stations 160 include a respective in/out case conveyor 150A, 150B and a respective palletizer/depalletizer cell 10A, 10B (referred to generally herein as palletizer cell 10). In one aspect, the palletizer/depalletizer cells 10 are automated cells each being configured to receive loaded pallets (such as with uniform or mixed case units or products) from, for example, a pallet load in 175 area which may include an in-out loaded pallet conveyor 175C (illustrated in FIG. 1 as an input conveyor) and/or build a loaded pallet (such as with uniform or mixed case units or products) for transport to, for example, a pallet load out 180 area which may include an in-out loaded pallet conveyor 180C (illustrated in FIG. 1 as an output conveyor). In one aspect, the conveyors 175C, 180C are each connected to the storage structure array 130 and are configured so as to bi-directionally transport loaded pallets in an input direction towards the storage structure array 130, and in a different output direction away from the storage structure array 130. In one aspect, the conveyors 175C, 180C may each include a conveyor arrangement with a distributed conveyor bed arranged to form a conveying path or in other aspects, the conveyors 175C, 180C may be discrete transport units such as, for example, a fork lift/pallet truck. Suitable examples of automated palletizer/depalletizer cells 10A, 10B may be found in United U.S. application Ser. No. 15/235,254 filed on Aug. 12, 2016, and U.S. Pat. No. 8,965,559 issued on Feb. 24, 2015, the disclosures of which are incorporated herein by reference in their entireties. Each palletizer cell includes one or more robotic case manipulators 14, which may also be referred to articulated robots or robots. The one or more robotic case manipulators 14 are configured, as described herein, so as to transport and place the pallet load article units CU serially onto a pallet support so as to build (or in other aspects as described herein, decompose or decommission) the pallet load 250 on a pallet unloading/loading station 301 (see FIG. 3).

Where the palletizer cell 10 functions in an output role as a palletizer, pallet load article units CU, that can be of various sizes, arrive at the palletizer cell 10 via the in/out case conveyors 150B, are picked by one of the robotic case manipulators 14 and placed on the pallet load PAL as will be described herein. Where the palletizer cell 10 functions in an output role as a palletizer, a full pallet load PAL (see FIG. 2) made from a variety of case units is ready to be picked up by a forklift from the palletizer cell 10 for conveyance to a pallet load out 180 area. Where the palletizer/depalletizer cell 10 functions in an input role as a depalletizer, a full pallet load of cases (which may be similar to pallet load PAL and formed of homogenous or mixed cases), made from a variety of pallet load article units CU, disposed in pallet load layers, is transferred to a pallet unloading/loading station 301 of the palletizer cell 10 in any suitable manner, such as by a fork lift or other conveyance, from a pallet load in 175 area. Each of the pallet load layers PL1, PL2, PL3, PL4, PL5 being formed of more than one cases CU juxtaposed at a common level over an area of the pallet load PAL. In one aspect, as illustrated in FIG. 2, the pallet layers may be mixed pallet layers that include cases CU of different sizes; while in other aspects, as illustrated in FIG. 3, the pallet layers may be uniform layers that include cases CU having substantially the same size throughout the pallet layer. The one or more robotic case manipulators 14 pick the pallet load article units CU from the pallet PAL for transfer into the storage structure array 130.

In one aspect, each in-feed transfer station 170 forms, a case input path Ip where the palletizer/depalletizer cell 10A depalletizes case units, layer by layer, or otherwise depalletizes the case units into single case units from standard pallets (e.g., homogenous pallets having a stability suitable for automatic engagement of a pallet layer by an automatic layer interface unit, such as the product picking apparatus or robot 14). The palletizer/depalletizer cell 10A is in communication with a transport system of the automated storage and retrieval system 100, such as an in/out case conveyor 150A so as to form an integral input system (e.g., the in-feed transfer station 170) that feeds case units to the automated storage and retrieval system 100. Each in-feed transfer station 170 defines the case input path Ip that is integrated with the automated storage and retrieval system 100 and warehouse management system 199, where the warehouse management system 199 includes any suitable controller 199C configured with any suitable non-transitory program code and memory to manage, at least, case unit input to the storage structure array 130, case unit storage distribution within the storage structure array 130 and case unit retrieval from the storage structure array 130, case unit inventory/replenishment and case unit output.

In one aspect, each case unit input path Ip includes at least one corresponding case unit inspection cell 142 in communication with the warehouse management system 199. In one aspect, the at least one corresponding case unit inspection cell 142 may be any suitable inspection cell including any suitable volumetric inspection, such as with a multi-dimensional light curtain, imaging systems and/or any other suitable sensing/sensor arrangement configured to detect case unit defects and identify the case units for, e.g., inventory, transport sequencing, storage distribution and sequencing the case unit for output from the storage structure array 130.

In one aspect, as noted above, the palletizer/depalletizer cell 10A may be fully automatic so as to break down or decommission layer(s) from a pallet unloading at the palletizer/depalletizer cell 10A. It is noted that, referring to FIG. 2, the term decommission refers to the removal of a pallet layer PL1, PL2, PL3, PL4 (in whole or in part) from a pallet PAL so that each pallet load article unit CU is removed from the layer PL1, PL2, PL3, PL4 at a predetermined level 200 (which may correspond to a decommissioning/commissioning level or transfer plane) of the pallet PAL so that, in some aspects, the pallet PAL is indexed (by any suitable pallet lifting device of the palletizer cell 10) to a next level of the pallet PAL for removal of the next layer PL2, PL3 (in whole or in part) corresponding to the next level of the pallet PAL.

In one aspect, the palletizer/depalletizer cell 10A is configured to decommission the layers PL1, PL2, PL3, PL4 so that the decommissioning is synchronous or otherwise harmonized (e.g., matched with) by the warehouse management system 199 with a predetermined rate of case unit flow or feed rate, established by the warehouse management system 199, in the automated storage and retrieval system 100. For example, in one aspect, the warehouse management system 199 is configured to set and/or monitor a predetermined rate of case unit flow within the automated storage and retrieval system 100. For example, the warehouse management system 199 monitors and manages the automated systems of the automated storage and retrieval system 100 (such as, e.g., the in/out case conveyors 150A, 150B, bots 110 and palletizer/depalletizer cells 10A, 10B), where each of the automated systems, or one or more of automated systems have a given transaction time (such as a time/period to effect a basic unit of transport or transfer of cases, e.g. to transfer a case unit on/off the in/out case conveyor to a pick/place station, or lift a case unit a predetermined distance, or bot transfer pick/place on a storage location, a time to transfer a pallet layer to or from a pallet, etc.) that in effect, singularly or in combination define, under control of the warehouse management system 199 or any other suitable controller of the automated storage and retrieval system 100 (e.g., bot controllers, conveyor controllers, palletizer/depalletizer controllers, etc.), the predetermined rate of case unit flow in the automated storage and retrieval system 100 established by the warehouse management system 199. For example, the controller 199C of the warehouse management system 199 is communicably connected to the in-out case conveyor(s) 150A, 150B so that the in-out case conveyor(s) 150A, 150B bi-directionally transport the case units to and from the storage structure array 130 at a predetermined case feed rate. The controller 199C may also be communicably connected to a palletizer-depalletizer cell 10A, 10B corresponding to the in-out case conveyor(s) 150A, 150B so that the layer commissioning and decommissioning of the palletizer/depalletizer cell 10A, 10B, which are respectively substantially continuous, matches the predetermined case feed rate. While the aspects of the present disclosure are described herein with respect to a distribution facility 100WS having automated storage and retrieval system 100 with automated transport systems, the aspects of the present disclosure are also applicable to distribution facilities having any suitable transport systems such as both automated and manual transport systems or to wholly manual transport systems, where both the automated transport transactions and the manual transport transactions each have respective transaction times where the commissioning and decommissioning of case units to and from pallets may be matched to the transaction times in a manner substantially similar to that described herein.

In one aspect, each out-feed transfer station 160 forms, a case output path Op where the palletizer/depalletizer cell 10B palletizes case units, layer by layer onto pallets PAL such as with an automatic layer interface unit, such as the one or more robotic case manipulators 14. In one aspect, the pallets PAL may be formed as standard pallets (e.g. homogeneous case units) or as mixed pallets, such as described in U.S. patent application Ser. No. 14/997,920 filed on Jan. 18, 2016 the disclosure of which is incorporated herein by reference in its entirety. In one aspect, the warehouse management system 199 is configured to establish a pallet solution, with mixed case units, that provides a stable pallet load stack suitable for an end effector of the one or more robotic case manipulators to transfer as a layer. As described above, a suitable example, of the palletizer/depalletizer cell 10B may be found in U.S. patent application Ser. No. 15/235,254 filed on Aug. 12, 2016, the disclosure or which was previously incorporated herein by reference in its entirety.

In one aspect, the palletizer/depalletizer cell 10B is in communication with a transport system of the automated storage and retrieval system 100, such as an in/out case conveyor 150B so as to form an integral output system (e.g., the out-feed transfer station 160) that receives case units from the automated storage and retrieval system 100 for placement on pallets according to any suitable case out order sequence. For example, as described above, pallet load article units CU routed to the one or more robotic case manipulators 14 are transferred to the pallet PAL by the end effector of the one or more robotic case manipulators 14, with the pallet load article units CU (output case units) being arranged in a predetermined sequence established by the warehouse management system 199, layer by layer (noting that the layer may cover the pallet in whole or in part) to form a standard output pallet load.

Each out-feed transfer station 160 defines the case output path Op that is integrated with the automated storage and retrieval system 100 and warehouse management system 199, where the warehouse management system 199 includes any suitable controller 199C configured with any suitable non-transitory program code and memory to manage the operation of the distribution facility 100WS, including case unit output from the storage structure array 130, as described herein. In one aspect, each case unit output path Op includes at least one corresponding case unit inspection cell 142 (as described above) in communication with the warehouse management system 199. In one aspect, as noted above, the palletizer/depalletizer cell 10B may be fully automatic so as to build or commission layer(s) to a pallet loading at the palletizer/depalletizer cell 10B. It is noted that, referring to FIG. 2, the term commission refers to the construction of a pallet layer PL1, PL2, PL3, PL4 (in whole or in part) to a pallet PAL so that each pallet load article unit CU is inserted to the layer PL1, PL2, PL3, PL4 at a predetermined level 200 (which may correspond to a decommissioning/commissioning level or transfer plane) of the pallet PAL until the pallet layer PL1, PL2, PL3, PL4, PL5 is formed so that, in some aspect, the pallet PAL is indexed (by any suitable pallet lifting device of the palletizer cell 10) to a next level of the pallet PAL for building of the next layer PL1, PL2 (in whole or in part) corresponding to the next level of the pallet PAL. In one aspect, the palletizer/depalletizer cell 10B is configured to commission the layers PL1, PL2, PL3, PL4, PL5 so that the commissioning is synchronous or otherwise harmonized (e.g. matched with) by the warehouse management system 199 with a predetermined rate of case unit flow or feed rate, established by the warehouse management system 199, in the automated storage and retrieval system 100 in a manner substantially similar to that described above with respect to the decommissioning of the layers PL1, PL2, PL3, PL4 where the warehouse management system 199 manages case unit retrieval order and the sequence of mixed case unit output to loadout sequence of the mixed case unit pallet load, and other associated aspects of output such as inventory reconciliation.

In accordance with aspects of the present disclosure, and referring to FIG. 3, the palletizer/depalletizer cell 10A that is configured to decommission the layers PL1, PL2, PL3, PL4, PL5 includes at least one robot 14 having a robot arm 12 coupled to a robot controller 316 (which is coupled to or forms part of the cell controller 10C). The robot arm 12 is in the form of a standard industrial articulated robot arm suitable for decommissioning the layers as described herein. In one aspect, the robot arm 12 includes six degrees of freedom movement, while in other aspects the robot arm 12 may have more or less than six degrees of freedom movement. As used herein, the expressions "robot" and "robot arm" are used interchangeably to mean a programmable system including articulated and/or movable members that can receive, control, and move a tool. As illustrated in FIG. 3, layer depalletizing tool or end effector 99 is coupled to the robot arm 12 and is configured to decommission the layers PL1, PL2, PL3, PL4, PL5 as described herein. In one aspect the layer depalletizing tool 99 may be substantially similar to the tool described in U.S. patent application Ser. No. 14/720,089 filed on May 22, 2015 titled "Tool and Method for Layer Depalletizing", the disclosure of which is incorporated herein by reference in its entirety.

Referring to FIGS. 3-5 and 8B, the layer depalletizing tool 99 has a grip 800 configured to grip and pick therewith at least one of the pallet load layers 816 (which is representative of any one of pallet layers PL1, PL2, PL3, PL4, PL5) so as to transport the at least one pallet load layer 816 from the pallet load PAL at the pallet unloading/loading station 301 to an output station 333 (which in one aspect includes any suitable conveyor such as conveyor 150). The grip 800 has a grip engagement interface 810 that defines a predetermined layer engagement position and orientation (e.g., in the robot coordinate system or space X, Y, Z, RX, Ry, RZ—see FIG. 3 and also referred to herein as a robot reference frame) for the at least one pallet layer 816, relative to the layer depalletizing tool 99, so as to repeatably effect capture and stable holding of the at least one pallet load layer 816 with the grip 800. It is noted that the configuration of the grip 800 described herein is one suitable example of a pallet layer gripping mechanism that may be employed with the aspects of the present disclosure; however, in other aspects the grip may have any suitable differential pressure grip, bladder grip, or other capture mechanism that defines an engagement/capture system interfacing with the pallet layer for transfer of the pallet layer by the grip. The layer depalletizing tool 99 comprises a frame 20, four side clamps 22-24 movably mounted to the frame 20 to grip and release a pallet layer 1PL1, PL2, PL3, PL4, PL5, two curtains 26 mounted to the frame under the clamps 22-24 to be inserted under a pallet layer 816 gripped by the clamps 22-24, and a top pad 28, mounted to the frame 20 above the clamps 22-24, where one or more of the four side clamps 22-24, two curtains 26, and a top pad 28 form the grip engagement interface 810. The predetermined layer engagement position and orientation provides engagement planar orientation (such as defined at least in part by the top pad 28) of the grip engagement interface 810. The layer position and orientation describes planarity (see plane 1200 in FIG. 12) of an engagement surface 1210 (which may be coincident with the top surface 148), of the at least one (top) pallet layer 816, disposed so as to interface the grip engagement interface 810 substantially spanning across the at least one pallet layer 816, and the layer position and orientation describes planar misalignment in at least two orthogonal directions (e.g., of the robot coordinate system or reference frame) between the engagement surface 1210 of the at least one pallet layer 816 and planar orientation of the grip engagement interface 810. The controller (such as a robot controller 16 and/or cell controller 10C) is configured to resolve the at least of the one planar misalignment and the center point misalignment for optimum grip engagement respectively with each topmost layer based on robot motion boundary conditions defined by at least one of robot architecture and structure bounding the depalletizer 10 described in the predetermined reference frame of the robot 14.

The frame 20 comprises two pairs of parallel walls 30-32 assembled so as to generally define a rectangular perimeter. Each wall 30 and 32 includes a bottom rectangular portion 34 and respectively and an integral triangular portion 38 and 40 respectively. The two triangular portions 40 are slightly bent toward each other. The frame 20 further comprises two transversal rectangular hollow tubes 42 and 44, extending respectively parallel to the walls 30 between the walls 32, and parallel to the walls 32 between the walls 30. Holes 45 (see FIG. 6A) are provided near the top of the triangular portions 38-40 of the walls 30-32, where the hollow tubes 42 and 44 are secured, allowing passage for connectors and cables (not shown) through the walls 30-32 and then through the hollow tubes 42 and 44. A mounting bracket 46 (see FIG. 8A) is secured to both hollow tubes 42 and 44, at the intersection thereof and that allows attaching the layer depalletizing tool 99 to the robot arm 12. The frame components 30-44 are assembled using fasteners and/or welding and so are other parts of the layer depalletizing tool 99 that are mounted to the frame 20. The frame 20 is not limited to what is described above and other members can be provided to mount the layer depalletizing tool 99 to the robot arm 12 and to operatively receive the other components thereof. It noted that the description of the frame is for exemplary purposes only and in other aspects, the frame may have any suitable configuration and/or the layer depalletizing tool may be coupled to the robot arm in any suitable manner.

Figure 6:
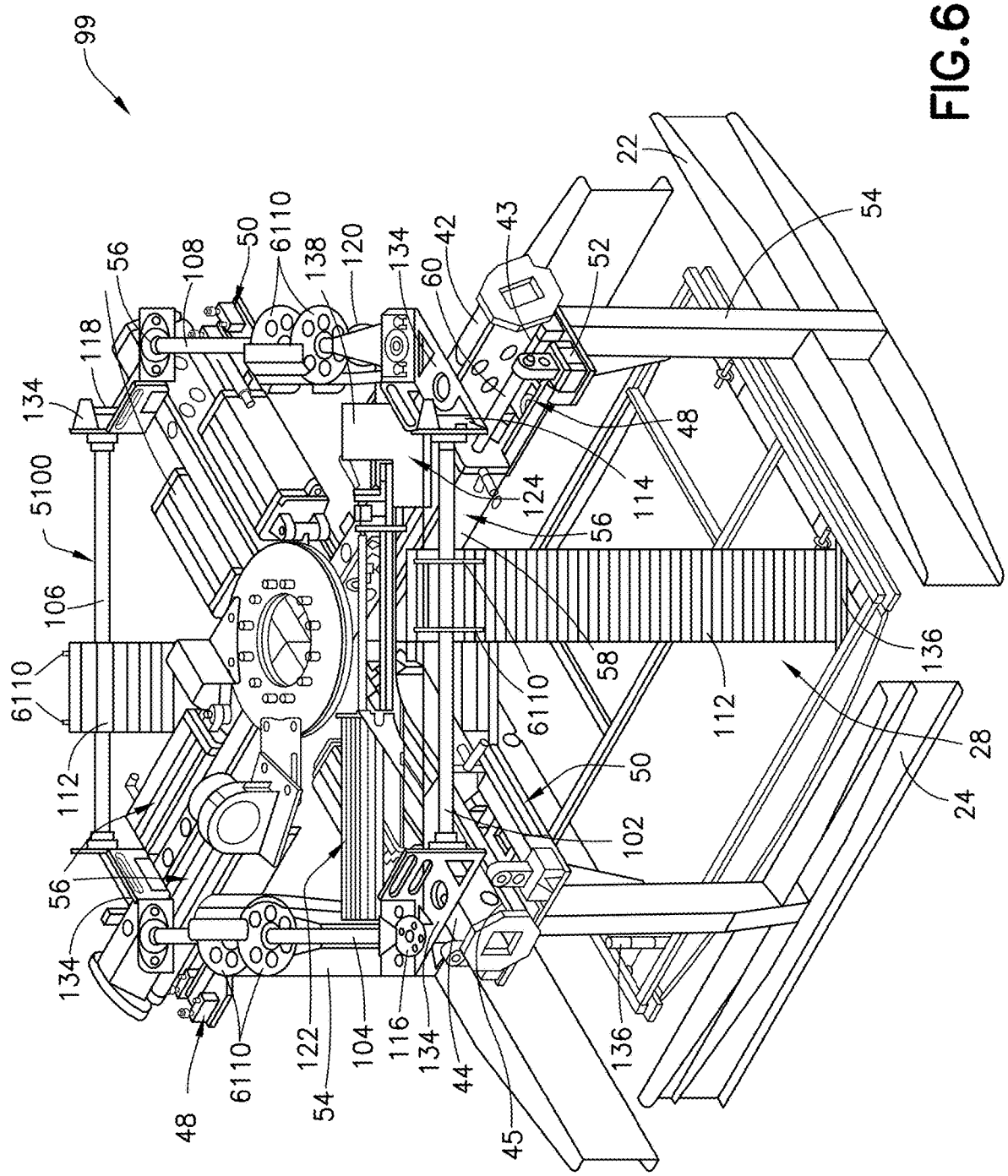
FIG. 6 is an exploded perspective illustration of the layer depalletizing tool of FIG. 3, the layer depalletizing tool being shown without most of its frame.

Referring also to FIG. 6, each facing pair of side clamps 22 and 24 are slidably mounted to a respective track 43 and 45, each fixed respectively underneath hollow tubes 42 and for movement therealong via mounting assemblies 48 and 50 respectively. Since the mounting assemblies 48 and 50 are very similar, only the mounting of one of the clamp 22 to the frame will be described herein in more detail. The mounting assembly 48 includes a bracket 52 that is slidably mounted to the hollow tube 42 via the track 43 thereunder, and attached to the distal ends of rods 60 of the two actuators 56. The bar 54 fixedly connects the clamp 22 to the bracket 52. The bar 54 is so mounted to the bracket 52 as to extend perpendicularly therefrom and to the clamp 22. The clamp 22 is perpendicular to the hollow tube 42 in a plane that includes the bar 54.

Two pneumatic actuators 56 are provided between the hollow tube 42 and the bracket 52 to cause movement thereof, and therefore also the movement of the clamp 22 along the hollow tube 42. More specifically, the body 58 of each actuator 56 is secured to the hollow tube 42 on respective lateral side thereof and the distal end of the rod 60 of the actuator is fixedly mounted to the bracket 52. The clamps 22 and 24 are moved in parallel pair to grip a pallet layer from two opposite sides thereof and then from the other sides. The actuators 56 are therefore operated four (4) at first (secured on a same hollow tube 42 or 44), and then the other four simultaneously. According to another aspect of the present disclosure, all clamps 22 and 24 are actuated simultaneously.

Providing the dimensions and pose of a pallet layer 816 (which is representative of any one of pallet layers PL1, PL2, PL3, PL4, PL5), as determined by the vision system 310 as described herein, each pair of clamps 22 and 24 are movable between an extended position to a retracted position where the clamps 22 or 24 apply a pressure onto the pallet layer 816 from corresponding opposite sides. While the clamps 22 and 24 have different widths, clamps according to another aspect of the present disclosure may have the same width. Clamps according to another aspect are pivotally mounted to the frame. According to still other aspects, the clamps have other configurations than those illustrated herein, and are mounted to the frame in any suitable manner so as to be differently movable relative to the frame.

Figure 7:
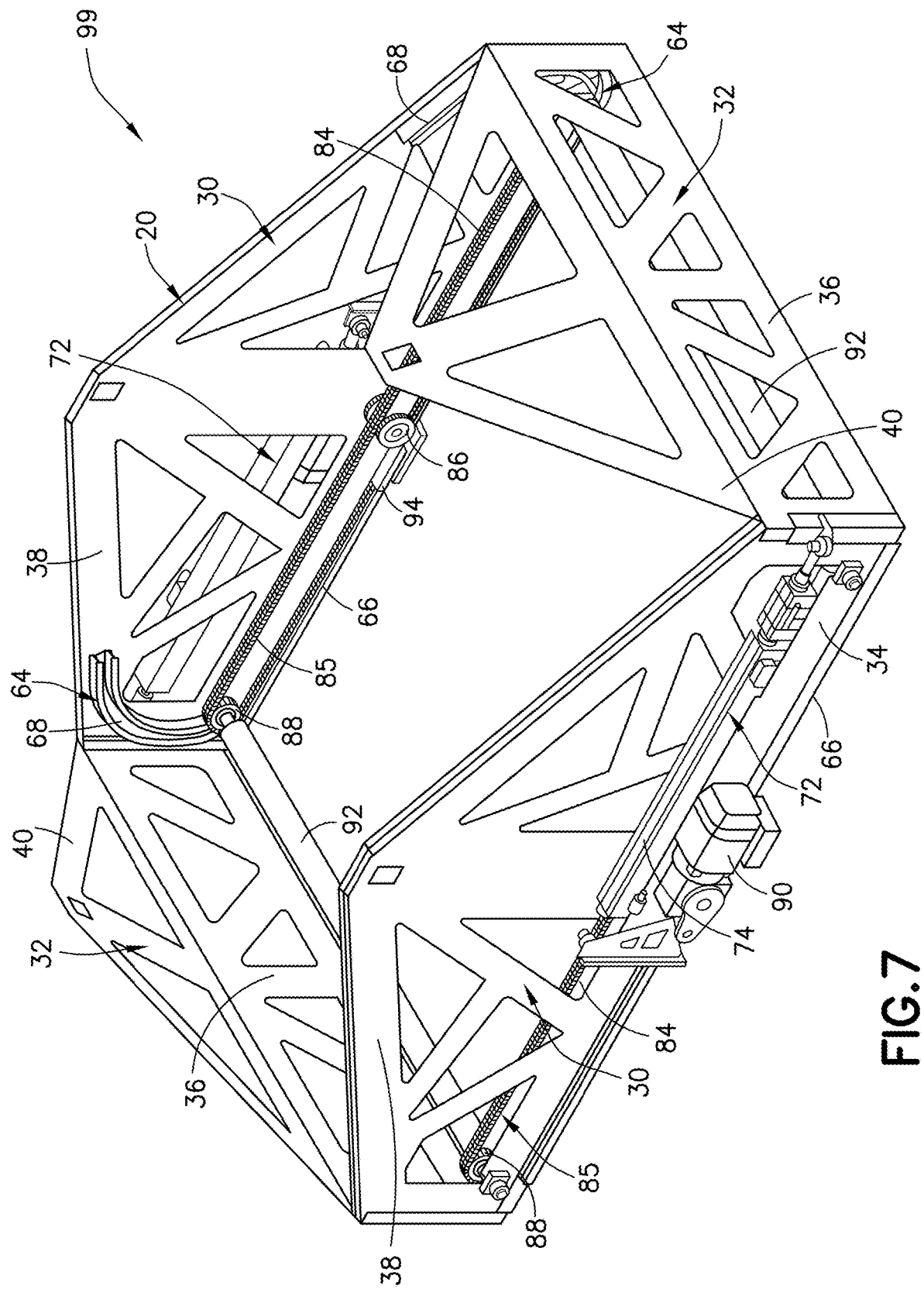
FIG. 7 is a top perspective illustration of part of the frame and of a curtain actuating assembly of the layer depalletizing tool of FIG. 3.
Figure 9A:
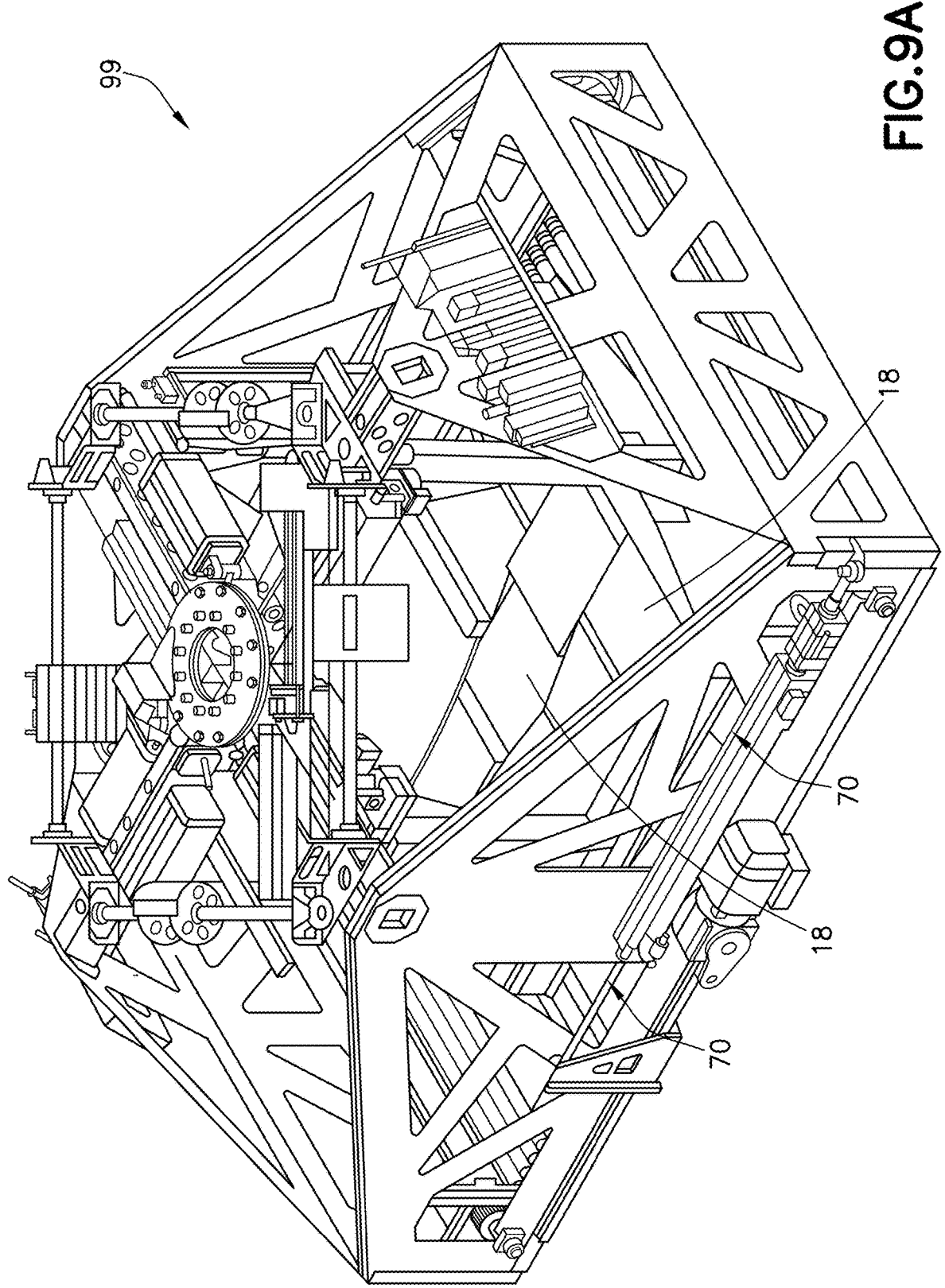
Figure 10A:
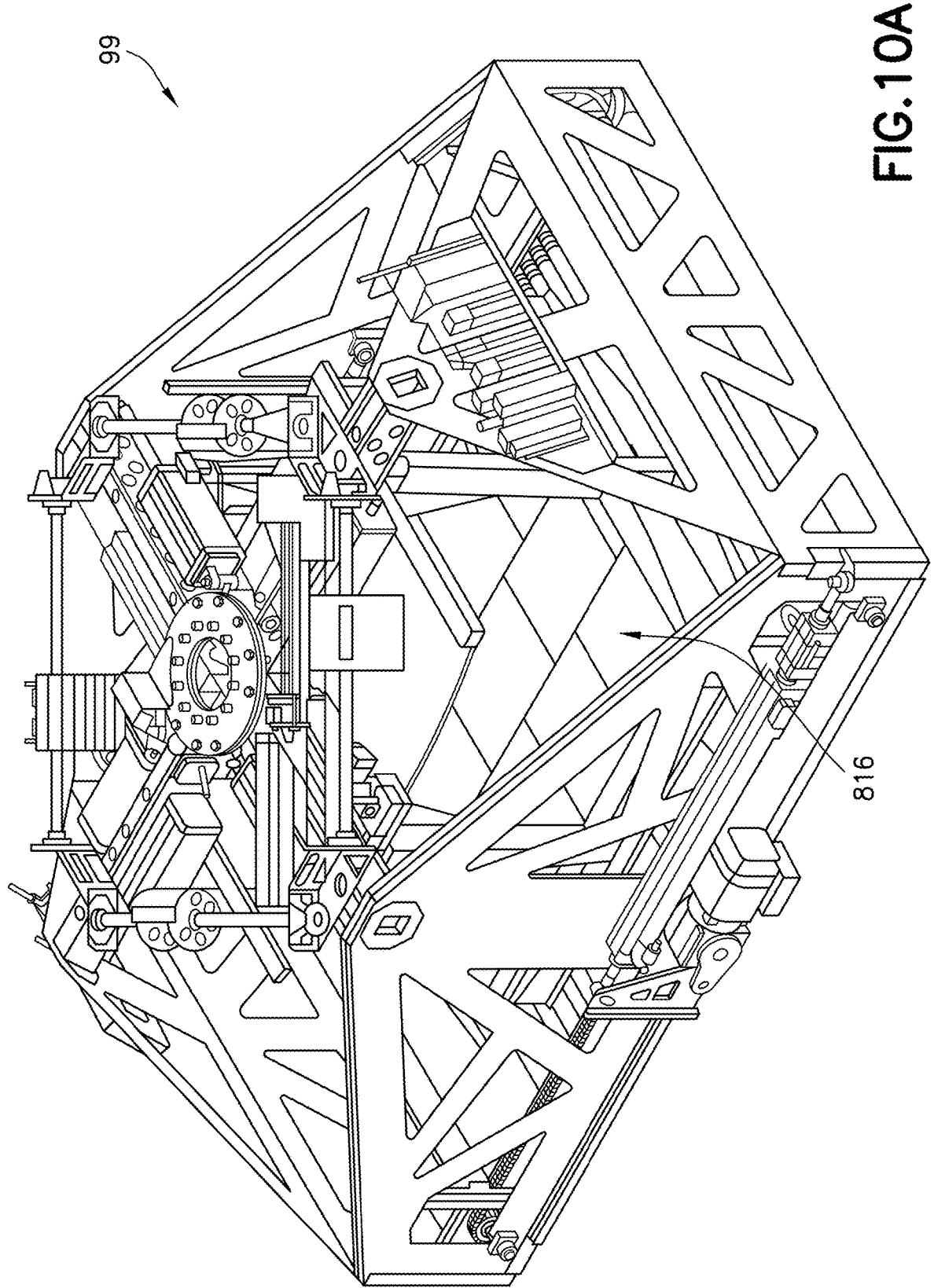
FIGS. 10A and 10B are perspective views similar to FIGS. 8A and 8B respectively, showing clamps of the layer depalletizing tool of FIG. 3 having released some of the pressure on the pallet layer and the curtains being completely closed.
Figure 10B:
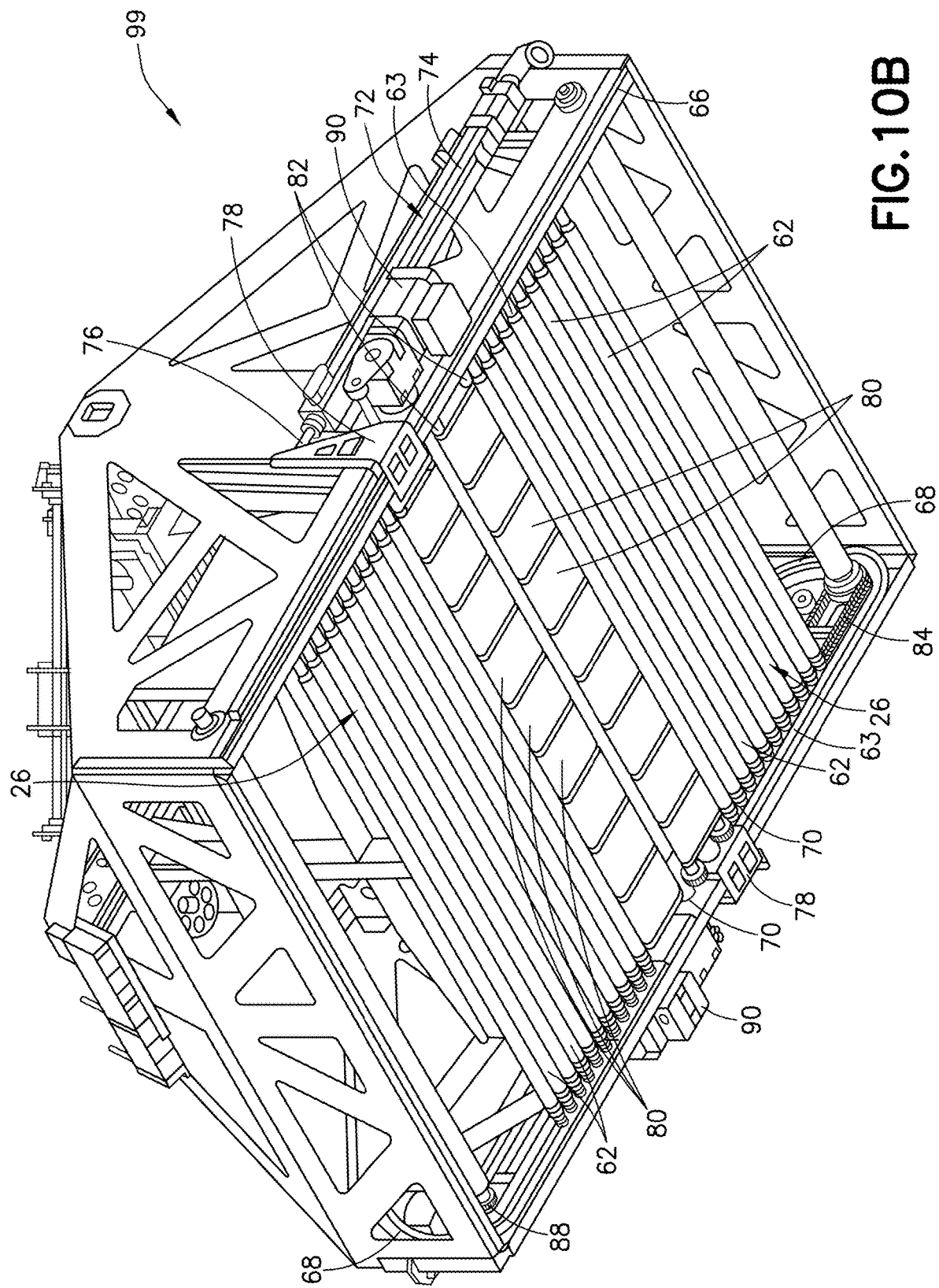
Figure 11A:
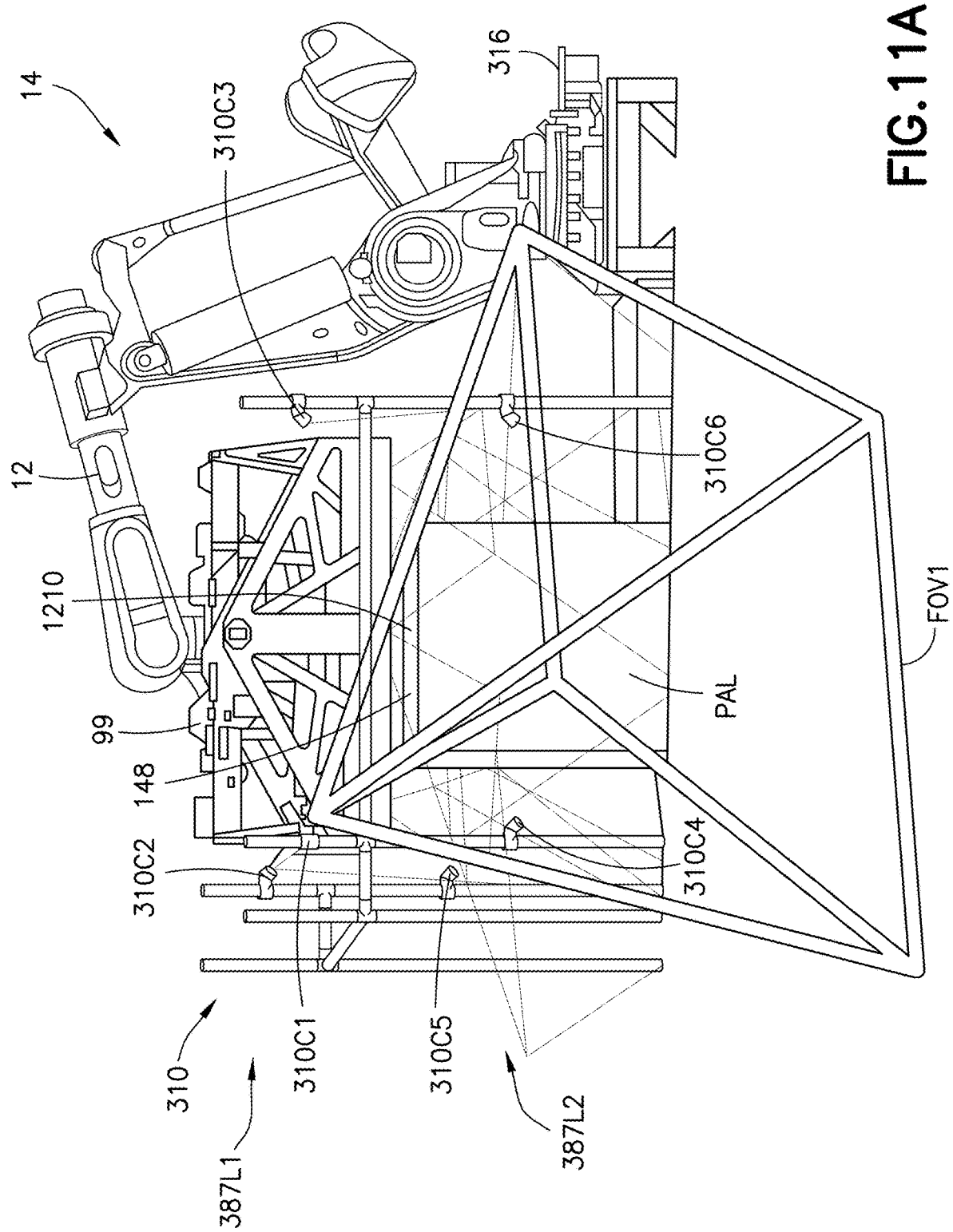
Figure 11B:
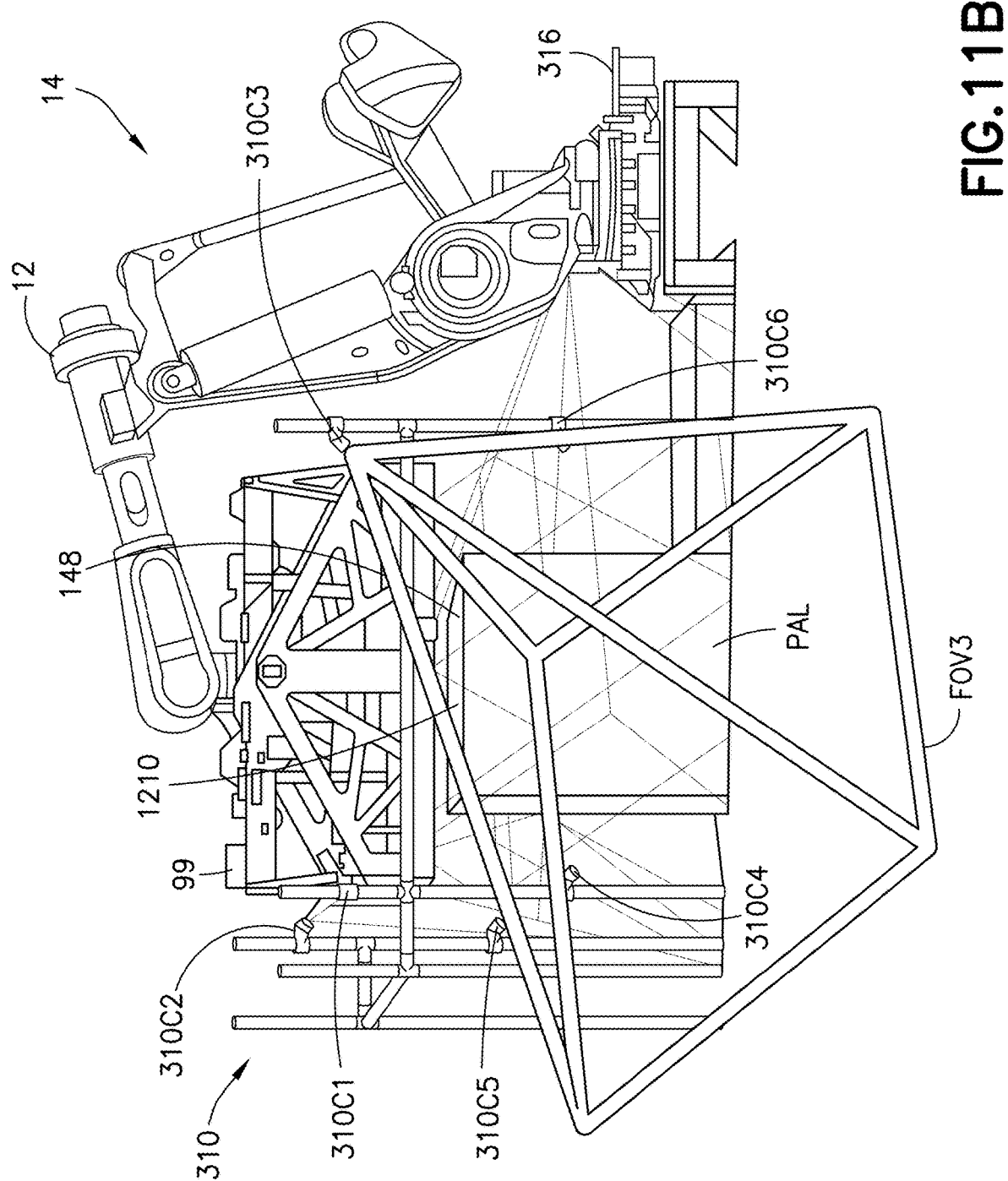
Figure 11C:
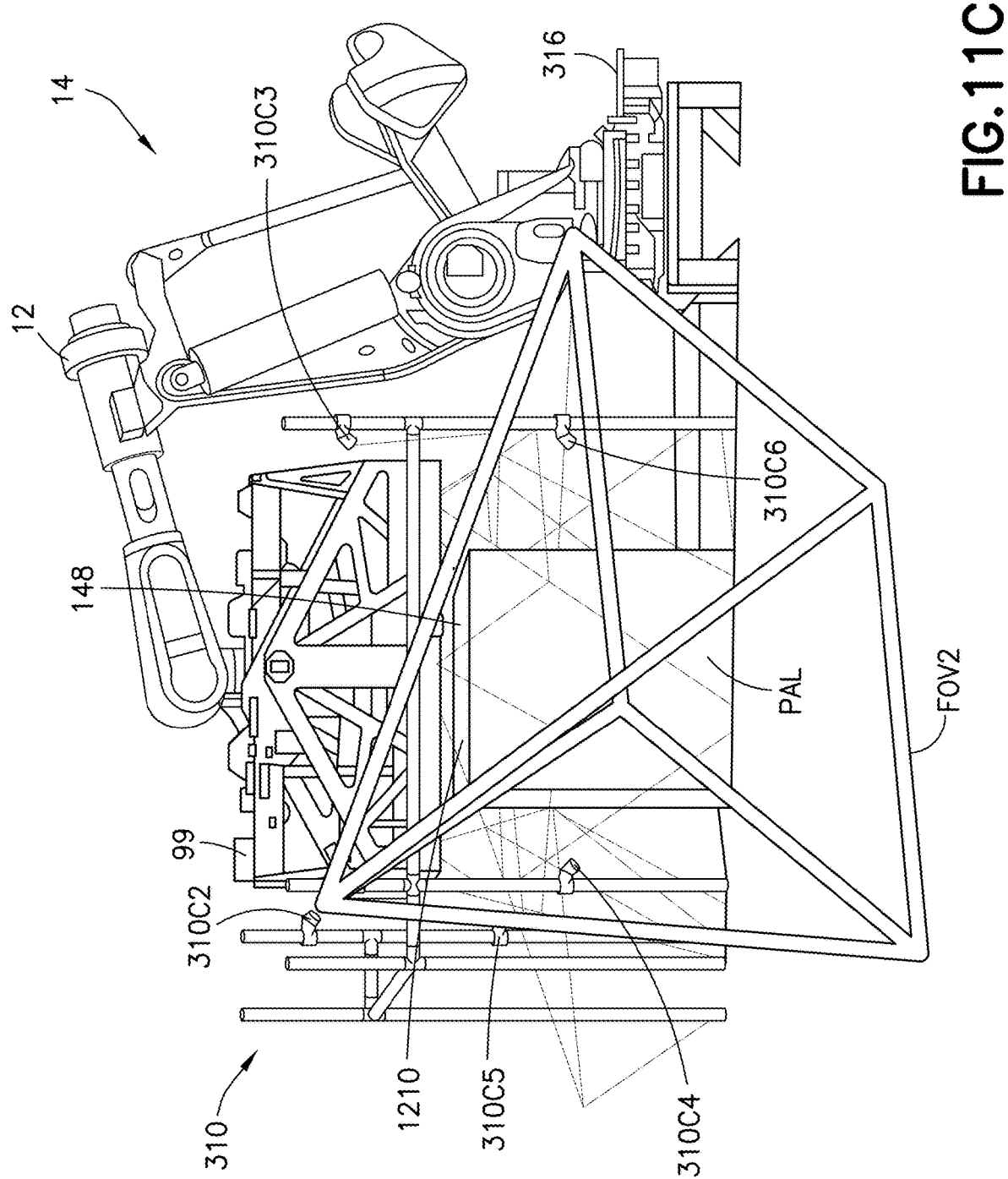
Figure 11D:
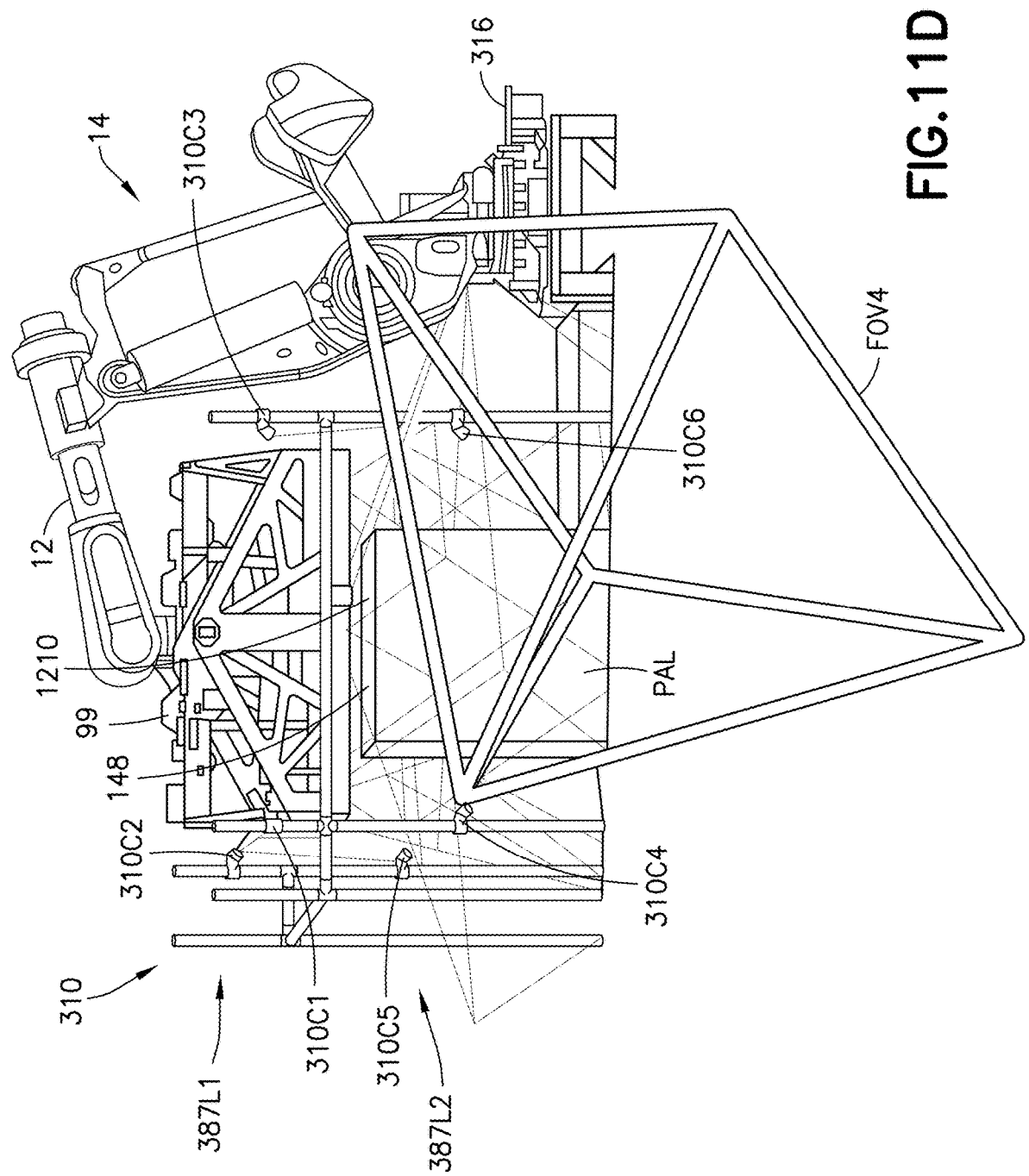
Figure 11E:
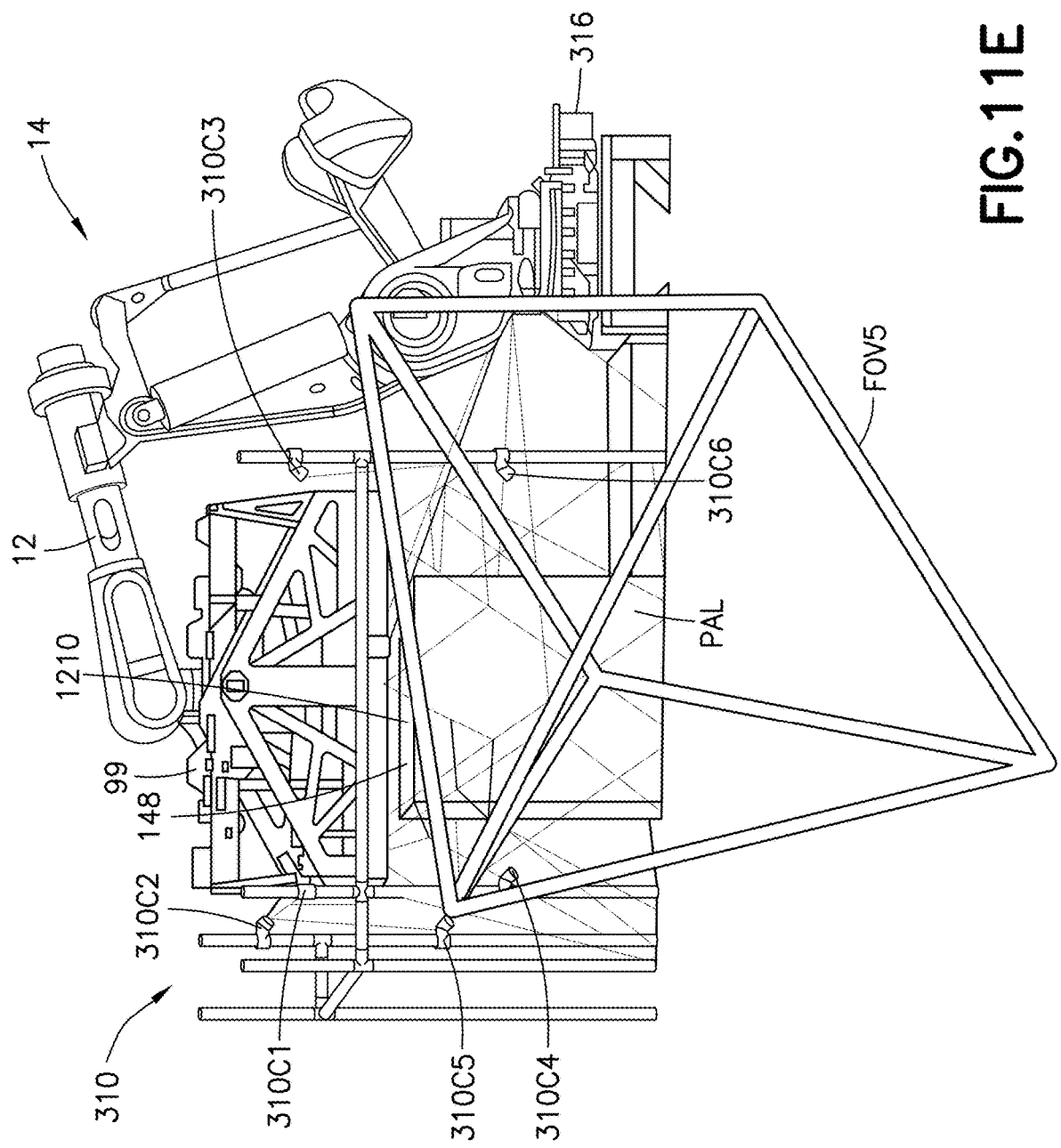

With reference to FIGS. 7, 9A, and 10B, both curtains 26 are defined by a series of metallic rolls 62 that are both slidably and rotatably mounted to the rectangular portions 34 of the frame 20 therebetween. Together, both curtains 26 extend along the full length of the portions 34, each spanning half the length. More specifically, each roll 62 is provided at its longitudinal ends with hub portions 63 (see FIG. 10B) that are received in parallel tracks 64 mounted to the inner face of the frame 20. Each of the four (4) tracks 64 extends along the bottom edge 66 of the rectangular portion 34, from the center thereof to the end of an accurate portion 68 of the tracks 64 that rises towards the triangular portion 38 near the longitudinal end side of the wall 30. The arcuate portions 68 define a curtain receiving portion when the curtains 26 are opened. It is to be noted that, in some Figs., some of the rolls 62 are not shown to alleviate the views.

Each curtain 26 includes at its front end a rotating head 70, which is slidably mounted in the tracks 64 along with the rolls 62 and also rotatably mounted to the tracks 64. The rolls 62, along with the head 70 of each curtain 26, are moved along their respective tracks 64 by an actuator 72. The body 74 of the actuator 72 is secured to the rectangular portion 34 of one of the wall 30 on the outer face thereof, and its rod 76 is fixedly mounted to the head 70 via a mounting bracket 78 (FIG. 7B) for translation of the head 70 in unison with the rod 76 along the track 79, which is attached to the outer face of the rectangular portion 34. When the curtains 26 open, the actuator 72 pushes the heads 70 along the tracks 64 and forces the rolls in the same direction. When the curtains 26 close, the actuator 72 pulls the heads 70 along the tracks 64 in the same direction. The heads 70 are in the form of a plurality of rotatable friction elements 80 extending along the front edge of each curtain 26. The friction elements 80 are in the form of rubber O-rings mounted onto two parallel rolls 82 for rotation thereon in an endless manner. The two rolls 82 are rotatably mounted to the mounting brackets 78 therebetween.

Figure 5:
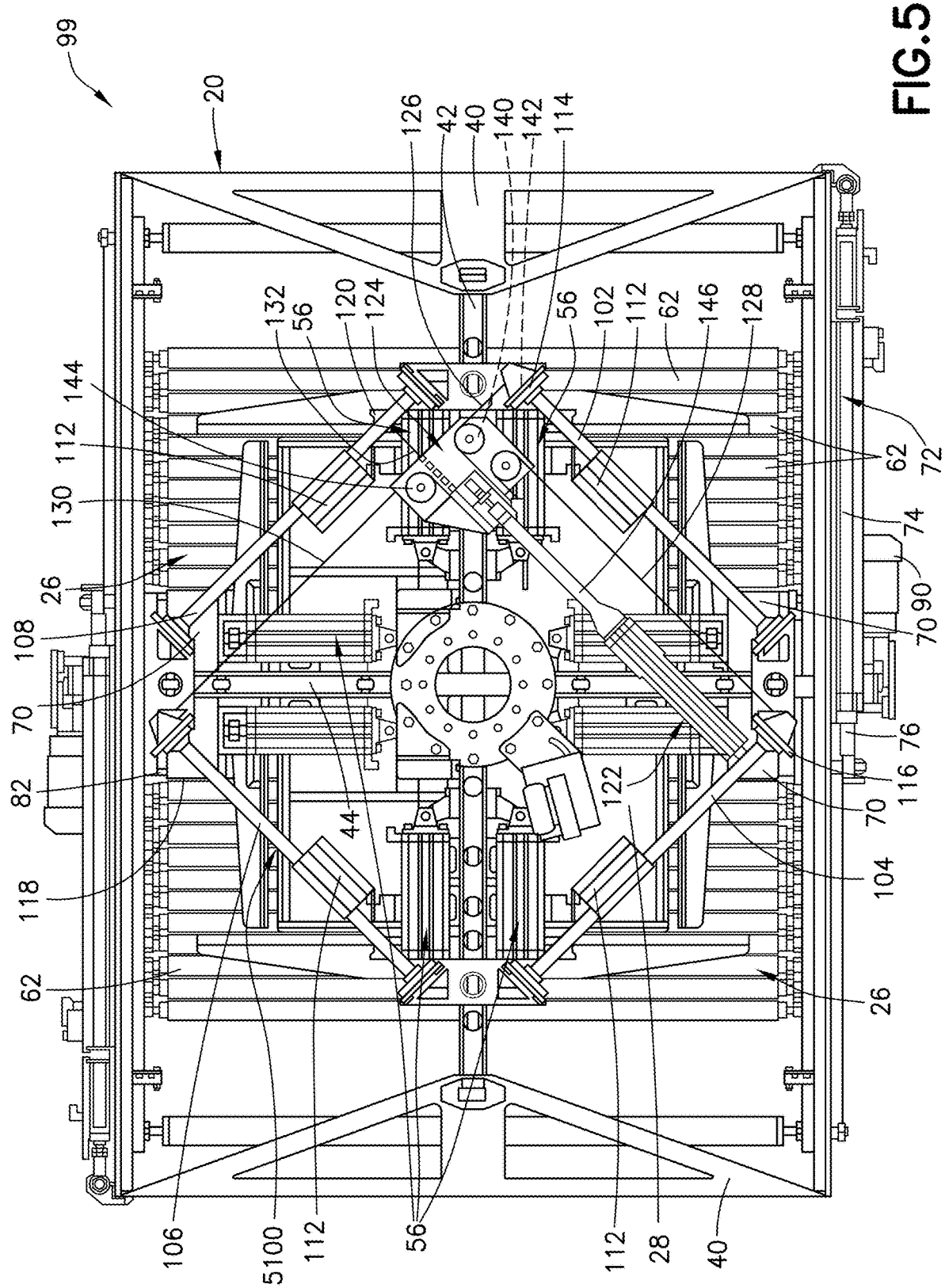
FIG. 5, is a top plan view of the layer depalletizing tool of FIG. 3.

As can be better seen in FIGS. 5 and 7B, the two rolls 82 of each curtain 26 are driven by a respective drive assembly that includes one side chain 84 and a drive 90. The side chain 84 extends along the straight portion of respective tracks 64, and is mounted to a respective driving sprocket 86 and respective driven sprockets 87. Driven sprocket 87 is fixed at the end of each respective roll 82. The drive 90 is secured to the wall portion 34 and operatively coupled to the two chains 84 via a respective one of the driving sprockets 86. The chains 84 are so positioned relative to the two rolls 82 via the sprockets 87 so that rolls 82 and associated chains (or belts) 84 rotate in unison. Rotation of each drive 90 therefore causes the rotation of the friction elements 80. The head 70 can both rotate and slide along the tracks 64 at the same time and independently. An end roll 92 is provided between the two driven sprockets 88 of each curtain 26 to further ease the displacement of the heads 70 along the tracks 64 by linking the chains 85 located at each end of the heads 70 therefore assuring that the heads 70 remain perpendicular to the tracks 64. It is to be noted that elements of the drive assembly, including the chains 84 have been omitted in some drawings to alleviate the views.

Figure 4:
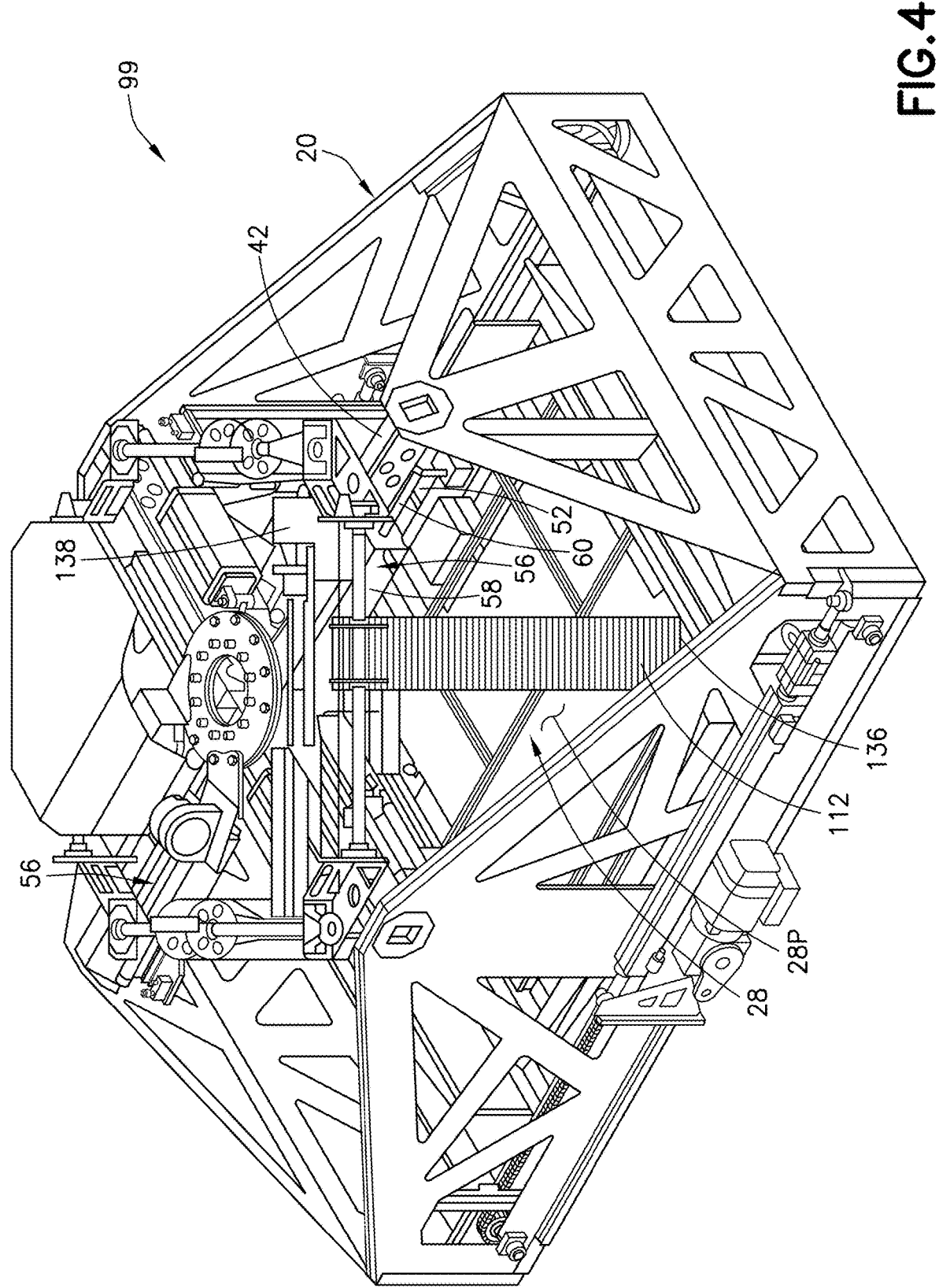
FIG. 4 is a top perspective illustration of a layer depalletizing tool of FIG. 3.

With reference more specifically to FIGS. 4-6, the top pad 28 and its actuating mechanism will now be described. The top pad 28 is in the form of a plate that is movable towards and away from a pallet layer 816 gripped by the clamps 22-24. The top pad 28 is made movable by its mounting to the frame 20 via a pad actuating assembly 5100. The top pad 28 (in the form of the plate) is made of a soft resilient material, such as rubber or plastic, which is reinforced on its non-contacting face with metal tubes. According to other aspects, the top pad 28 is made of another material and/or is not reinforced. The pad actuating assembly 5100 includes four pad holder shafts 102-108 that are rotatably mounted to the frame 20, eight pad holder wheels 6110 mounted in parallel pairs on each of the shafts 102-108, four link elements 112, each secured to both the top pad 28 and the wheels 6110 of a respective shaft 102-108 therebetween, four shaft pulleys 114-120, each one secured near one end of each shaft 102-108, a top pad linear actuator 122 secured to the frame 20, a pulley assembly 124 fixedly mounted to the frame 20, and four cables 126-132, each one operatively coupling a respective shaft pulley 114-120 to the movable end of the actuator 122. The four pad holder shafts 102-108 are rotatably mounted to the hollow tubes 42-44 via four support brackets 134. Together the four shafts 102-108 are relatively positioned end to end in a square configuration. Each of the link elements 112 is secured to a respective pair of wheels 6110 for partial winding thereon and fixedly to the top pad 28 via an attachment 136. The pulley assembly 124 includes a support 138, secured to the hollow tube 42 so as to be positioned at the movable end of the actuator 122, and three (3) intermediary pulleys 140-144 rotatably mounted to the support 138 thereunder. As can be better seen in FIG. 5, the intermediary pulleys 140-144 and the position and orientation of the actuator allows connecting the four shaft pulleys 114-120 to the actuator's rod 146 using the cables 126-132.

In operation, the top pad 28 is raised by causing the actuator 122 to retract its rod 146, thereby simultaneously pulling onto the cables 126-132. This causes the shafts 102-108 to simultaneously rotate, yielding a pulling force onto the link elements 112 that raises the top pad 28. The reverse effect is obtained by extending the actuator rod 146.

As described above, referring to FIGS. 1, 3, and 11A-11F, the palletizer cell 10A includes vision system 310. The vision system 310 includes at least one camera 310C mounted to the palletizer cell 10 independent of the robot 14 so as to maximize throughput of the robot 14 (i.e., a next pallet layer is acquired and analyzed by the vision system 310 while the robot 14 is placing the previously picked pallet layer on conveyor 150). The at least one camera 310C is (or includes) any suitable three-dimensional image sensor configured to generate one or more of a two-dimensional image, a two-dimensional depth map, and a three-dimensional point cloud. In one aspect, the vision system 310 includes one camera 310C; in other aspects the vision system 310 includes three (3) cameras 310C1, 310C2, 310C2; while in still other aspects the vision system 310 includes six (6) cameras 310C1, 310C2, 310C3, 310C4, 310C5, 310C6. In still other aspects, the vision system 310 includes any suitable number of cameras. Where multiple cameras 310C1, 310C2, 310C3, 310C4, 310C5, 310C6 are provided, two or more of the cameras 310C1, 310C2, 310C3, 310C4, 310C5, 310C6 may be arranged in more than one vertical levels 387L1, 387L2 (FIGS. 3 and 11A-11F). For example, in one aspect, cameras 301C1, 31C2, 301C3 are disposed on a common level 387L1 and cameras 301C4, 301C5, 301C6 are disposed on another common level 387L2 so as to be at a different height (e.g., relative to the pallet load PAL) than the cameras 301C1, 31C2, 301C3 so that the multiple cameras 310C1, 310C2, 310C3, 310C4, 310C5, 310C6 are arranged at different heights/levels for imaging the pallet load PAL. In other aspects, the multiple cameras 310C1, 310C2, 310C3, 310C4, 310C5, 310C6 may be disposed at a single level, or arranged in any suitable number of levels. In other aspects, the cameras 310C1, 310C2, 310C3, 310C4, 310C5, 310C6 may also be mounted on a movable platform (independent of the robot arm 14) to raise and/or lower the cameras 310C1, 310C2, 310C3, 310C4, 310C5, 310C6 for imaging of each pallet layer with substantially complete 360° coverage of the pallet load build structure RPAL (as described herein).

In the aspects described herein, the at least one camera 310C is/are positioned to so that three corners of the pallet load PAL are directly within the field(s) of view FOV1-FOV6 of the at least one camera 310C. For example, in one aspect, the cameras 310C1-310C3 on level 387L1 are pointed at three corners while the fourth corner does not have a corresponding camera); in another aspect, the cameras 310C1-310C3 on level 387L1 are pointed at three corners and the cameras 310C4-310C6 are pointed at three corners while the fourth corner does not have a corresponding camera; while in still other aspects the cameras 310C1-310C6 may be arranged so that all four corners of the pallet load PAL are directly within the fields of view FOV1-FOV6.

In one aspect, the at least one camera 310C is disposed so that the respective field of view FOV1-FOV6 of the at least one camera 310C covers the pallet load PAL from an uppermost upward facing surface 148 (FIG. 12) of the pallet load PAL to a bottom of the pallet load. In one aspect, the at least one camera 310C is disposed so that an uppermost upward facing surface 148 (FIG. 12) of each of the pallet layers is within the respective field of view FOV1-FOV6 of the at least one camera 310C. As noted above, the at least one camera 310C may be arranged at a single level, at multiple levels, and/or on a movable platform so that the uppermost upward facing surface 148 (FIG. 12) of each of the pallet layers is within the respective field of view FOV1-FOV6 and/or the respective field of view FOV1-FOV6 covers the pallet load PAL from an uppermost upward facing surface 148 (FIG. 12) of the pallet load PAL to a bottom of the pallet load.

It is noted that each camera 310C1-310C6 is arranged so as to be at about a 45° vertical angle (or other suitable vertical angle that is more or less than about)45° and at about a 45° horizontal angle (or other suitable horizontal angle that is more or less than about 45°) relative to the pallet load PAL so as to provide, within the fields of view FOV1-FOV6, the pallet top surface 148 as well as all four outermost vertical (lateral) sides (or at least more than three vertices/corners formed by intersections of the lateral sides) of the pallet load PAL (e.g., even in aspects where only three corners are directly within the fields of view FOV1-FOV6); while in other aspects, the each camera of the at least one camera 310C may be arranged at any suitable vertical and/or horizontal angle relative to the pallet load PAL. Placing the cameras at different heights (e.g., at the different levels 387L1, 387L2) provides for imaging different portions of the pallet load with each level of cameras (e.g., the lower level 387L2 may image a lower half of the pallet load PAL while the upper level 387L1 may image an upper half of the pallet load PAL); while in other aspects a single level of cameras may image the entire pallet load PAL from top to bottom. In one aspect the at least one camera 310C (such as for example cameras 310C1-310C6) may have any suitable focal length for a predetermined image intensity. In one aspect, respective field(s) of view FOV1-FOV6 (see FIGS. 11A-11F which illustrate each of the fields of view with emphasis relative to the other fields of view) of each of the at least one camera (such as for example cameras 310C1-310C6) may be about a 45° field of view; while in other aspects the respective field(s) of view FOV of the at least one camera 31C may be more or less than about 45° so long as three corners of the pallet load PAL are directly within the fields of view FOV1-FOV6 of the cameras. In some aspects, an attribute of the respective field(s) of view of each of the at least one camera 310C is the same (e.g., each camera has about a 45° field of view); while in other aspects the attribute of the respective field(s) of view may be different for one or more of the at least one camera 310C (e.g., one or more cameras may have a field of view that is different than about)45°.

The at least one camera 310C is coupled to, informs, and enables the cell controller 10C to issue movement commands to the robot arm 12 (or the robot 14 in general) so as to guide the robot arm 12, for example with real time (or near real time) command inputs (based on commanded transaction time as noted herein) that are responsive, in real time to pallet load variances so that the robot arm 12 is adaptive in real time resolving pallet load build variances that affect depalletizing. For example, the at least one camera 310C enables the cell controller 10C to issue commands to the robot arm 12 for moving and guiding the layer depalletizing tool 99 to the pallet layer PL1, PL2, PL3, PL4, PL5. As described herein, the vision system 310 provides (or otherwise effects determination of) the position (X, Y, Z in the robot coordinate system or reference frame) and/or orientation (RX, RY, RZ in the robot coordinate system or reference frame) of the top pallet layer (such as layer 816). In one aspect, the vision system 310 provides (or otherwise effects determination of) a length L and width W of the top layer (see FIG. 12).

The commands (based on image data from the at least one camera 310C) issued by the cell controller 10C effect positional/spatial adjustment of the layer depalletizing tool 99 in multiple degrees of freedom (e.g., planar degrees of freedom as well as rotation degrees of freedom) relative to the pallet layer PL1, PL2, PL3, PL4, PL5 to accommodate skewed pallet layers (e.g., pallet layers that are rotated relative to the pallet support SPAL and/or other pallet layers), offset pallet layers (e.g., pallet layers that have edges that overhang virtual vertical pallet planes/boundaries established the peripheral edges of the pallet support SPAL), open case units CU (e.g., case units such as cardboard boxes where one or more flaps of the box are open), out of tolerance pallet loads/layers, incomplete layers (e.g., missing case units), etc. The vision system 310 is configured to provide data to the cell controller 10C so as to effect guidance and positioning of the layer depalletizing tool 99 to a pick position and orientation that is optimal (e.g., compared to other possible pick positions and orientations) for picking a top layer of the pallet based on an actual position and orientation of the top layer in the robot coordinate system/reference frame (the terms coordinate system and reference frame are used interchangeably herein).

The commands (based on image data from the at least one camera 31C) issued by the cell controller 10C also effect obstacle avoidance such as, for example: where an unexpected object is positioned within or otherwise enters the palletizer cell 10A, where edges or sides of the pallet load PAL are at a substantially same height as the layer depalletizing tool 99 or other portion of the robot 14, where the pallet load PAL is adjacent a robot exclusion zone (e.g., predefined areas within the palletizer cell 10 in which the robot 14 is not allowed to enter), etc. The visions system 310 is configured to detect the unexpected object, the sides/edges of the pallet load PAL, distances between the pallet load PAL and the robot exclusion zones, etc. and send data signals to the cell controller 10C so that the cell controller 10C commands the robot arm 12 to move the layer depalletizing tool 99 around the unexpected object, around the sides of the pallet load, between the pallet load PAL and the robot exclusion zone (or other obstacle adjacent the pallet load PAL), and/or in any other suitable manner for picking the pallet layer pL1, PL2, PL3, PL4, PL5; or in other aspects commands the robot arm 12 to stop moving.

As noted above, the cell controller 10C (or other suitable controller such as the robot controller 316) receives image data (such as from the two-dimensional image, the two-dimensional depth map, and/or the three-dimensional point cloud) from the vision system 310 for analysis of the image data so as to detect the pallet, pallet layers, and/or analyze the features thereof. As also noted above, the image data provided to the cell controller 10C is provided in the coordinate system or reference frame of the robot 14, where the vision system 310 is calibrated to/registered with the coordinate system or reference frame of the robot 14. It is noted that each camera 310C1-310C6 is intrinsically calibrated to its own coordinate system (i.e., each camera knows the depth of an object from the respective image sensor of the camera). Where multiple cameras 310C1-310C6 are employed, in one aspect, calibration of the vision system 310 includes calibration of the cameras 310C1-310C6 to a common base reference frame and calibration of the common base reference frame to the robot reference frame; while in other aspects, where one or multiple cameras are employed, the reference frame of the one camera or the reference frame of one or more cameras 310C1-310C6 may be individually calibrated to the robot reference frame.

Figure 13A:
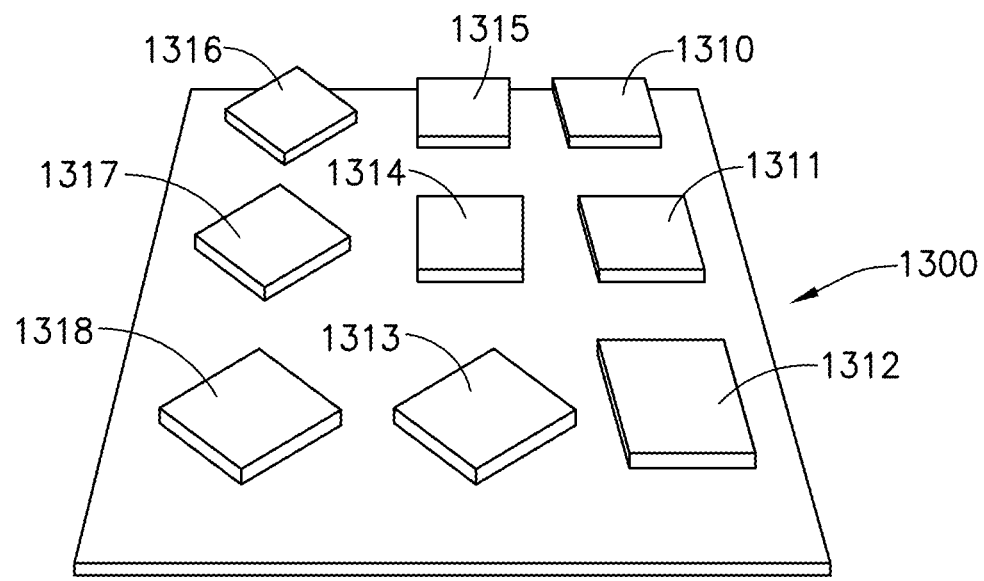
FIG. 13A is an exemplary calibration jig/fixture for the vision system of FIG. 3 in accordance with aspects of the present disclosure.
Figure 13B:
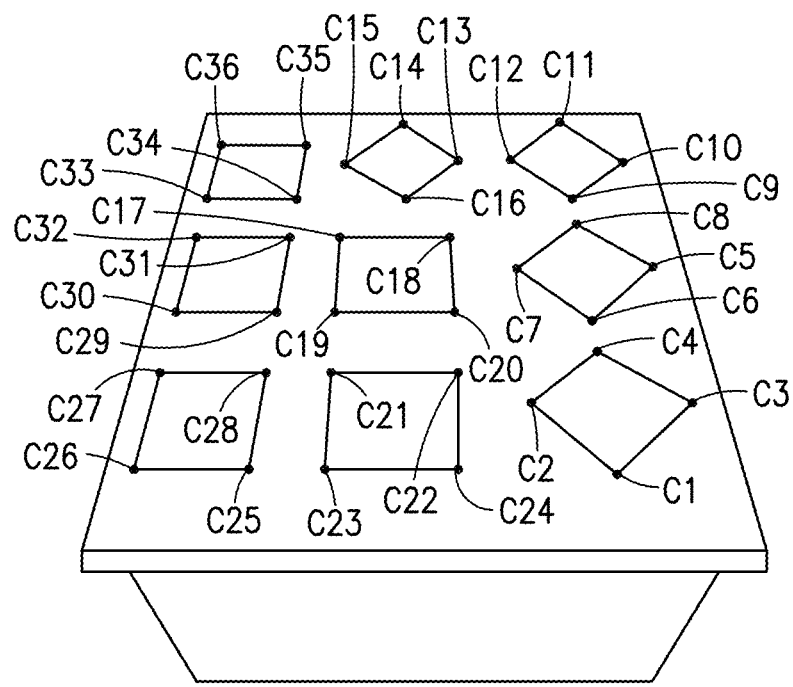
FIG. 13B is an exemplary image of the calibration jig/fixture of FIG. 13A captured by the vision system in accordance with aspects of the present disclosure.

For exemplary purposes only, referring to FIGS. 3, 13A, and 13B, calibration of the cameras 310C1-310C6 to the common base reference frame includes identifying and applying a translation between the respective reference frames of each camera(s) 310C1-310C6 so that the respective reference frame of each camera 310C1-310C6 is translated (or referenced) to a common base reference frame that may be the reference frame of a single camera or any other suitable base frame of reference to which each camera 310C1-310C6 may be related to so as to form the common base reference frame collectively for all cameras of the vision system. For example, the reference frame for camera 130C1 (although any of the cameras may be used) represents the common base reference frame. The translation (i.e., a rigid translation in six degrees of freedom) is determined for each of the coordinate systems/reference frames for the other cameras 310C2, 310C3, 310C4, 310C5, 310C6 with respect to the reference frame of camera 310C1 so that image data from cameras 310C2, 310C3, 310C4, 310C5, 310C6 is correlated or translated into the reference frame of camera 130C1. This calibration of the cameras 310C1, 310C2, 310C3, 310C4, 310C5, 310C6 may be performed with a calibration jig/fixture 1300 (also referred to as a common camera calibration reference structure) that is placed at the pallet unloading/loading station 301. As described herein, each of at least one camera 310C1, 310C2, 310C3, 310C4, 310C5, 310C6 is calibrated to the common camera calibration reference structure, and calibration to the common camera calibration reference structure, describes a positional relationship of a respective camera reference frame of each respective camera 310C1, 310C2, 310C3, 310C4, 310C5, 310C6 with each other camera 310C1, 310C2, 310C3, 310C4, 310C5, 310C6 of the at least one camera, and with a predetermined reference frame (as described herein) of the robot 14.

The calibration fixture 1300 includes uniquely identifiable three-dimensional geometric shapes 1310-1319 (in this example, squares, some of which are rotated relative to others) that provide the calibration fixture 1300 with an asymmetric pattern and that constrain the determination/translation of the reference frames of the cameras (e.g., from each camera) to the common base reference frame and the translation between the common base reference frame and the robot reference frame as will be further described so as to determine relative pose of the pallet layer to the grip interface. The calibration fixture 1300 shown and described herein is exemplary and any other suitable calibration fixture may be employed in a manner similar to that described herein. For exemplary purposes, each of the three-dimensional geometric shapes 1310-1319 are of a predetermined size that constrains the identification of corners or points C1-C36 of the three-dimensional geometric shapes 1310-1319 and the translation is such that the distance between the corresponding corners C1-C36 are minimized (e.g., the distance between the respective corners C1-C36 in the reference frame of camera 310C1 is minimized with respect to each of the respective corners C1-C36 identified in the reference frames of each camera 310C2-310C6).

Each of the three-dimensional geometric shapes 1310-1319 are simultaneously imaged (i.e., three-dimensional geometric shapes 1310-1319 are each at a single location in the common base reference frame during imaging by all cameras whose reference frames are to be calibrated to the common base reference frame) and is uniquely identified by each of the cameras 310C1-310C6 at the single location so that the points/corners C1-C36 of the three-dimensional geometric shapes 1310-1319 identified in the images (one exemplary image is illustrated in FIG. 13B) are identified by the vision system 310 (in any suitable manner, such as in the manner described herein with respect to the pallet layer corner PC1-PC4 determination) and are uniquely determined independent of calibration fixture orientation. It is noted that the uniquely identified corners C1-C36 are located in a single location, in the robot reference frame that is common to all cameras when an image set is taken, that corresponds to each set of images taken by the cameras 310C1, 310C2, 310C3, 310C4, 310C5, 310C6 (an image set being a collection of images taken by each of the cameras for a given location of the calibration fixture or pallet load). The corners C1-C36 identified in each image of the image set are compared between images to define the translation for each camera reference frame to the common base reference frame (which in one example may correspond with or is otherwise defined by the reference frame of camera 310C1). It is noted that the calibration fixture 1300 is configured so as to identify points throughout the working volume (which corresponds to dimensions of pallet loads PAL) of the pallet unloading/loading station 301. For example, the three-dimensional geometric shapes 1310-1319 may span an X-Y plane of the pallet unloading/loading station 301 and the calibration fixture may be imaged at varying heights throughout the working volume of the pallet unloading/loading station 301.

Upon registration of all cameras 310C1-310C6 to the common base reference frame, the common base reference frame (or the reference frame of one or more cameras individually) is translated (e.g., registered) to the robot reference frame (X, Y, Z, RX, RY, RZ) by mounting the calibration fixture 1300 (or similar fixture) to the robot 14. The calibration fixture may be mounted to the robot 14 so that the three-dimensional geometric shapes 1310-1319 (and the corners C1-C36 thereof) have a known predetermined spatial relationship (e.g., location, planarity, orientation, etc.) with respect to the grip engagement interface (FIG. 8B) of the grip 800 (or other suitable reference datum or location of the robot 14). The robot 14 may be commanded to move (with the calibration fixture 1300 held thereby) in a predetermined motion along one or more of the X, Y, Z axes while being imaged by one or more of the cameras 310C1, 310C2, 310C3, 310C4, 310C5, 310C6. The cell controller 10C may compare the identified corners C1-C36 in the images obtained with the vision system 310 with, for example, encoder data (describing the motion path of the robot 14, i.e., the fixture motion effected by the robot 14) and generate from the images (based on the common base reference frame) the planar orientation and location (in the six degrees of freedom—pose and orientation) of the identified corners C1-C36 relative to the grip engagement interface (FIG. 8B) of the grip 800 (or other suitable reference datum or location of the robot 14). The generated planar orientation and location (in the six degrees of freedom—pose and orientation) of the identified corners C1-C36 relative to the grip engagement interface (FIG. 8B) of the grip 800 (or other suitable reference datum or location of the robot 14) characterizes the relationship between the image field of the common base reference frame and the reference frame of the robot 14 so that the locations of the corners C1-C36 in the vision system images are calibrated to the robot reference frame. The above-described calibration may be performed once at the commissioning of the palletizing cell 10 or at any suitable time intervals (or each initialization of the robot 14 such as after power shut down) and allows the image data of the vision system 310 to be represented in the same coordinate system/reference frame as the robot 14.

In one aspect, the at least one camera 310C resolves three-dimensional definition of case unit features (e.g., edges and corners of the case units) from two or more orthogonal planes so that a maximum certainty of feature pose (e.g., the X, Y, Z, RX, RY, RZ positions of the pallet layer or features of the calibration fixture 1300—see FIGS. 11A-11F and 12) is obtained from a single image of items in the respective field(s) of view FOV1-FOV6 of the at least one camera 310C. Here the resolution of the three-dimensional definition of pallet layer(s) and/or features of the calibration fixture 1300 is/are independent of camera 310C placement and is performed in real time (e.g. within the pick/place cycle of the at least one robot 14).

While six (6) cameras 310C1-310C6 are described, it should be understood that more or less than six (6) cameras 310C1-310C6 may be used and placed so that the field of view of the camera(s) 310C1-310C6 of the vision system 310 cover(s) the pallet unloading/loading station 301 of the palletizing cell 10, a pallet support SPAL seated on the pallet unloading/loading station 301, and a whole (or at least a predetermined part) of the expected pallet load build structure RPAL at the pallet unloading/loading station 301, so as to capture, with any suitable desired resolution, three-dimensional time of flight images of object(s) desirably everywhere on the pallet load build structure RPAL. The combined field(s) of view FOV1-FOV6 result in substantially complete 360° coverage of the pallet load build structure RPAL with overlap of the field(s) of view FOV1-FOV6. For example, the combined field(s) of view FOV1-FOV6 may cover standard pallet supports SPAL (having dimensions of, e.g., 48 inches by 48 inches, 48 inches by 40 inches, and/or 36 inches by 36 inches), it should be understood that the camera(s) 310C1-310C6 and associated field(s) of view FOV1-FOV6 may cover (e.g., image) larger fields (including, for example, truck beds or any desired field size) as appropriate. Further, the field(s) of view FOV1-FOV6 may cover any suitable pallet load build structure RPAL height PH (see FIG. 2) such as, for example, heights of 60 inches, 70 inches and 80 inches; while in other aspects the field(s) of view FOV1-FOV6 may cover heights less than 60 inches or more than 80 inches.

In one aspect, each of the camera(s) 310C1-310C6 may have a 176 pixel×132 pixel resolution; while in other aspects each, or one or more, of the camera(s) 310C1-310C4 may have a higher resolution (e.g. a 320 pixel×240 pixel resolution or higher), as desired to provide a desired minimum depth map defining about 0.5 inches at the outermost bounds of the pallet build three-dimensional space (so that the depth map definition throughout the captured image of the whole, or predetermined part, of the pallet support/pallet build is not less than about 0.5 inches). As such, a sufficient resolution is provided by the vision system 310 to resolve features of at least the top surface 148 pallet load PAL so that planarity across the top surface 148 of the pallet load PAL is determined and fully established for decommissioning the pallet layers PL1-PL5 from the pallet load PAL. Sufficient resolution may also be provided to resolve case unit features (e.g., such as case edges) so that planarity across a top of each layer PL1-PL5 (see FIG. 2) is determined and fully established for decommissioning the layers PL1-PL5. The resolution of the camera(s) 310C1-310C6 may be such that minimal processing is required to resolve the case unit features (e.g., case unit edges and corners of the pallet layer) such that the case unit features are resolved in real time substantially from the images as received by the cell controller 10C. For example, the corners PC1-PC4 of each pallet layer PL1-PL5 may be determined by imaging at least the top surface 148 of the respective pallet layer with the vision system 310 and determining the locations of the corners PC1-PC4 of the pallet layer PL1-PL5 in any suitable manner such as by, for example, the Ramer-Douglas-Peucker algorithm, see "An iterative procedure for the polygonal approximation of plane curves" published in *Computer Graphics and Image Processing*, Volume 1, Issue 3, November 1972, Pages 244-256; "The Contours, Corners and T-Junctions Detection Algorithm" by Buades et al., published in *Image Processing Online*, Feb. 27, 2018, ISSN 2105-1232, © 2018, or in any other suitable manner such as the manners described in Suraya Abu Bakar, Muhammad Suzuri Hitam and Wan Nural Jawahir Hj. Wan Yussof, 2017. "Improved Global and Local Curvature Properties for Shape Corner Detection", *Journal of Applied Sciences*, 17: 458-466; "The Comparison and Application of Corner Detection Algorithms", Jie Chen et al., *Journal of Multimedia*, Volume 4, No. 6, December 2009; and "Robust Corner Detection by Image-Based Direct Curvature Field Estimation for Mobile Robot Navigation", Sungho Kim, *International Journal of Advanced Robotic Systems*, 2012, Volume 9, 187: 2012, DOI: 10.5772/53872; the disclosures of which are incorporated herein by reference in their entireties.

Figure 8B:
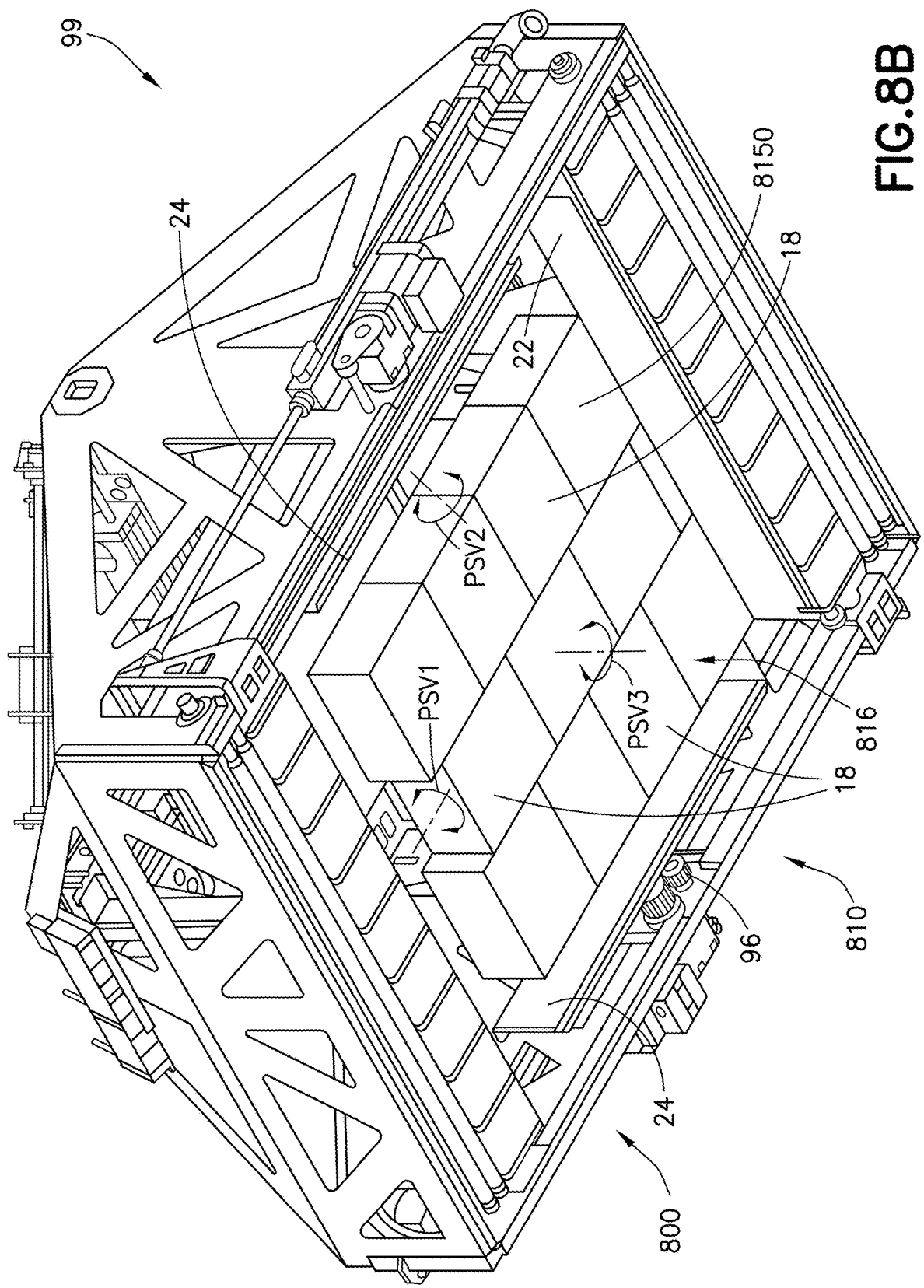

Referring now to FIGS. 3, 2, 8B, and 12, in one aspect, the cell controller 10C is configured so as to determine, in real time, from the corresponding real time three-dimensional imaging data, a layer planarity variance PSV1, PSV2 of the pallet layer PL1-PL5 being decommissioned relative to the grip engagement interface 810 (FIG. 8B) of the grip 800 (FIG. 8). The cell controller 10C is also configured to generate, in real time, an articulated robot motion signal dependent on at least the real time determined layer planarity variance PSV1, PSV2 where the articulated robot motion signal is generated in real time so as to be performed real time by the at least one articulated robot 14 between placement, by the at least one articulated robot 14, of one decommissioned pallet layer PL1-PL5 and a serially consecutive decommissioned pallet layer PL1-PL5 enabling substantially continuous decommissioning of the pallet load PAL. In one aspect, the at least one articulated robot motion signal generated by the cell controller 10C is a stop motion signal along a pick/place path 399, 1580 of the at least one articulated robot 14, a slow motion signal along the pick/place path 399, 1580 of the at least one articulated robot 14, or a move to a safe position along safe stop path 398 of the at least one articulated robot 14, where the safe stop path 398 is different from the pick/place path 399, 1580. In one aspect, the articulated robot motion signal generated by the cell controller 10C is a pick position signal setting a pick position of the layer depalletizing tool 99 based on the layer planarity variance PSV1, PSV2 of the pallet layer PL1-PL5 being decommissioned.

The cell controller 10C is configured so as to determine, in real time, from the corresponding real time three-dimensional imaging data, layer planarity variance PSV1, PSV2, and position of the pallet layer PL1-PL5 as well as the layer pose PSV3 (RZ) and position (X, Y) being decommissioned, where for example, the vision system 310 images the top surface 148 of the layer PL1-PL5 to obtain a three-dimensional image of the top layer of the pallet load PAL with sufficient definition to discern the sides, corners, and planarity of the top surface 148 of the top pallet layer as described above. Here the pallet support variance PSV1, PSV2 may be one or more of unevenly spaced case units CU (e.g., spaces between case units CU in the pallet layer forming peak/valleys in a case unit seat surface—FIG. 9A), missing case units CU in the pallet layer, height differences (e.g., protrusions and/or depressions—FIG. 9A)) or any other defect in the pallet layer that may affect the gripping of the pallet layer by the layer depalletizing tool 99. In one aspect, the cell controller 10C is configured to reject the pallet layer pick if the pallet support variance PSV1, PSV2 exceeds thresholds from a predetermined reference such as a plane define by the top pad 28 (and send stop bot signal until replaced). For example, if the missing case units CU of the pallet layer are greater than a predetermined area or if the spacing between case units CU in the pallet layer is greater than a predetermined distance, the pallet layer pick is rejected and the pallet layer will not be picked until the defects in the pallet layer are resolved (such as by manual intervention). If the pallet layer is within the predetermined thresholds, the cell controller 10C is configured to resolve a pallet layer planar variance (e.g., the position of pallet layer in the three-dimensional robot space X, Y, Z, RX, RY, RZ) and confirm or modify (compensates) planned robot pick/place path based on the above-noted variances for adaptive pose of the layer depalletizing tool 99 with higher resultant pallet layer pick probability. The controller may also identify a reduced robot 14 movement speed or modify a robot 14 place path 399, 1580 and the respective path trajectory (FIG. 3) to generate a desired layer depalletizing tool 99 pick pose (e.g., position in the three-dimensional space X, Y, Z, RX, RY, RZ).

In one aspect, the cell controller 10C is configured to set a pallet layer datum DTM (FIG. 12) of the pallet layer, imaged by the at least one three-dimensional camera 310C, from the pallet support variance PSV1, PSV2, which pallet layer datum DTM resolves local surface variance at each different article unit place location in the pallet layer and defines a real time position base reference for articulated robot 14 pick of the at pallet layer. In one aspect, the pallet layer datum DTM defines planarity of the top surface 148 of the pallet layer.

Figure 12:
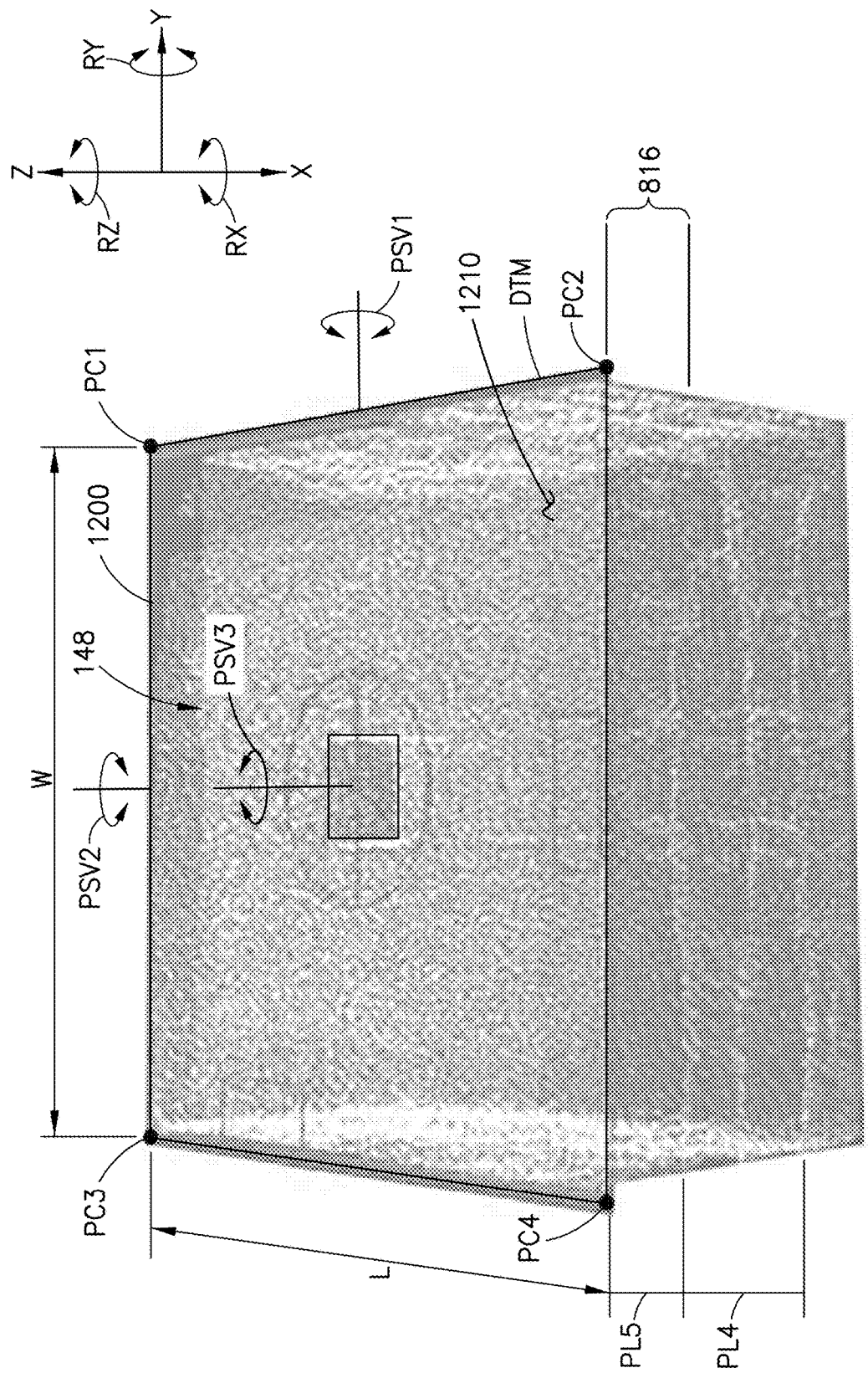
FIG. 12 is an exemplary image captured by the vision system of the palletizer cell of FIG. 3 in accordance with aspects of the present disclosure.
Figure 14:
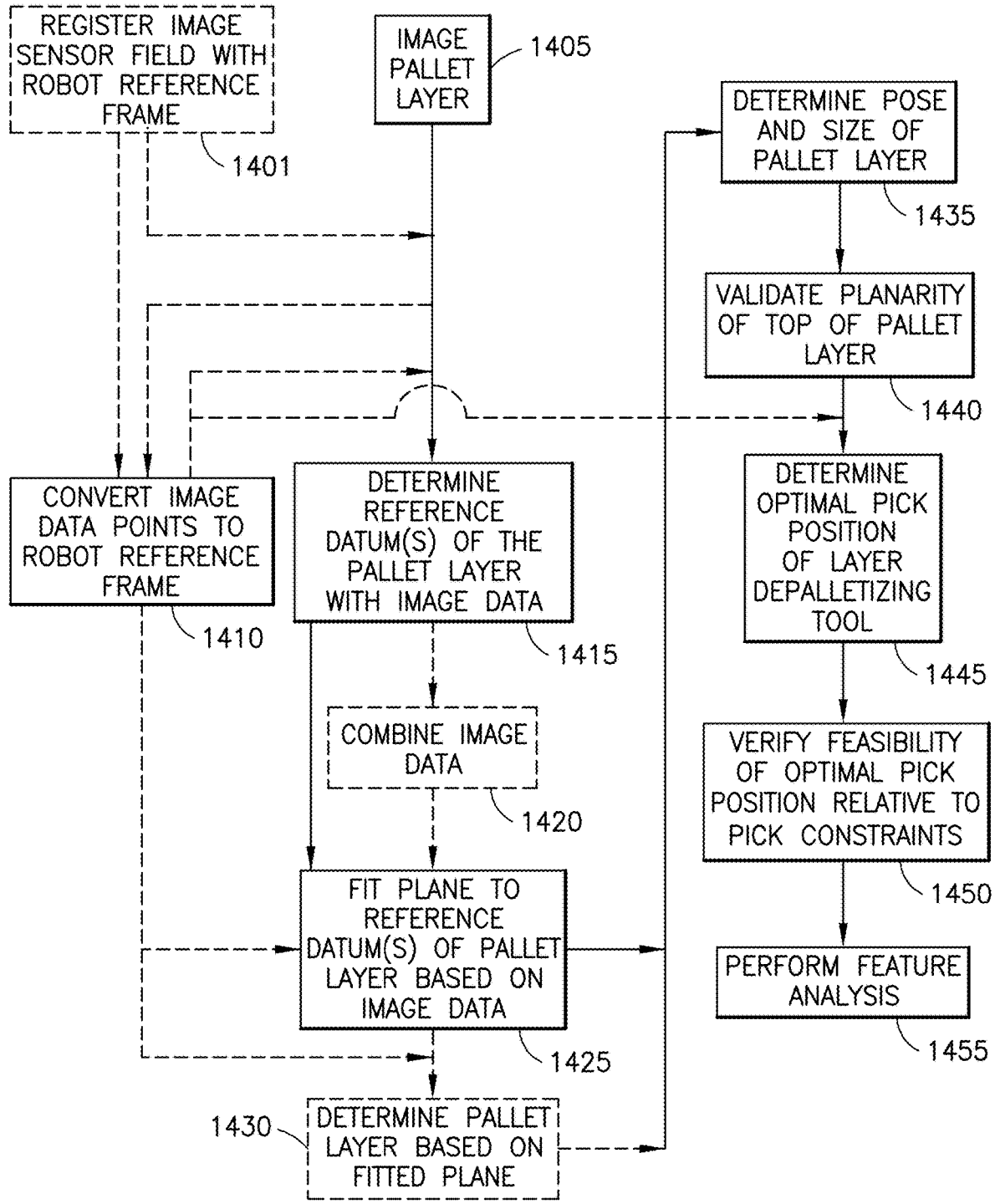
FIG. 14 is an exemplary flow diagram of a method in accordance with aspects of the present disclosure.

Referring to FIGS. 3, 12, and 14, an exemplary operation of the palletizer cell 10 in a depalletizing configuration will be described. It is noted, with reference to FIG. 14 the operational blocks described therein do not necessarily prescribe a particular order of operation and the operations identified by the operational blocks may be performed in any suitable order. For example, blocks 1401 and 1410 may be performed at any time prior to determining robot 14 pick paths/trajectories.

In operation of the palletizer cell 10, the pallet load PAL is transported and positioned on the unloading/loading station 301 in any suitable manner (such as described above). In the exemplary operation of the palletizer cell 10, the image sensor or camera 310C field is optionally registered with the robot reference frame (X, Y, X, RX, RY, RZ) (FIG. 14, Block 1401) as described herein at any suitable time before and/or during the palletizer cell 10 operation. The pallet load PAL is imaged by the at least one camera 310C so that an image of the top surface 148 of the top pallet layer 816 is captured (FIG. 14, Block 1405). The image data from each of the at least one camera 310C is converted from the respective camera reference frames to the robot 14 reference frame (FIG. 14, Block 1410), such as in the manner described herein. It is noted that, in one aspect, the registration of the camera 310C field of view is optionally performed as part of the operation prior to conversion of the camera image data to the robot 14 reference frame. It is also noted that the conversion of the camera image data to the robot 14 reference frame may be performed at any suitable time prior to determination of robot 14 pick trajectories, such as at the exemplary times noted in FIG. 14. Reference datum(s) of the pallet layer are determined based on the image data (FIG. 14, Block 1415) in the camera 310C reference frame and/or the robot reference 14 reference frame. The reference datum(s) of the pallet are any suitable geometric features of the pallet (e.g., corners of the pallet layer, corners of case units in the pallet layer, outermost sides of the pallet layer, vertices of the outermost sides, orthogonality of the outermost sides, position of the sides, etc.) that identify or otherwise define the pose and position of the pallet in the camera 310C reference frame and/or the robot 14 reference frame. For example, in one aspect, the reference datum(s) are the corners PC1-PC4 of the pallet layer 816, where the corners PC1-PC4 are determined in one or more of the camera 310C reference and the robot 14 reference frame by the cell controller 10C in any suitable manner (such as described above with any suitable image analysis corner finding algorithm) based on the image data obtained by the at least one camera 310C. In one aspect, the corners PC1-PC4 of the pallet layer are determined from the image data of each of the at least one camera 310C separately; while in other aspects the image data from the cameras may optionally be combined (FIG. 14, Block 1420) for determining the corners of the pallet layer. For example, where the image data from the at least one camera 310C are combined, a single point cloud 1270 of at least part of the pallet load PAL including the pallet layer 816 is generated by combining, with the cell controller 10C, the image data from each of the at least one camera 310C.

The cell controller 10C is configured to fit a plane 1200 to the reference datum(s) of the pallet layer based on the image data from one or more of the at least one camera 310C (FIG. 14, Block 1425) in any suitable manner, such as with the random sample consensus (RANSAC) algorithm, organized segmentation algorithms (or other suitable algorithm for segmentation of organized point cloud data), or any other suitable algorithm. In one aspect, the plane 1200 corresponds with and defines the top surface 148 of the pallet layer 816 in the camera 310C reference frame and/or the robot 14 reference frame. In one aspect, the location of the corners PC1-PC4 of the pallet layer 816 in the robot reference frame may optionally be verified by determining the location of the corners PC1-PC4 (FIG. 14, Block 1430) with the cell controller 10C by projecting the single point cloud 1270 onto the plane 1200. With the cell controller 10C, the pose PSV3 and size (length L and width W) of the pallet layer 816 is determined (FIG. 14, Block 1435) from the image data from one or more of the at least one camera 310C in any suitable manner such as by any suitable blob analysis technique (center of gravity, principal axis, minimum Feret etc.).

With reference datum(s) (which in this example are the corners PC1-PC4, and hence the length L and width W) being accurately known based on the above operations, and with the plane 1200 being established and representative of the top surface 148 of the pallet layer 816, the cell controller 10C validates the planarity of the top surface 148 of the pallet layer 816 (FIG. 14, Block 1440) with respect to a plane 28P (e.g., defined by the top pad 28) of the grip engagement interface 810. The validation of the planarity of the top surface 148 may be performed by the cell controller 10C using any suitable image analysis thresholding techniques and determines whether the layer depalletizing tool 99 is able to pick the pallet layer 816. For example, a planarity deviation of the plane 1200 relative to plane 28P that exceeds a predetermined threshold (e.g., in one aspect the deviation may be up to about 5° or up to about 10° about the X and/or Y axis; while in other aspects the deviation may be greater than about) 10° precludes picking of the pallet layer 816 by the layer depalletizing tool 99. Where the pallet layer 816 cannot be picked by the layer depalletizing tool 99, the cell controller 10C is configured to issue any suitable aural and/or visual alert to an operator for resolving the pallet layer pick.

Figure 15A:
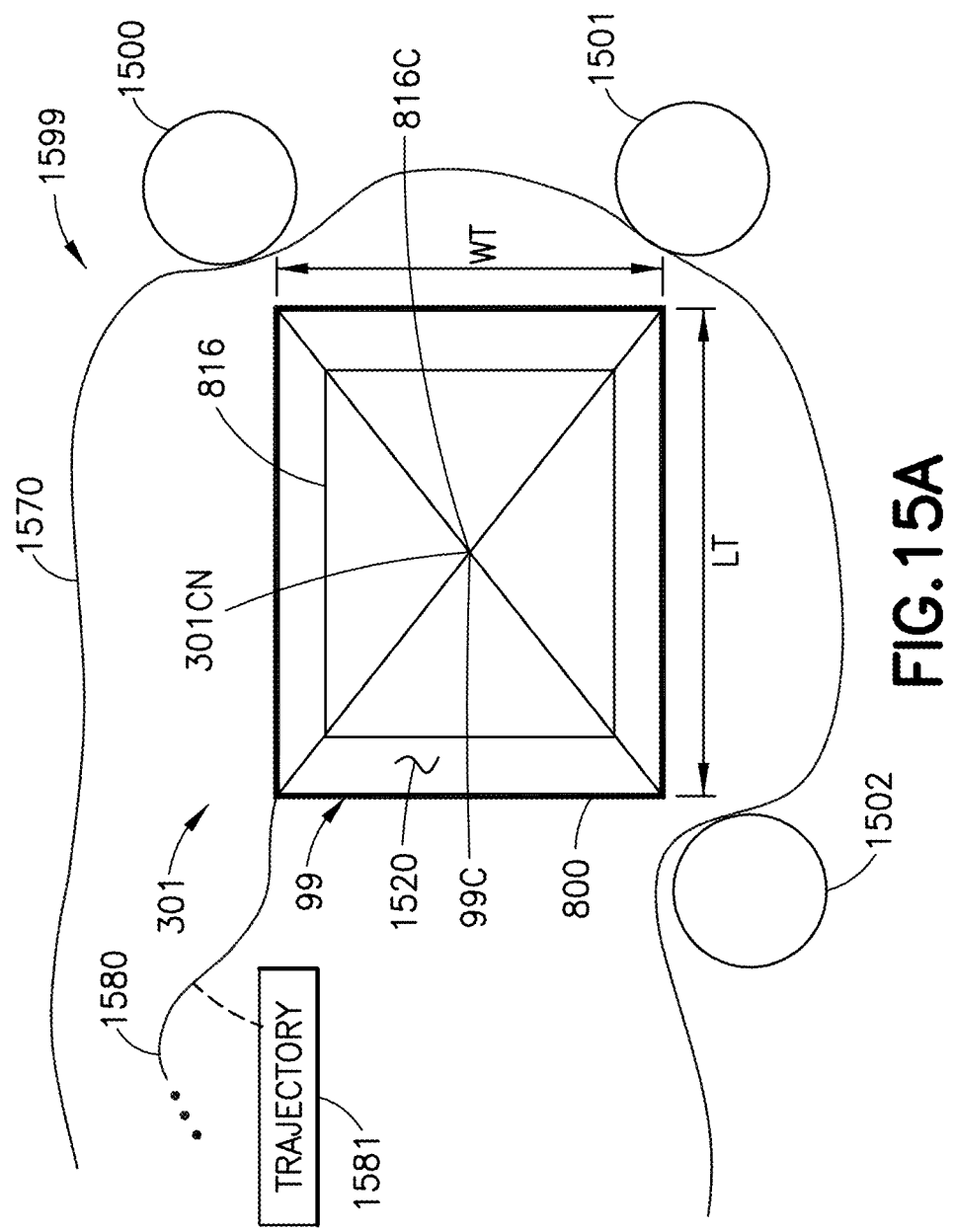
FIGS. 15A-15D illustration exemplary positions of the layer depalletizing tool of FIG. 3 relative to a pallet layer to be picked in accordance with aspects of the present disclosure.
Figure 15B:
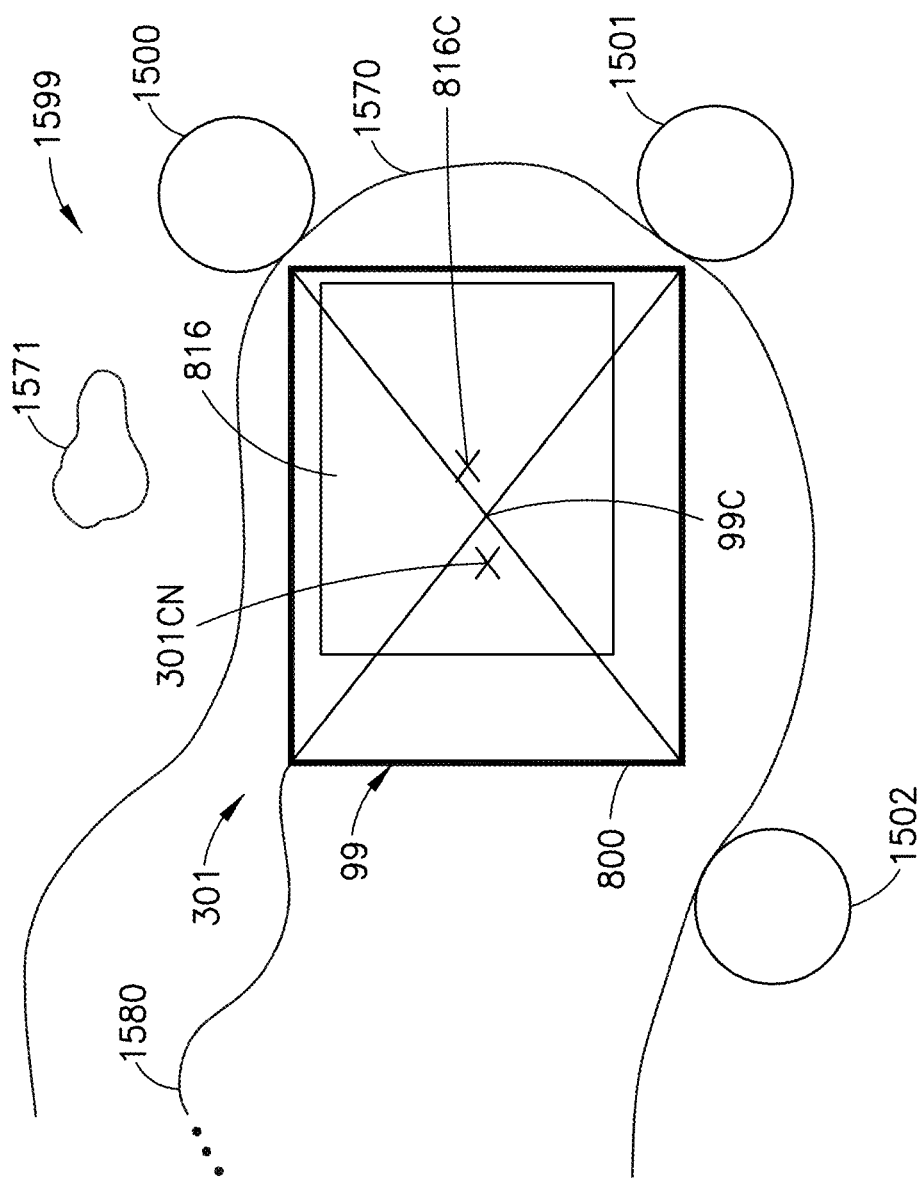
Figure 15C:
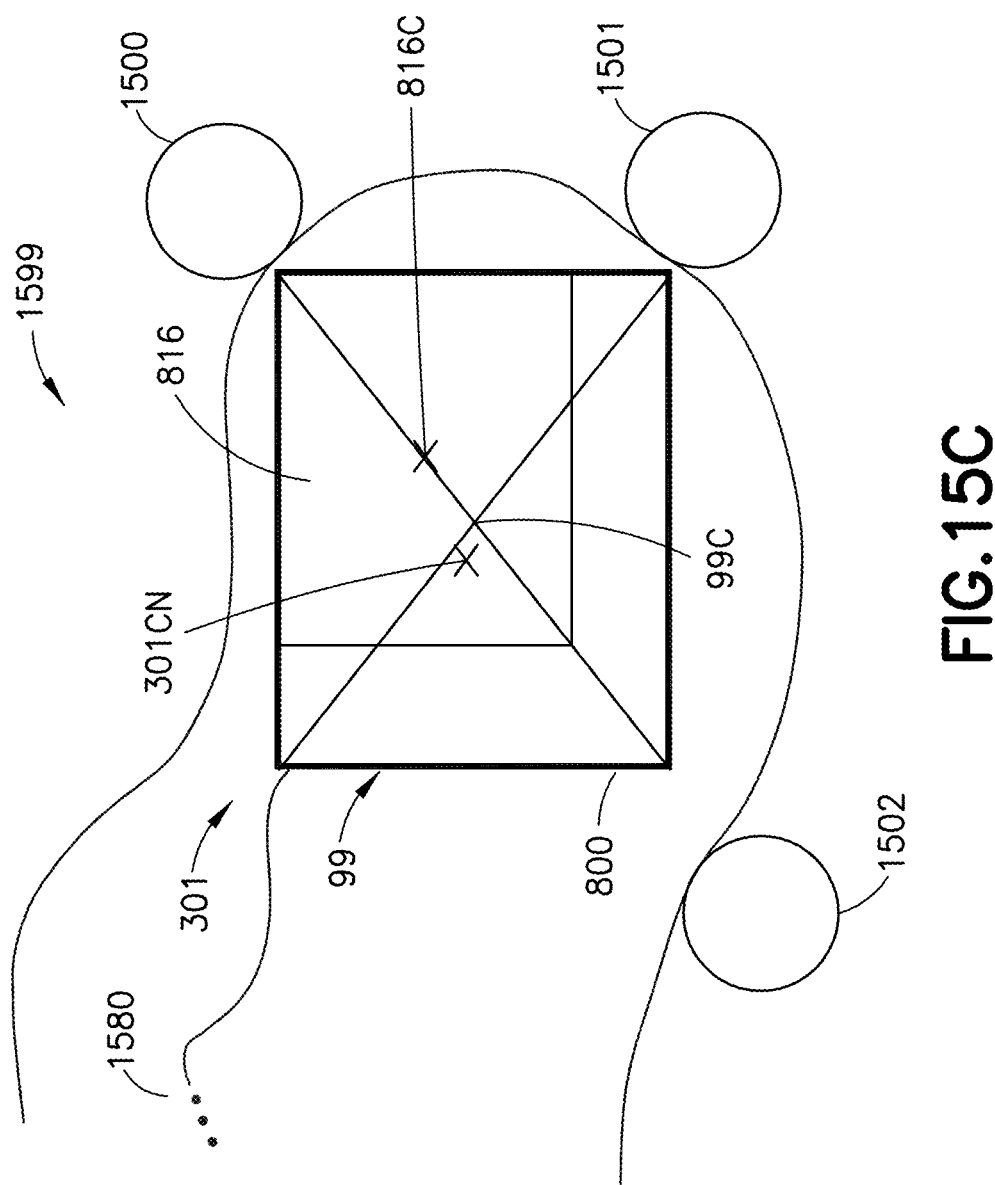

Referring also to FIGS. 15A-15C, the cell controller 10C is configured to determine, in any suitable manner, robot 14 move trajectories and paths that provide or are otherwise determinative of an optimal pick position of the layer depalletizing tool 99 (FIG. 14, Block 1445) relative to the pallet layer 816 for picking/decommissioning the pallet layer 816 from the pallet load PAL. The optimal pick positon may be determined by the cell controller 10C during the place cycle of a previously picked pallet layer so as to effect a substantially continuous decommissioning of the pallet load PAL. The optimal picking position is a position of the layer depalletizing tool 99 relative to the pallet layer 816 where a distance between a center 99C of the layer depalletizing tool 99 and a center 816C of the pallet layer 816 is minimized while satisfying physical constraints of the layer depalletizing tool 99 and the palletizing cell 10. For exemplary purposes only, physical constraints of the layer depalletizing tool 99 include, but are not limited to, a grip area 1520 of the grip interface (in which the pallet layer 816 is inserted) here defined by for example gripper length LT and gripper width WT with the grip 800 in an open configuration, a planarity deviation between the side clamps 22-24 and the (vertical) sides of the pallet layer (which deviation constraints may be similar to the planarity deviation of the plane 1200 relative to plane 28P), the planarity deviation between the top surface 148 plane 1200 and the top pad 28 plane 28P, pallet layer 816 pick is to be performed such that the layer depalletizing tool 99 does not contact the pallet load PAL (other than the gripping of the pallet layer 816), etc. Also for exemplary purposes, physical constraints of the palletizing cell 10 include, but are not limited to, exclusion zones 1500-1502 that prevent movement of the robot 14 (i.e., the robot 14 and the layer depalletizing tool 99 carried by the robot 14 are excluded from entering the exclusion zones 1500-1502).

For exemplary purposes only, the optimal picking position may be determined by the cell controller 10C where the cell controller 10C finds the pallet layer center 816C based on the pallet layer characteristics determined above (e.g., the locations of the corners PC1-PC4, the length L, the width W, etc.). The cell controller 10C uses known dimensions of the layer depalletizing tool 99 (such as external dimensions as well as the grip length LT and grip width WT) to determine a position of the layer depalletizing tool 99 that minimizes the distance between the centers 99C and 816C while avoiding the exclusion zones 1500-1502 and satisfying the physical constraints of the layer depalletizing tool 99. The cell controller 10C is configured to determine the feasibility of the optimal pick position relative to the constraints noted herein (FIG. 14, Block 1450).

FIG. 15A is an exemplary illustration where the pallet layer 816 has an uniform case distribution so as to form a complete pallet layer; however, in other aspects the pallet layer 816 may have any suitable non-uniform or incomplete case unit distribution such as illustrated in FIGS. 16A-16C. The pallet layer is centered with respect to a center 301CN of the pallet unloading/loading station 301 so that the optimal pick position of the layer depalletizing tool 99 where the center 99C is coincident with the center 816C of the pallet layer 816. Here there is space between the layer depalletizing tool 99 and the exclusion zones 1500-1502, as well as space between the grip 800 and the pallet layer 816 so that the pallet layer 816 can be inserted into the grip area 1520 (e.g., this pick is verified by the cell controller 10C as being feasible).

FIG. 15B is an exemplary illustration where the pallet layer 816 has a uniform case distribution so as to form a complete pallet layer; however, in other aspects the pallet layer 816 may have any suitable non-uniform or incomplete case unit distribution such as illustrated in FIGS. 16A-16C. In this example, the center 816C of the pallet layer 816 is positioned off center from the center 301CN of the pallet unloading/loading station 301. In the example illustrated in FIG. 15B there is space between the pallet layer 816 and the exclusion zones 1500, 1501, 1502 into which the layer depalletizing tool 99 can be inserted, as well as space between the pallet layer 816 and the grip 800 so that the pallet layer 816 can be inserted into the grip area 1520 (e.g., this pick is verified by the cell controller 10C as being feasible).

FIG. 15C is an exemplary illustration where the pallet layer 816 has a uniform case distribution so as to form a complete pallet layer; however, in other aspects the pallet layer 816 may have any suitable non-uniform or incomplete case unit distribution such as illustrated in FIGS. 16A-16C. In this example, the center 816C of the pallet layer 816 is positioned off center from the center 301CN of the pallet unloading/loading station 301. In the example illustrated in FIG. 15C there is space between the pallet layer 816 and the exclusion zones 1500, 1501, 1502 into which the layer depalletizing tool 99 can be inserted; however, FIG. 15C illustrates an extreme example of pallet layer 816 placement at the pallet loading/unloading station 301 with minimal clearance between two sides of the grip 800 and the pallet layer 816 (along the Z axis). Again, the optimal pick location of the layer depalletizing tool 99 in the example illustrated in FIG. 15C is a location where the centers 99C, 816C are offset but the distance between the centers 99C, 816C is minimized given the space constraints between the pallet layer 816 and each of the exclusion zones 1500, 1501.

Figure 15D:
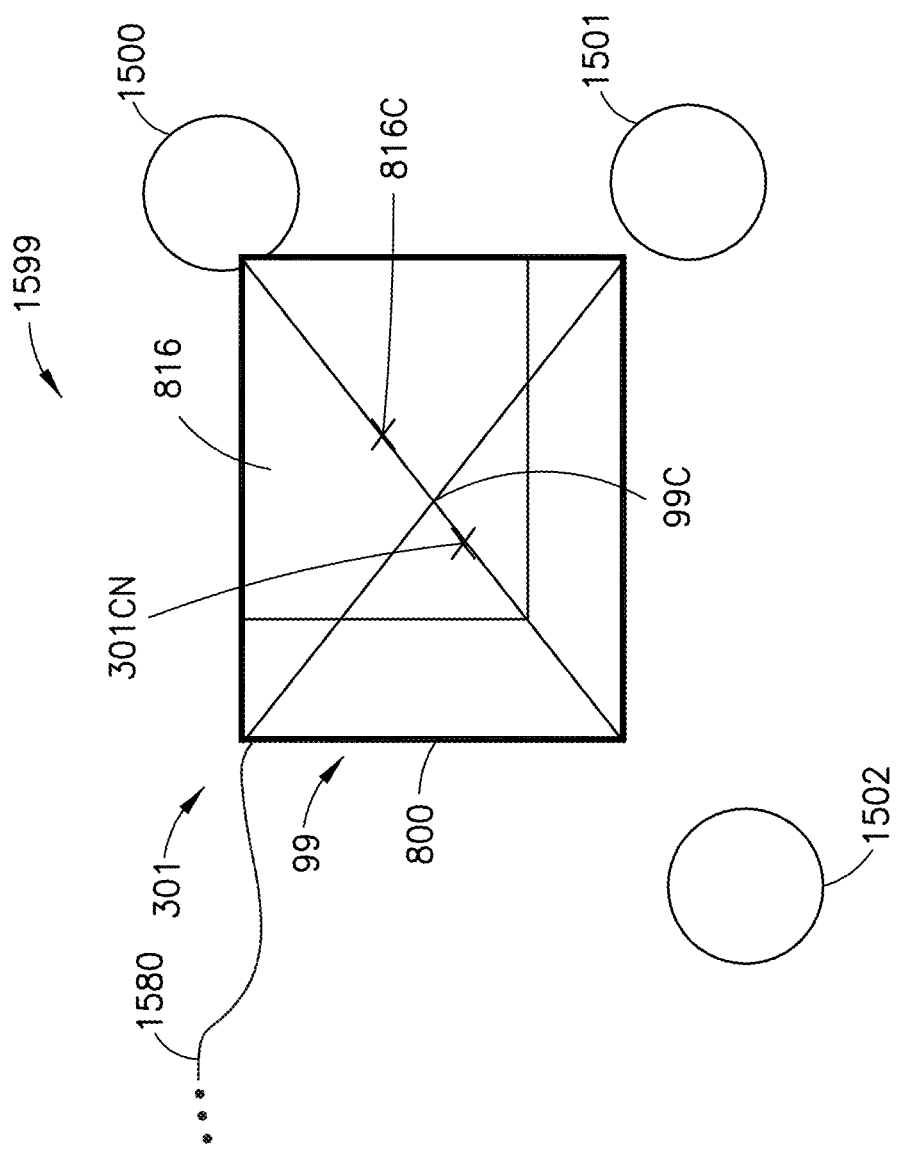

FIG. 15D is an exemplary illustration where the pallet layer 816 has a uniform case distribution so as to form a complete pallet layer; however, in other aspects the pallet layer 816 may have any suitable non-uniform or incomplete case unit distribution such as illustrated in FIGS. 16A-16C. The center 816C of the pallet layer 816 is positioned off center from the center 301CN of the pallet unloading/ loading station 301. In the example illustrated in FIG. 15D there is space between the pallet layer 816 and the exclusion zones 1500, 1501, 1502; however, the grip 800 cannot be positioned to place the pallet layer 816 within the grip area 1520 without entering the exclusion zone 1500 (e.g., this pick is verified by the cell controller 10C as not being feasible). In the Example illustrated in FIG. 15D, there is no optimal pick position of the layer depalletizing tool 99, the pallet player pick is aborted, and the cell controller 10C provides the aural and/or visual alert to an operator to resolve the layer pick.

In aspects of the present disclosure, the cell controller 10C is configured to perform feature analysis (FIG. 14, Block 1450) (using any suitable image analysis techniques) of the palletizing cell 10 and the objects located therein. For example, in one aspect, the vision system 310 is configured to identify the pallet support SPAL at the bottom of the pallet load PAL. In some instances when a pallet support is defective, another pallet support is placed under the pallet load PAL (i.e., so that the pallet load PAL includes two or more pallet supports stacked one above the other) so that the pallet load may be manipulated by, for example, a fork lift. The vision system 310 is configured to identify the stacked pallet supports SPAL so that the other pallet support (the bottom-most pallet support) is not picked by the robot 14. In another aspect, the vision system is configured to determine if a partial pallet layer (the case units of the layer do not span the entirety of the pallet area—length L and width W) provides sufficient support so as to be picked by the layer depalletizing tool 99. For example, referring to FIGS. 16A-16C, exemplary partial pallet layers 1601, 1602, 1603 (which may replace and are, in some aspect, representative of pallet layer 816 illustrated in FIGS. 15A-15D) are illustrated and which may be suitable for being picked by the layer depalletizing tool 99 such that the gripping force applied by the clamps 22-24 is applied substantially uniformly along the respective clamp 22-24. Pallet layers that may not be suitable for picking include those that cause the gripping force applied by the clamps 22-24 to be applied in a non-uniform manner inducing moments on the clamps 22-24 that may cause some case units CU to be gripped and other case units CU not to be gripped. In still other aspects, the vision system 310 is configured to identify case units CUF that have fallen from the pallet load PAL to a location (on the floor, on conveyor 150, etc.) at the palletizing cell 10 so as to generate the aural and/or visual alarm for operator intervention. The vision system 310 may also be configured to determine a "retry" trajectory of the robot arm 14 where a missed pick has occurred. For example, where the robot arm misses a pick (i.e., an intended pick does not occur) the pallet layer may be reanalyzed by the vision system 310 and/or cell controller 10C in the manner described above to as re-identify the features of the pallet layer and generate a robot arm 12 trajectory for retrying the pick, where the retry trajectory may be different than the originally generated trajectory.

Referring to FIGS. 3, 8A-10B, 15A-15D, and 17 an operation of the layer depalletizing tool 99 for decommissioning a layer will be described in accordance with aspects of the present disclosure. In operation any suitable controller (such as the robot controller 316 and/or the cell controller 10C) generates a robot space map 1599 (see FIGS. 15A-15D) (FIG. 17, Block 17100) that includes at least the pallet unloading/loading station 301 and the structure (exclusion zones) thereof. The robot space map 1599, in one aspect, is generated as part of the decommissioning operation and/or the robot space map 1599 may be generated prior to the decommissioning operation. The robot space map 1599 may be generated in any suitable manner such as with data obtained from the vision system 310 and/or data from a computer aided design (CAD) model of the palletizer cell 10. While the robot space map 1599 in FIGS. 15A-15D is illustrated in two-dimensions for exemplary purposes, it should be understood that the robot space map 1599 may have any suitable configuration such as a two-dimensional depth map, a three-dimensional map that includes one or more point clouds representing the structure/exclusion zones, a three-dimensional model generated from the image and/or CAD data, etc.

Figure 17B:
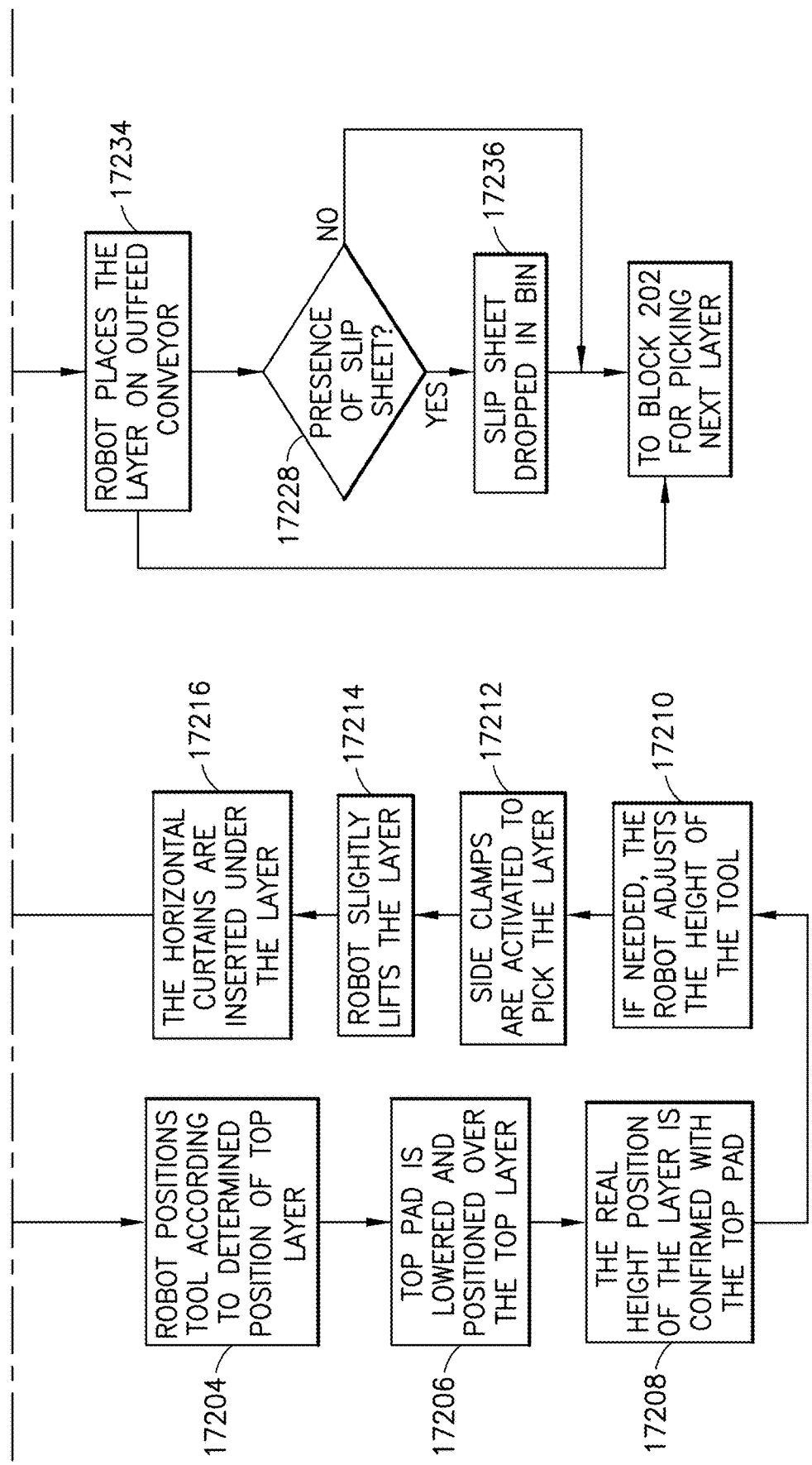
Figure 18:
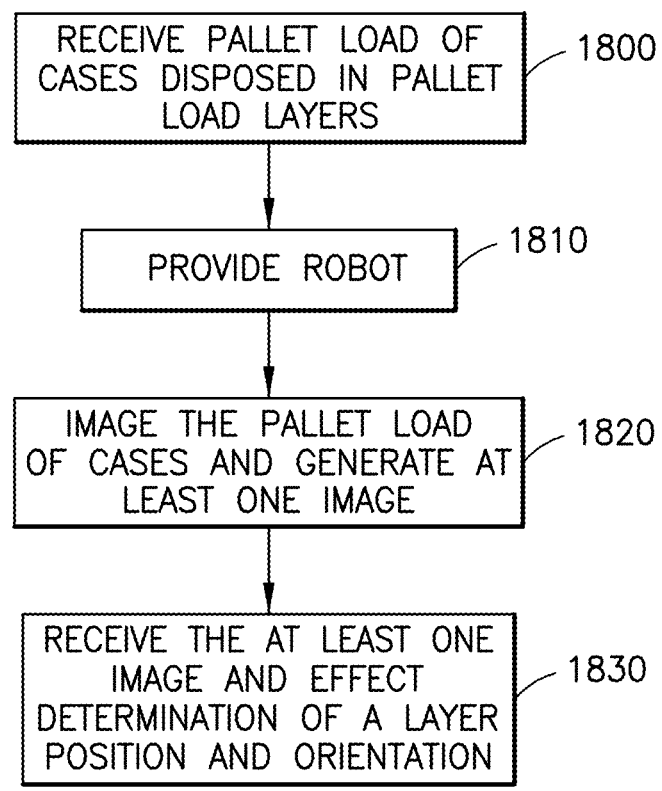
FIG. 18 is an exemplary flow diagram of a method in accordance with aspects of the present disclosure.

The pallet load PAL is delivered to and placed at the pallet unloading/loading station 301 of the palletizer cell 10 (FIG. 17, Block 17200). The pallet load PAL is imaged by the vision system 310 (FIG. 17, Block 17201) in the manner described herein. The robot controller 316 and/or cell controller 10C integrates the pallet image data into the robot space map 1599 (see FIGS. 15A-15D) (FIG. 17, Block 17101) so that at least a representation of the pallet layer 816 is generated within the robot space map 1599 to effect identification of the location, pose, etc. of the top pallet layer 816. While only the pallet layer 816 is illustrated in FIGS. 15A-15D, it should be understood that image data representing the entire pallet may be iteratively integrated into the robot space map 1599 as each layer is decommissioned to effect identification of the location, pose, etc. of a subsequent top pallet layer. The robot controller 316 and/or the cell controller 10C is/are configured to dynamically define pallet layer pick boundary conditions and constraints (FIG. 17, Block 17102) based on the position/pose of the pallet layer 816 within the robot space map 1599. For example, based on image data from the vision system 310 the robot controller 316 and/or the cell controller 10C is configured to dynamically determine the location of objects within the palletizing cell 10 in any suitable manner (such as with suitable image recognition algorithms) and configure/reconfigure the robot space map 1599 based on determined positions of the objects (see for exemplary purposes only reconfiguration of the robot space map 1599 based on entry of object 1571 and the redefining of the area 1570 in which the robot 14 is allowed to move). The objects may be transient objects (in some aspects the transient objects are unexpected/unauthorized objects in which case the controller may issue a stop motion command to the robot 14) that enter and/or leave the palletizing cell 10, part of the palletizing cell 10 structure, pallet loads PAL, etc. The boundary conditions and constraints of robot 14 movement are dynamically determined by the robot controller 316 and/or cell controller 10C based on the position of the objects within the palletizing cell 10. Examples of boundary conditions include areas 1570 of the palletizing cell 10 that allow for or limit robot 14 movements; while examples of constraints are those described above, types of objects within the palletizing cell 10, exclusion zones 1500-1502, pallet load structure PAL location/pose, robot 14 move acceleration based on pallet layer contents, etc.

When the robot controller 316 receives a signal from, for example, cell controller 10C that is indicative of the pallet layer 816 being ready to be picked (FIG. 17, Block 17202), the robot controller 316 and/or cell controller 10C determines the robot 14 path 1580 and trajectory 1581 (FIG. 17, Block 17103) for moving the layer depalletizing tool 99 from an initial position (such as the placement position of a previously picker pallet layer or any other suitable positon) to a pick position (such as those shown in FIGS. 15A-15D) for picking the top pallet layer 816. For example, the robot controller 316 and/or cell controller 10C generates the robot path 1580 and trajectory 1581 in any suitable manner based on the robot space map 1599 (which includes the pallet layer 816 image data), the determined boundary conditions, and the determined constraints. The determination of the robot 14 path 1580 and trajectory 1581 may be an iterative procedure so that the robot 14 path 1580 and trajectory are optimized (e.g., time optimized) so as to effect an optimized movement of the robot 14 from the initial position to the optimized pick position of the layer depalletizing tool (as described herein) independent of an initial pose of the robot 14. The robot controller 316 and/or the cell controller 10C command the robot 14 to position the layer depalletizing tool 99 to the optimized pick position based on the optimized path 1580 and trajectory 1581 so that the clamps 22 and 24 surround the pallet layer 816 (FIG. 17, Block 17204) (see FIGS. 8A and 8B).

It is to be noted that, for most layer depalletizing tools, systems and methods from the prior art, the positioning of the tool relies solely on the nominal vertical position of the layer.

It is however known in the material handling industry that products 18 are often crushed within a pallet load PAL by the weight of the pallet layer 816 or layers located above. This is of course particularly true for the last layers sitting directly on the pallet support SPAL (see FIG. 2) to be depalletized. Therefore, the nominal position of each pallet layer 816, used in the initial programming of the robot 14, can lead to a wrong positioning of the layer depalletizing tool 99, limiting the capacity of the system to adequately depalletize the pallet layers 816.

In the aspects of the present disclosure, the top pad 28 of the layer depalletizing tool 99 is coupled with a sensor 888 configured to evaluate the real height/position of the top surface 148 of the pallet layer 816 being picked, therefore enabling the layer depalletizing tool 99 to be positioned more precisely. This added precision enables the depalletizing system, including the robot 14 and layer depalletizing tool 99, to be more efficient and reduces the probability of product damages or even avoid cases where the bad positioning prevents the products 18 of being depalletized. The sensor can be in the form of an analog laser distance sensor or any other suitable distance determining sensor.

The top pad 28 is lowered and positioned over the top layer on the pallet (FIG. 17, Block 17206). The robot 14 positions the layer depalletizing tool 99 to the height of the pallet layer 816 to be picked as determined from the vision system 310 image data. Knowing that the top pad 28 contacts the upper surface 148 of the pallet layer 816, the sensor 888 measures the position of the top pad 28. The robot controller 316 (and/or cell controller 10C) then computes the real height of the pallet layer 816 and compares the real height with the height of the layer 816 as determined from the vision system 310 image data. If there is a difference between the real height (as determined by sensor 888) and the height of the layer 816 as determined from the vision system 310 image data the robot controller 316 adjusts the layer depalletizing tool 99 position accordingly. The difference in height may also be communicated to the cell controller 10C so as to recalibrate/fine-tune the vision system 310 so as to decrease or minimize any difference between the real height (as determined by sensor 888) and the height of the layer 816 as determined from the vision system 310 image data.

Using the top pad 28 to determine the real height of the top surface of the pallet represents a robust way to verify the location of the top surface 148 of the pallet layer 816. For example, even if a flap of a product 18 is lifted or a product 18 is not well positioned, the overall position of the top pad 28 is not affected and will therefore provide valuable and precise information about the real height of the pallet layer 816. When needed, the robot 14 adjusts the height of the layer depalletizing tool 99 (FIG. 17, Block 17210).

Considering that each pallet layer 816 can be composed of a plurality of products 18, it often happens that some products 18 have no side facing the exterior of the pallet layer 816. According to one aspect, a combination of mechanisms is provided that allows the clamps 22-24 to grip the products 18 adequately. For example, the four clamps 22-24 are used to compress the whole pallet layer 816 on each side without horizontally moving the pallet layer 816 (FIG. 17, Block 17212) by activating and controlling the pneumatic actuators 56. The robot 14 then slightly lifts the layer depalletizing tool 99 to create a gap mainly between the lower surfaces 8150 (FIG. 8B) of the products 18 located on the perimeter of the pallet layer 816 and the top surface of the products 18 of the pallet layer 816 just underneath (FIG. 17, Block 17214). The closing of the horizontal curtains 26 is then initiated so that they are inserted under the pallet layer 816 (FIG. 17, Block 17216). The closing of the horizontal curtains 26 is illustrated in FIGS. 9A-10B. The rotating friction heads 70 of the curtains 26 contribute to move the products 18 from the gripped pallet layer 816 over the horizontal curtains 26. This more specifically allows the products 18 that are not located on the perimeter of the pallet layer 816 and that are generally only partially lifted by the side clamps 22-24 or sometimes not lifted at all to move over the horizontal curtains 26.

The friction created on the vertical faces of the products 18 by the pressure of the clamps 22-24 sometimes prevents the products 18 to move upward to enable the horizontal curtains 26 to close underneath without damaging the products 18. When this happens, the pressure is automatically reduced on the side clamps 22-24 so the above mentioned friction is also reduced, therefore facilitating the movement of the curtains 26 to lift and pick the remaining products 18 of the pallet layer 816 to be picked.

Variation on the pressure of the clamps 22-24 is adjusted (FIG. 17, Block 17218) by monitoring the linear movement of the horizontal curtains 26. If a product 18 prevents this movement, the horizontal curtains 26 cannot move forward. When this happens, it is concluded that at least one product 18 is blocking the movement. Therefore, the pressure is reduced on the clamps 22-24 by the actuators 56 (FIG. 17, Block 17220) to continue with the process of picking all the products 18 on the pallet layer 816.

According to another aspect, the linear movement of the curtains 26 is monitored so as to detect a movement resistance thereof even when the curtains continue to move.

When the curtains 26 are completely closed (see FIGS. 10A-10B), the pallet layer 816 is completely gripped by the layer depalletizing tool 99 (FIG. 17, Block 17222), and the robot 14 moves the layer depalletizing tool 99 with the gripped pallet layer 816 and transfers the pallet layer 816 to an outfeed location (such as conveyor 150) (FIG. 17, Block 17232). The vision system 310 images the pallet load PAL (FIG. 17, Block 17233) during the place cycle of the robot 14 for determining the pose, location, etc. of the next layer to be picked. The robot 14 places the pallet layer 816 on the outfeed conveyor 150 (or other suitable outfeed location) (FIG. 17, Block 17234) and the pallet decommissioning process continues with Block 17202.

In addition to the above-described function of allowing a precise assessment of the position of the top pallet layer 816 of the pallet load PAL, the top pad 28 also prevents small products 18 from "popping out" of the pallet layer 816 as the horizontal curtains 26 move underneath. Such movement of products 18 would occur for example when the pallet layer 816 is composed of small products 18, i.e. products 18 with reduced height. The weight of the top pad 28 is sufficient to prevent the "popping out" effect of small products without limiting the capacity of the horizontal curtains 26 to go underneath them. Similarly, the top pad 28 prevents the small products 18 from "popping out" when the horizontal curtains 26 are removed from underneath the products 18.

In some aspects, slip sheets 277 (FIG. 2) are provided between some layers of products 18 in the pallet load PAL. A standard approach is to have an independent device that automatically removes the slip sheets 277 between each layer depalletizing sequence. This approach works well but is quite expensive considering the addition of the independent device. In accordance with aspects of the present disclosure, a layer depalletizing tool is provided with a component that retrieves a slip sheet 277 located over the pallet layer 816 of products 18 at the same time the pallet layer 816 is depalletized. Since such layer depalletizing tool is similar to the layer depalletizing tool 99, and since this further decommissioning process is similar to that described above, for concision purposes, only the differences there between will be described with reference to FIG. 17.

Figure 19A:
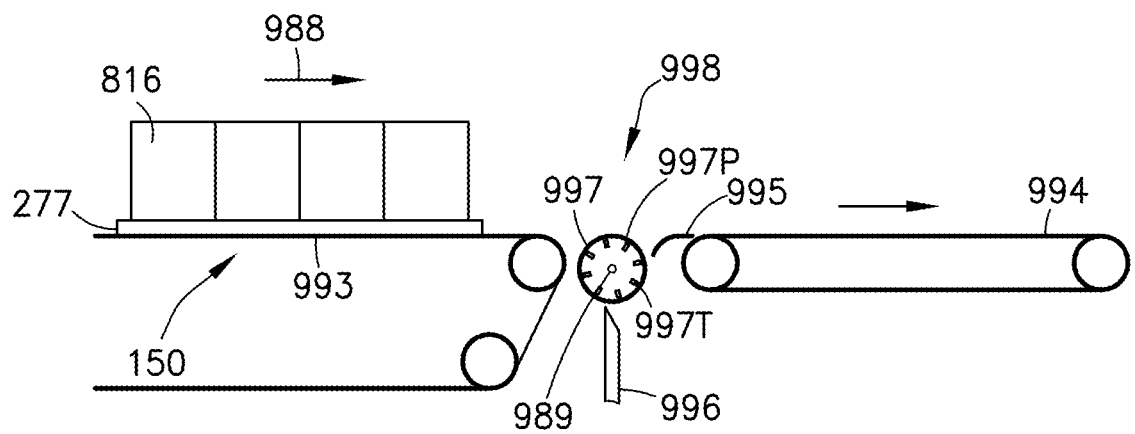
FIGS. 19A, 19B, and 19C are schematic illustrations of slip sheet removal in accordance with aspects of the present disclosure.
Figure 19B:
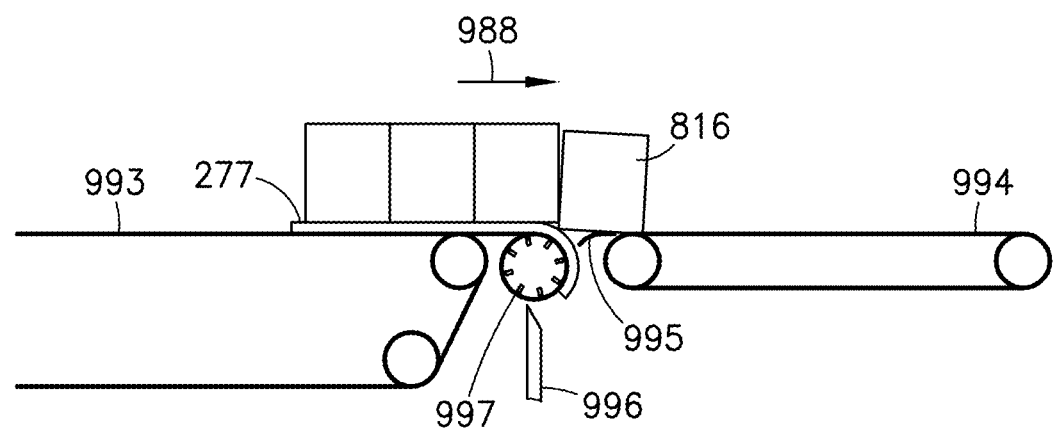
Figure 19C:
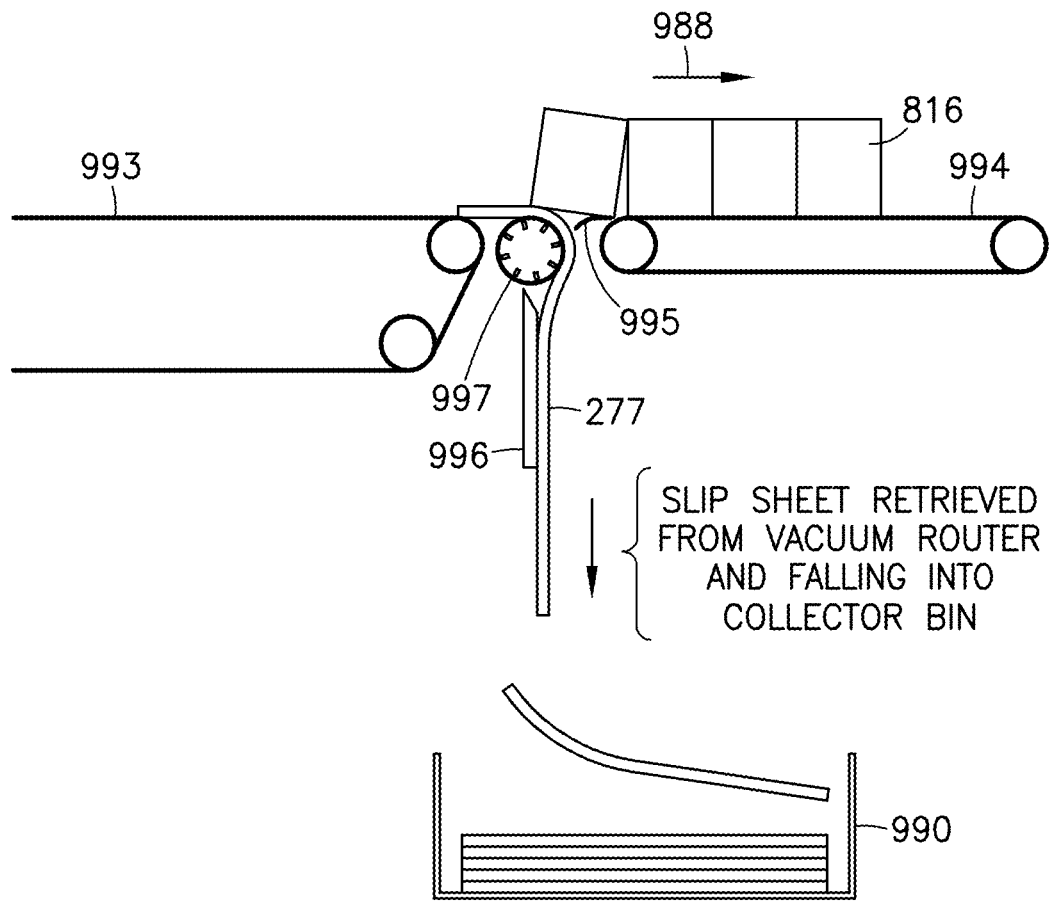

The tool includes top pad 28 including suction cups (not shown) to remove any slip sheet over the pallet layer 816 at the same time the pallet layer 816 is depalletized. When the pallet layer 816 is completely gripped by the layer depalletizing tool (FIG. 17, Block 17222), the suction cups are activated (FIG. 17, Block 17224). Another, e.g., slip sheet sensor 999 (e.g., such as a camera or scanner configured for resolution of case edges of intermediate cases as shown in FIGS. 9A and 9B and in particular FIG. 9B), which is facing upwards towards the gripped pallet layer 816 (See also FIG. 9B) that is gripped and lifted by the tool, or the same referred to hereinabove, is used to determine if there is a slip sheet 277 attached to, for example, the top pad 28. As the robot 14 lifts and transfers the pallet layer 816, the top pad 28 is slightly lifted (FIG. 17, Block 17226). If the slip sheet sensor 999 still detects the presence of an object (FIG. 17, Block 17228), this means that there is a slip sheet 277 under the pallet layer 816 being depalletized (FIG. 17, Block 17229) and the vacuum is kept on the suction cups (FIG. 17, Block 17230). With further reference to FIGS. 19A, 19B, and 19C, the robot 17 then places the pallet layer 816 (with the slip sheet 277 underneath the pallet layer) onto the mat top conveyor (such as outfeed conveyor 150) and slip sheet is removed and discarded in a bin (FIG. 17, Block 17236) after the pallet layer 816 is placed on the outfeed conveyor 150 (FIG. 17, Block 17232) or somewhere else. In the contrary, if the slip sheet sensor 999 does not detect anything, this means that there is no slip sheet under the layer being depalletized. When such is the case, the vacuum is removed from the suction cups and the robot 14 directly moves back to pick the next pallet layer 816 on the pallet once the previous pallet layer 816 is placed on the outfeed conveyor 150.

Still referring to FIGS. 19A, 19B, and 19C, a slip sheet remover 998 is located or otherwise disposed between portions of the conveyor 150. For example, the conveyor 150 includes an mat top or upstream portion 993 (where the layer being depalletized is placed) and a case spreading or downstream portion 994. The slip sheet remover 998 includes any suitable vacuum removing mechanism such as a vacuum roller 997 (although any suitable adhesive or suction type roller may be used), a restrictor plate 996, and a deflector shield 995. The vacuum roller 997 has any suitable configuration for gripping a slip sheet 227, such as for example, the vacuum roller rotates about a rolling axis 989 and includes suction tubes 997T that are fluidly coupled to suction cups or ports 997P arrayed on or in an outer surface (e.g., a goods support surface) of the vacuum roller 997 and disposed so as to apply a suction force to the slip sheet 227 as the slip sheet 227 passes over the vacuum roller 997. The restrictor plate 996 is disposed beneath the vacuum roller 997 so as to peel or otherwise remove and guide a slip sheet from the vacuum roller 997 to a bin 990. The deflector shield 995 is located downstream from the vacuum roller 997 (e.g., with respect to a travel direction 988 of the pallet layer 816 along the conveyor 150) and has any suitable size and shape that prohibits case edge entry between the conveyors (e.g., so that the cases transition smoothly, without catching or jamming, from one conveyor portion to another conveyor portion while passing over the slip sheet remover 998) and at least in part directs the slip sheets 227 (removed from the bottom of the pallet layer 816) into a gap between conveyor portions 993, 994 (although in one or more aspects the vacuum roller 997 may provide sufficient suction to independently guide the slip sheet into and through the gap between the conveyor portions 993, 994). As described above, the slip sheets 227 are detected by the slip sheet sensor 999, which sends any suitable signal to controller 10C to activate the slip sheet remover 998. Activation of the skip sheet remover 998 includes automatically activating the vacuum roller 997 and automatically removing the slip sheet from underneath the pallet layer 816. Here, the slip sheet 227 is prevented from sticking (via the vacuum roller 997) to the bottom of the pallet layer 816 as the pallet layer 816 transitions from the conveyor portion 993 to the conveyor portion 994. The vacuum roller 997 grips the slip sheet 277 as the slip sheet 227 transitions over the vacuum roller 997, where the vacuum roller directs and transfers the slip sheet 997 through a gap between the conveyor portions to the restrictor plate 996 where the slip sheet 227 is removed from the vacuum roller 997 and discarded into the bin 990.

Referring to FIGS. 3, 8A-10B, 15A-15D, and 18 a method of depalletizing cases in the depalletizer 10 is provided. The method includes receiving, at a pallet unloading station 301 of the depalletizer 10, a pallet load PAL of cases CU disposed in pallet load layers 816 (representative of pallet layers PL1-PL5) (FIG. 18, Block 1800), each of the pallet load layers 816 being formed of more than one cases CU juxtaposed at a common level over an area of the pallet load PAL. A robot 14 is provided (FIG. 18, Block 1810) where the robot 14 is equipped with a depalletizing end effector 99 having a grip 800 configured to grip and pick therewith at least one of the pallet load layers 816 so as to transport the at least one pallet load layer 816 from the pallet load PAL at the pallet unloading station 301 to an output station 333 (which in one aspect includes any suitable conveyor 150). The grip 800 has a grip engagement interface 810 that defines a predetermined layer engagement position and orientation (e.g. in the robot coordinate system or space X, Y, Z, RX, Ry, RZ—see FIG. 3 and also referred to herein as a robot reference frame) for the at least one of the pallet load layers 816, relative to the depalletizing end effector 99, so as to repeatably effect capture and stable holding of the at least one of the pallet load layers 816 with the grip 800. A vision system 310 images the pallet load PAL of cases CU at the pallet unloading station 301, and generates at least one image (FIG. 18, Block 1820) of a top portion of the at least one of the pallet load layers 816 independent of robot motion. A controller (such as a robot controller 16 and/or cell controller 10C) that is operably coupled to the vision system 310 receives the at least one image from the vision system 310 and effects determination, based on the at least one image, of a layer position and orientation (FIG. 18, Block 1830) of the at least one of the pallet load layers 816 relative to the predetermined layer engagement position and orientation of the grip engagement interface 810, wherein the controller is operably coupled to the robot 14 so as to position the grip 800 and capture and hold the at least one of the pallet load layers 816 with the grip 800 at the grip engagement interface 810.

In accordance with one or more aspects of the present disclosure a depalletizer comprises:

a pallet unloading station configured for receiving a pallet load of cases disposed in pallet load layers, each of the pallet load layers being formed of more than one cases juxtaposed at a common level over an area of the pallet load;

a robot equipped with a depalletizing end effector having a grip configured to grip and pick therewith at least one of the pallet load layers so as to transport the at least one pallet load layer from the pallet load at the pallet unloading station to an output station, the grip having a grip engagement interface that defines a predetermined layer engagement position and orientation for the at least one of the pallet load layers, relative to the depalletizing end effector, so as to repeatably effect capture and stable holding of the at least one of the pallet load layers with the grip;

a vision system disposed so as to image the pallet load of cases at the pallet unloading station, and configured so as to generate at least one image of a top portion of the at least one of the pallet load layers independent of robot motion; and a controller operably coupled to the vision system so as to receive the at least one image from the vision system and configured to effect determination, based on the at least one image, of a layer position and orientation of the at least one of the pallet load layers relative to the predetermined layer engagement position and orientation of the grip engagement interface, wherein the controller is operably coupled to the robot so as to position the grip and capture and hold the at least one of the pallet load layers with the grip at the grip engagement interface.

In accordance with one or more aspects of the present disclosure the predetermined layer engagement position and orientation provides engagement planar orientation of the grip engagement interface, and the layer position and orientation describes planarity of an engagement surface, of the at least one of the pallet load layers, disposed so as to interface the grip engagement interface substantially spanning across the at least one of the pallet load layers, and the layer position and orientation describes planar misalignment in at least two orthogonal directions between the engagement surface of the at least one of the pallet load layers and planar orientation of the grip engagement interface.

In accordance with one or more aspects of the present disclosure the vision system comprises at least one camera mounted independent of the robot.

In accordance with one or more aspects of the present disclosure each of the at least one camera is calibrated to a common camera calibration reference structure, and wherein calibration to the common camera calibration reference structure, describes a positional relationship of a respective camera reference frame of each respective camera with each other camera of the at least one camera, and with a predetermined reference frame of the robot.

In accordance with one or more aspects of the present disclosure the at least one camera is disposed so that a field of view of the at least one camera covers the pallet load from an uppermost upward facing surface of the pallet load to a bottom of the pallet load.

In accordance with one or more aspects of the present disclosure the at least one camera is disposed so that an uppermost upward facing surface of each of the pallet load layers is within the field of view of the at least one camera.

In accordance with one or more aspects of the present disclosure a depalletizer comprises:
- a pallet unloading station configured for receiving a pallet load of cases disposed in pallet load layers, each of the pallet load layers being formed of more than one cases juxtaposed at a common level over an area of the pallet load;
- a robot equipped with a depalletizing end effector having a grip configured to grip and pick therewith at least one of the pallet load layers so as to transport the at least one pallet load layer from the pallet load at the unloading station to an output station, the grip having a grip engagement interface that defines a predetermined layer engagement position and orientation for the at least one of the pallet load layers, relative to the end effector, so as to repeatably effect capture and stable holding of the at least one of the pallet load layers with the grip;
- a vision system disposed, separate from the robot, so as to image the pallet load at the pallet unloading station, and configured so as to generate at least one image of a top portion of the at least one of the pallet load layers decoupled from robot motion; and
- a controller configured to effect determination, based on the at least one image, of a position and orientation relationship between the grip interface and each topmost pallet layer of the at least one of the pallet load layers.

In accordance with one or more aspects of the present disclosure the controller is operably coupled to the vision system so as to receive the at least one image from the vision system.

In accordance with one or more aspects of the present disclosure the controller is operably coupled to the robot so as to position the grip relative to each topmost pallet layer, based on the determined relationship, and capture and hold the at least one layer with the grip at the engagement interface.

In accordance with one or more aspects of the present disclosure the determined relationship describes layer position and orientation of each topmost layer relative to the predetermined layer engagement position and orientation of the grip interface relative to a predetermined reference frame of the robot.

In accordance with one or more aspects of the present disclosure the controller determines, based on the at least one image, a respective layer position and orientation of each topmost layer, and effects determination of the determined relationship by comparing the respective layer position and orientation with a predetermined reference frame of the robot.

In accordance with one or more aspects of the present disclosure the respective layer position and orientation describes planarity of an engagement surface, of each topmost layer, disposed so as to interface the grip engagement interface substantially spanning respectively across each topmost layer, and the respective layer position and orientation describes at least one of a planar misalignment and a center point misalignment in at least two orthogonal directions between the engagement surface of topmost layer and the grip engagement.

In accordance with one or more aspects of the present disclosure the controller is configured to resolve the at least one of the one planar misalignment and the center point misalignment for optimum grip engagement respectively with each topmost layer based on robot motion boundary conditions defined by at least one of robot architecture and structure bounding the depalletizer described in the predetermined reference frame of the robot.

In accordance with one or more aspects of the present disclosure the vision system comprises at least one camera mounted independent of the robot.

In accordance with one or more aspects of the present disclosure each of the at least one camera is calibrated to a common camera calibration reference structure, and wherein calibration to the common camera calibration reference structure, describes a positional relationship of a respective camera reference frame of each respective camera with each other camera of the at least one camera, and with a predetermined reference frame of the robot.

In accordance with one or more aspects of the present disclosure the at least one camera is disposed so that a field of view of the at least one camera covers the pallet load from an uppermost upward facing surface of the pallet load to a bottom of the pallet load.

In accordance with one or more aspects of the present disclosure the at least one camera is disposed so that an uppermost upward facing surface of each of the pallet load layers is within the field of view of the at least one camera.

In accordance with one or more aspects of the present disclosure a method of depalletizing cases in a depalletizer is provided. The method comprises:
- receiving, at a pallet unloading station of the depalletizer, a pallet load of cases disposed in pallet load layers, each of the pallet load layers being formed of more than one cases juxtaposed at a common level over an area of the pallet load;
- providing a robot equipped with a depalletizing end effector having a grip configured to grip and pick therewith at least one of the pallet load layers so as to transport the at least one pallet load layer from the pallet load at the pallet unloading station to an output station, the grip having a grip engagement interface that defines a predetermined layer engagement position and orientation for the at least one of the pallet load layers, relative to the depalletizing end effector, so as to repeatably effect capture and stable holding of the at least one of the pallet load layers with the grip;
- imaging, with a vision system, the pallet load of cases at the pallet unloading station, and generating at least one image of a top portion of the at least one of the pallet load layers independent of robot motion; and
- receiving, in a controller operably coupled to the vision system, the at least one image from the vision system and effecting determination, based on the at least one image, of a layer position and orientation of the at least one of the pallet load layers relative to the predetermined layer engagement position and orientation of the grip engagement interface, wherein the controller is operably coupled to the robot so as to position the grip and capture and hold the at least one of the pallet load layers with the grip at the grip engagement interface.

In accordance with one or more aspects of the present disclosure the predetermined layer engagement position and orientation provides engagement planar orientation of the grip engagement interface, and the layer position and orientation describes planarity of an engagement surface, of the at least one of the pallet load layers, disposed so as to interface the grip engagement interface substantially spanning across the at least one of the pallet load layers, and the layer position and orientation describes planar misalignment in at least two orthogonal directions between the engagement surface of the at least one of the pallet load layers and planar orientation of the grip engagement interface.

In accordance with one or more aspects of the present disclosure the vision system comprises at least one camera mounted independent of the robot.

In accordance with one or more aspects of the present disclosure each of the at least one camera is calibrated to a common camera calibration reference structure, and wherein calibration to the common camera calibration reference structure, describes a positional relationship of a respective camera reference frame of each respective camera with each other camera of the at least one camera, and with a predetermined reference frame of the robot.

In accordance with one or more aspects of the present disclosure the at least one camera is disposed so that a field of view of the at least one camera covers the pallet load from an uppermost upward facing surface of the pallet load to a bottom of the pallet load.

In accordance with one or more aspects of the present disclosure the at least one camera is disposed so that an uppermost upward facing surface of each of the pallet load layers is within the field of view of the at least one camera.

In accordance with one or more aspects of the present disclosure a method of depalletizing cases in a depalletizer is provided. The method comprises:
  receiving, at a pallet unloading station of the depalletizer, a pallet load of cases disposed in pallet load layers, each of the pallet load layers being formed of more than one cases juxtaposed at a common level over an area of the pallet load;
  providing a robot equipped with a depalletizing end effector having a grip configured to grip and pick therewith at least one of the pallet load layers so as to transport the at least one pallet load layer from the pallet load at the unloading station to an output station, the grip having a grip engagement interface that defines a predetermined layer engagement position and orientation for the at least one of the pallet load layers, relative to the end effector, so as to repeatably effect capture and stable holding of the at least one of the pallet load layers with the grip;
  imaging, with a vision system disposed separate from the robot, the pallet load at the pallet unloading station, and generating at least one image of a top portion of the at least one of the pallet load layers decoupled from robot motion; and
  with a controller of the depalletizer, effecting determination, based on the at least one image, of a position and orientation relationship between the grip interface and each topmost pallet layer of the at least one of the pallet load layers.

In accordance with one or more aspects of the present disclosure the controller is operably coupled to the vision system so as to receive the at least one image from the vision system.

In accordance with one or more aspects of the present disclosure the controller is operably coupled to the robot so as to position the grip relative to each topmost pallet layer, based on the determined relationship, and capture and hold the at least one layer with the grip at the engagement interface.

In accordance with one or more aspects of the present disclosure the determined relationship describes layer position and orientation of each topmost layer relative to the predetermined layer engagement position and orientation of the grip interface relative to a predetermined reference frame of the robot.

In accordance with one or more aspects of the present disclosure the controller determines, based on the at least one image, a respective layer position and orientation of each topmost layer, and effects determination of the determined relationship by comparing the respective layer position and orientation with a predetermined reference frame of the robot.

In accordance with one or more aspects of the present disclosure the respective layer position and orientation describes planarity of an engagement surface, of each topmost layer, disposed so as to interface the grip engagement interface substantially spanning respectively across each topmost layer, and the respective layer position and orientation describes at least one of a planar misalignment and a center point misalignment in at least two orthogonal directions between the engagement surface of topmost layer and the grip engagement.

In accordance with one or more aspects of the present disclosure the controller resolves the at least of the one planar misalignment and the center point misalignment for optimum grip engagement respectively with each topmost layer based on robot motion boundary conditions defined by at least one of robot architecture and structure bounding the depalletizer described in the predetermined reference frame of the robot.

In accordance with one or more aspects of the present disclosure the vision system comprises at least one camera mounted independent of the robot.

In accordance with one or more aspects of the present disclosure each of the at least one camera is calibrated to a common camera calibration reference structure, and wherein calibration to the common camera calibration reference structure, describes a positional relationship of a respective camera reference frame of each respective camera with each other camera of the at least one camera, and with a predetermined reference frame of the robot.

In accordance with one or more aspects of the present disclosure the at least one camera is disposed so that a field of view of the at least one camera covers the pallet load from an uppermost upward facing surface of the pallet load to a bottom of the pallet load.

In accordance with one or more aspects of the present disclosure the at least one camera is disposed so that an uppermost upward facing surface of each of the pallet load layers is within the field of view of the at least one camera.

In accordance with one or more aspects of the present disclosure a slip sheet removal apparatus for removing slip sheets from a layer of goods travelling along a traverse path is provided. The slip sheet removal apparatus comprises: a frame; a roller rotatably coupled to the frame for rotation about a rolling axis, the roller having vacuum ports extending through a goods support surface of the roller; and a vacuum mechanism coupled to the roller so as to draw a vacuum through the vacuum ports, wherein the vacuum ports are positioned on the roller to engage a slip sheet disposed between the roller and the layer of goods supported on the goods support surface of the roller so as to grip the slip sheet and separate the slip sheet from the layer of goods.

In accordance with one or more aspects of the present disclosure the roller substantially simultaneously rotates the slip sheet gripped by the vacuum mechanism about the rolling axis so as to separate the slip sheet from the layer of goods.

In accordance with one or more aspects of the present disclosure the vacuum mechanism includes at least one suction tube extending through the roller.

In accordance with one or more aspects of the present disclosure the vacuum ports include suction cups coupled to the roller to grip the slip sheet.

In accordance with one or more aspects of the present disclosure the slip sheet removal apparatus further comprises a deflector shield to engage the slip sheet and separate the slip sheet from the layer of goods.

In accordance with one or more aspects of the present disclosure the slip sheet removal apparatus further comprises a stripper plate coupled to the frame, the stripper plate being positioned relative to the roller so as to strip (or otherwise peel/remove) the slip sheet from the roller.

In accordance with one or more aspects of the present disclosure the slip sheet removal apparatus further comprises a collector bin configured to collect slip sheets separated from the layer of goods.

In accordance with one or more aspects of the present disclosure the slip sheet removal apparatus further comprises an upstream conveyor and a downstream conveyor with the roller disposed between the upstream and downstream conveyors.

In accordance with one or more aspects of the present disclosure the traverse path extends along the upstream and downstream conveyors.

In accordance with one or more aspects of the present disclosure the upstream conveyor is a mat-top conveyor and the downstream conveyor is a case spreading conveyor.

In accordance with one or more aspects of the present disclosure a depalletizer comprises: a pallet unloading station for receiving a pallet of goods and separating the pallet into layers of goods; a case conveyor configured to transport the layers of goods from the pallet unloading station to a storage array effecting infeed of the goods to the storage array, the case conveyor including more than one conveyor section; and a slip sheet removal system disposed between two adjacent conveyor sections of the more than one conveyor section, the slip sheet removal system including: a frame; a roller rotatably coupled to the frame for rotation about a rolling axis, the roller having vacuum ports extending through a goods support surface of the roller; and a vacuum mechanism coupled to the roller so as to draw a vacuum through the vacuum ports, wherein the vacuum ports are positioned on the roller to engage a slip sheet disposed between the roller and the layer of goods supported on the goods support surface of the roller so as to grip the slip sheet and separate the slip sheet from the layer of goods.

In accordance with one or more aspects of the present disclosure a method of removing a slip sheet from a layer of goods is provided. The method comprises: providing a frame of a slip sheet removal apparatus; providing a roller rotatably coupled to the frame about a rolling axis, the roller being configured to support and transport a layer of goods disposed upon a slip sheet along a traverse axis; vacuum gripping the slip sheet with the roller, wherein vacuum is generated by a vacuum mechanism coupled to the roller; and separating the slip sheet from the layer of goods with the roller.

It should be understood that the foregoing description is only illustrative of the aspects of the present disclosure. Various alternatives and modifications can be devised by those skilled in the art without departing from the aspects of the present disclosure. Accordingly, the aspects of the present disclosure are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the present disclosure.

What is claimed is:

1. A depalletizer comprising:
a pallet unloading station configured for receiving a pallet load of cases disposed in pallet load layers, each of the pallet load layers being formed of more than one cases juxtaposed at a common level over an area of the pallet load;
a robot equipped with a depalletizing end effector having a grip configured to grip and pick therewith at least one of the pallet load layers so as to transport the at least one pallet load layer from the pallet load at the pallet unloading station to an output station, the grip having a grip engagement interface that defines a predetermined layer engagement position and orientation for the at least one of the pallet load layers, relative to the depalletizing end effector, so as to repeatably effect capture and stable holding of the at least one of the pallet load layers with the grip;
a vision system disposed so as to image the pallet load of cases at the pallet unloading station, and configured so as to generate at least one image of a top portion of the at least one of the pallet load layers independent of robot motion; and
a controller operably coupled to the vision system so as to receive the at least one image from the vision system and configured to effect determination, based on the at least one image, of a layer position and orientation of the at least one of the pallet load layers relative to the predetermined layer engagement position and orientation of the grip engagement interface, wherein the controller is operably coupled to the robot so as to position the grip and capture and hold the at least one of the pallet load layers with the grip at the grip engagement interface.

2. The depalletizer of claim 1, wherein the predetermined layer engagement position and orientation provides engagement planar orientation of the grip engagement interface, and the layer position and orientation describes planarity of an engagement surface, of the at least one of the pallet load layers, disposed so as to interface the grip engagement interface substantially spanning across the at least one of the pallet load layers, and the layer position and orientation describes planar misalignment in at least two orthogonal directions between the engagement surface of the at least one of the pallet load layers and planar orientation of the grip engagement interface.

3. The depalletizer of claim 1, wherein the vision system comprises at least one camera mounted independent of the robot.

4. The depalletizer of claim 3, wherein each of the at least one camera is calibrated to a common camera calibration reference structure, and wherein calibration to the common camera calibration reference structure, describes a positional relationship of a respective camera reference frame of each respective camera with each other camera of the at least one camera, and with a predetermined reference frame of the robot.

5. The depalletizer of claim 3, wherein the at least one camera is disposed so that a field of view of the at least one camera covers the pallet load from an uppermost upward facing surface of the pallet load to a bottom of the pallet load.

6. The depalletizer of claim 3, wherein the at least one camera is disposed so that an uppermost upward facing surface of each of the pallet load layers is within the field of view of the at least one camera.

7. A depalletizer comprising:
a pallet unloading station configured for receiving a pallet load of cases disposed in pallet load layers, each of the pallet load layers being formed of more than one cases juxtaposed at a common level over an area of the pallet load;
a robot equipped with a depalletizing end effector having a grip configured to grip and pick therewith at least one of the pallet load layers so as to transport the at least one pallet load layer from the pallet load at the unloading station to an output station, the grip having a grip engagement interface that defines a predetermined layer engagement position and orientation for the at least one of the pallet load layers, relative to the end effector, so as to repeatably effect capture and stable holding of the at least one of the pallet load layers with the grip;
a vision system disposed, separate from the robot, so as to image the pallet load at the pallet unloading station, and configured so as to generate at least one image of a top portion of the at least one of the pallet load layers decoupled from robot motion; and
a controller configured to effect determination, based on the at least one image, of a position and orientation relationship between the grip interface and each topmost pallet layer of the at least one of the pallet load layers.

8. The depalletizer of claim 7, wherein the controller is operably coupled to the vision system so as to receive the at least one image from the vision system.

9. The depalletizer of claim 7, wherein the controller is operably coupled to the robot so as to position the grip relative to each topmost pallet layer, based on the determined relationship, and capture and hold the at least one layer with the grip at the engagement interface.

10. The depalletizer of claim 7, wherein the determined relationship describes layer position and orientation of each topmost layer relative to the predetermined layer engagement position and orientation of the grip interface relative to a predetermined reference frame of the robot.

11. The depalletizer of claim 7, wherein the controller determines, based on the at least one image, a respective layer position and orientation of each topmost layer, and effects determination of the determined relationship by comparing the respective layer position and orientation with a predetermined reference frame of the robot.

12. The depalletizer of claim 11, wherein the respective layer position and orientation describes planarity of an engagement surface, of each topmost layer, disposed so as to interface the grip engagement interface substantially spanning respectively across each topmost layer, and the respective layer position and orientation describes at least one of a planar misalignment and a center point misalignment in at least two orthogonal directions between the engagement surface of topmost layer and the grip engagement.

13. The depalletizer of claim 12, wherein the controller is configured to resolve the at least of the one planar misalignment and the center point misalignment for optimum grip engagement respectively with each topmost layer based on robot motion boundary conditions defined by at least one of robot architecture and structure bounding the depalletizer described in the predetermined reference frame of the robot.

14. The depalletizer of claim 7, wherein the vision system comprises at least one camera mounted independent of the robot.

15. The depalletizer of claim 14, wherein each of the at least one camera is calibrated to a common camera calibration reference structure, and wherein calibration to the common camera calibration reference structure, describes a positional relationship of a respective camera reference frame of each respective camera with each other camera of the at least one camera, and with a predetermined reference frame of the robot.

16. The depalletizer of claim 14, wherein the at least one camera is disposed so that a field of view of the at least one camera covers the pallet load from an uppermost upward facing surface of the pallet load to a bottom of the pallet load.

17. The depalletizer of claim 14, wherein the at least one camera is disposed so that an uppermost upward facing surface of each of the pallet load layers is within the field of view of the at least one camera.

18. A method of depalletizing cases in a depalletizer, the method comprising:
receiving, at a pallet unloading station of the depalletizer, a pallet load of cases disposed in pallet load layers, each of the pallet load layers being formed of more than one cases juxtaposed at a common level over an area of the pallet load;
providing a robot equipped with a depalletizing end effector having a grip configured to grip and pick therewith at least one of the pallet load layers so as to transport the at least one pallet load layer from the pallet load at the pallet unloading station to an output station, the grip having a grip engagement interface that defines a predetermined layer engagement position and orientation for the at least one of the pallet load layers, relative to the depalletizing end effector, so as to repeatably effect capture and stable holding of the at least one of the pallet load layers with the grip;
imaging, with a vision system, the pallet load of cases at the pallet unloading station, and generating at least one image of a top portion of the at least one of the pallet load layers independent of robot motion; and
receiving, in a controller operably coupled to the vision system, the at least one image from the vision system and effecting determination, based on the at least one image, of a layer position and orientation of the at least one of the pallet load layers relative to the predetermined layer engagement position and orientation of the grip engagement interface, wherein the controller is operably coupled to the robot so as to position the grip and capture and hold the at least one of the pallet load layers with the grip at the grip engagement interface.

19. The method of claim 18, wherein the predetermined layer engagement position and orientation provides engagement planar orientation of the grip engagement interface, and the layer position and orientation describes planarity of an engagement surface, of the at least one of the pallet load layers, disposed so as to interface the grip engagement interface substantially spanning across the at least one of the pallet load layers, and the layer position and orientation describes planar misalignment in at least two orthogonal directions between the engagement surface of the at least one of the pallet load layers and planar orientation of the grip engagement interface.

20. The method of claim 18, wherein the vision system comprises at least one camera mounted independent of the robot.

21. The method of claim 20, wherein each of the at least one camera is calibrated to a common camera calibration reference structure, and wherein calibration to the common camera calibration reference structure, describes a positional relationship of a respective camera reference frame of each respective camera with each other camera of the at least one camera, and with a predetermined reference frame of the robot.

22. The method of claim 20, wherein the at least one camera is disposed so that a field of view of the at least one camera covers the pallet load from an uppermost upward facing surface of the pallet load to a bottom of the pallet load.

23. The method of claim 20, wherein the at least one camera is disposed so that an uppermost upward facing surface of each of the pallet load layers is within the field of view of the at least one camera.

* * * * *